US006381534B2

(12) United States Patent
Takayama et al.

(10) Patent No.: US 6,381,534 B2
(45) Date of Patent: Apr. 30, 2002

(54) NAVIGATION INFORMATION PRESENTING APPARATUS AND METHOD THEREOF

(75) Inventors: Kuniharu Takayama; Hirohisa Naito; Minoru Sekiguchi; Yoshiharu Maeda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/752,463

(22) Filed: Jan. 3, 2001

(30) Foreign Application Priority Data

Feb. 14, 2000 (JP) ....................................... 2000-034793
Feb. 24, 2000 (JP) ....................................... 2000-047166

(51) Int. Cl.[7] ................................................ H04N 1/02
(52) U.S. Cl. ....................... 701/201; 701/214; 345/352; 345/333; 348/556; 348/552
(58) Field of Search ................................ 701/200, 201, 701/208, 210, 214; 345/333, 327, 352, 440, 441, 433, 443; 348/556, 552, 460; 342/352, 357.15

(56) References Cited

U.S. PATENT DOCUMENTS

| | | | | |
|---|---|---|---|---|
| 6,101,443 A | * | 8/2000 | Kato et al. | 701/210 |
| 6,223,347 B1 | * | 4/2001 | Watanabe et al. | 725/139 |

* cited by examiner

*Primary Examiner*—William A. Cuchlinski, Jr.
*Assistant Examiner*—Marthe Y. Marc-Coleman
(74) *Attorney, Agent, or Firm*—Staas & Halsey LLP

(57) ABSTRACT

When a navigation script has a contradiction with respect to time and place, a navigation information presenting apparatus adjusts the contradiction, executes instructions of the navigation script corresponding to restriction information, and presents the navigation information to the user. In addition, the navigation information presenting apparatus presents navigation information to the user at a timing corresponding to information representing traveling speed and/or time step.

50 Claims, 49 Drawing Sheets

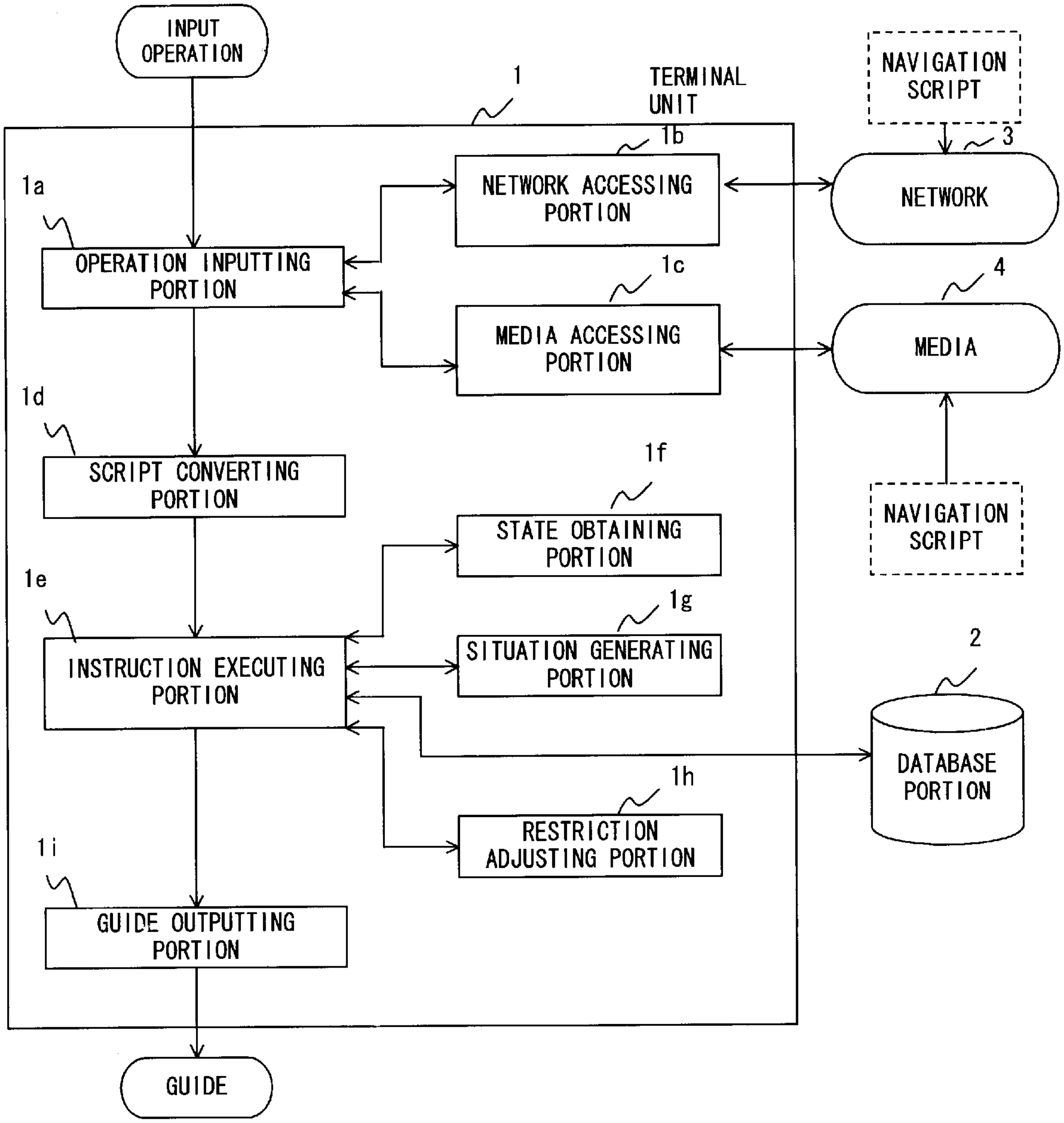
F I G. 1 A

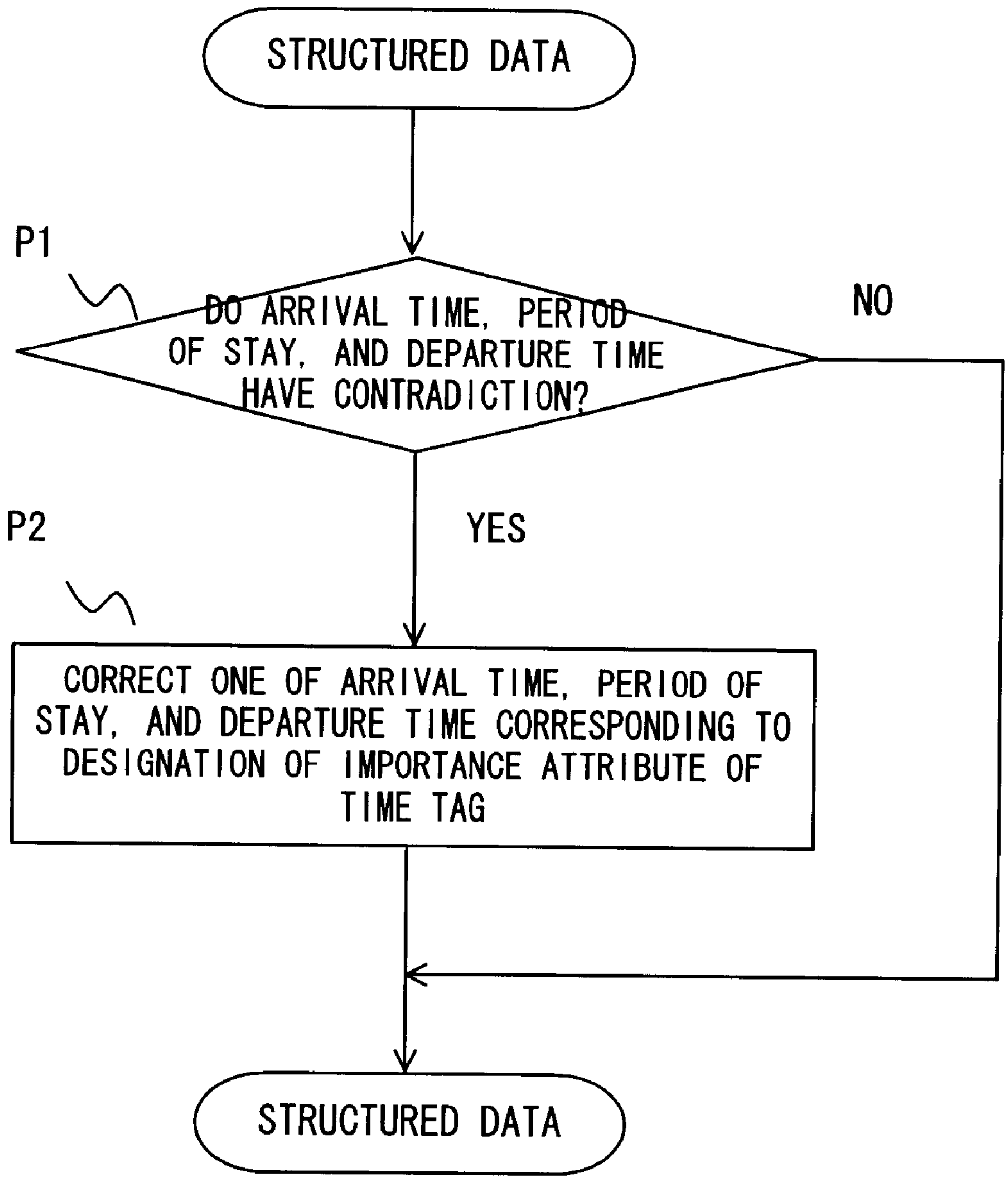
F I G. 1 B

| | importance | | | ELEMENT NOT CORRECTED | ELEMENT CORRECTED |
|---|---|---|---|---|---|
| | a | p | d | | |
| (1) | | | | a, d | p:=d−a |
| (2) | | | h | a, d | p:=d−a |
| (3) | | h | | a, p | d:=a+p |
| (4) | h | | | a, d | p:=d−a |
| (5) | | h | h | p, d | a:=d−p |
| (6) | h | | h | a, d | p:=d−a |
| (7) | h | h | | a, p | d:=a+p |
| (8) | h | h | h | a, d | p:=d−a |

a=ARRIVAL TIME
(arrive-time)

p:PERIOD OF STAY
(period-of- stay)

d:DEPARTURE TIME
(departure-time)

h:importance=high
:improtance=low

FIG. 1C

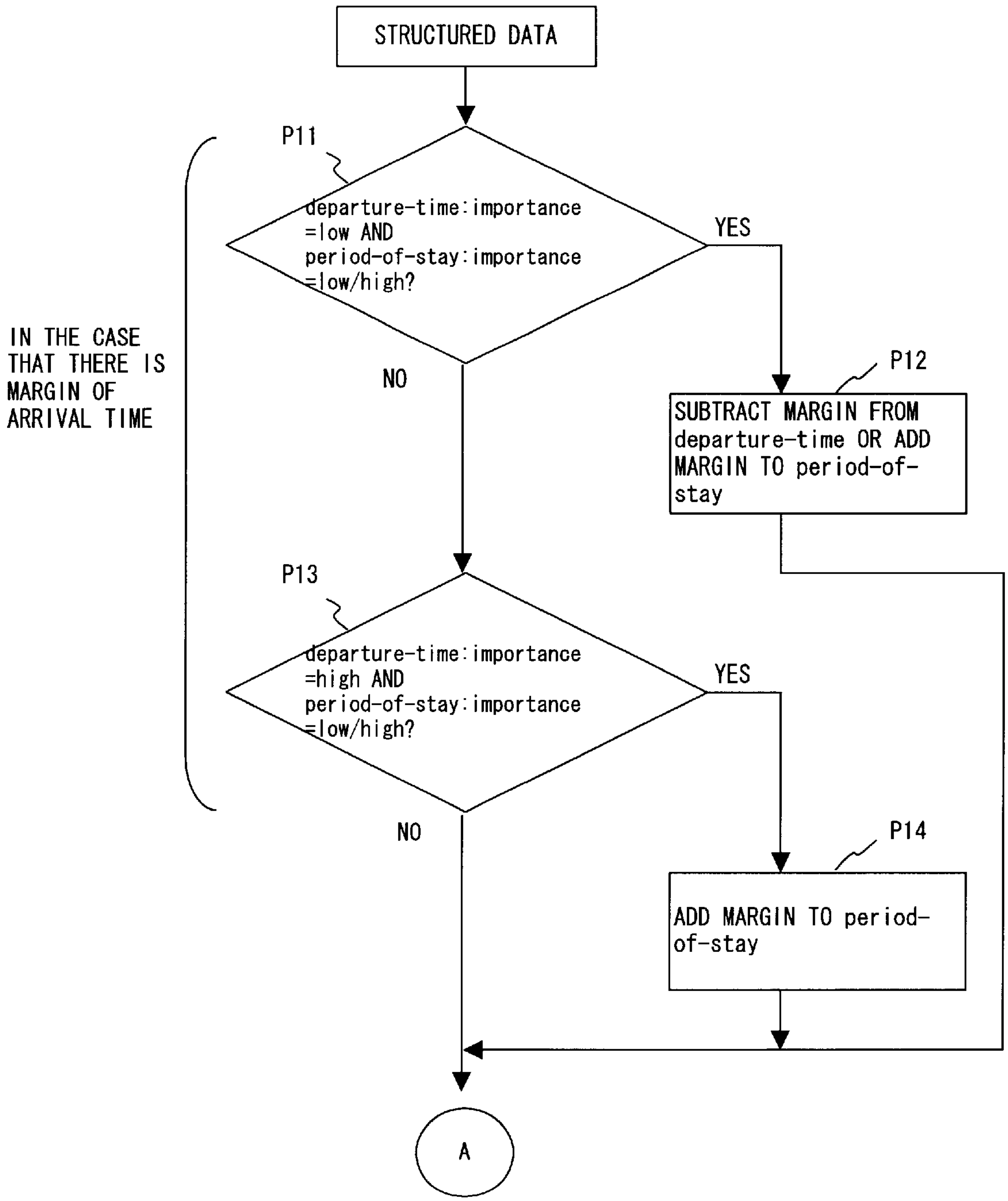
F I G. 1 D

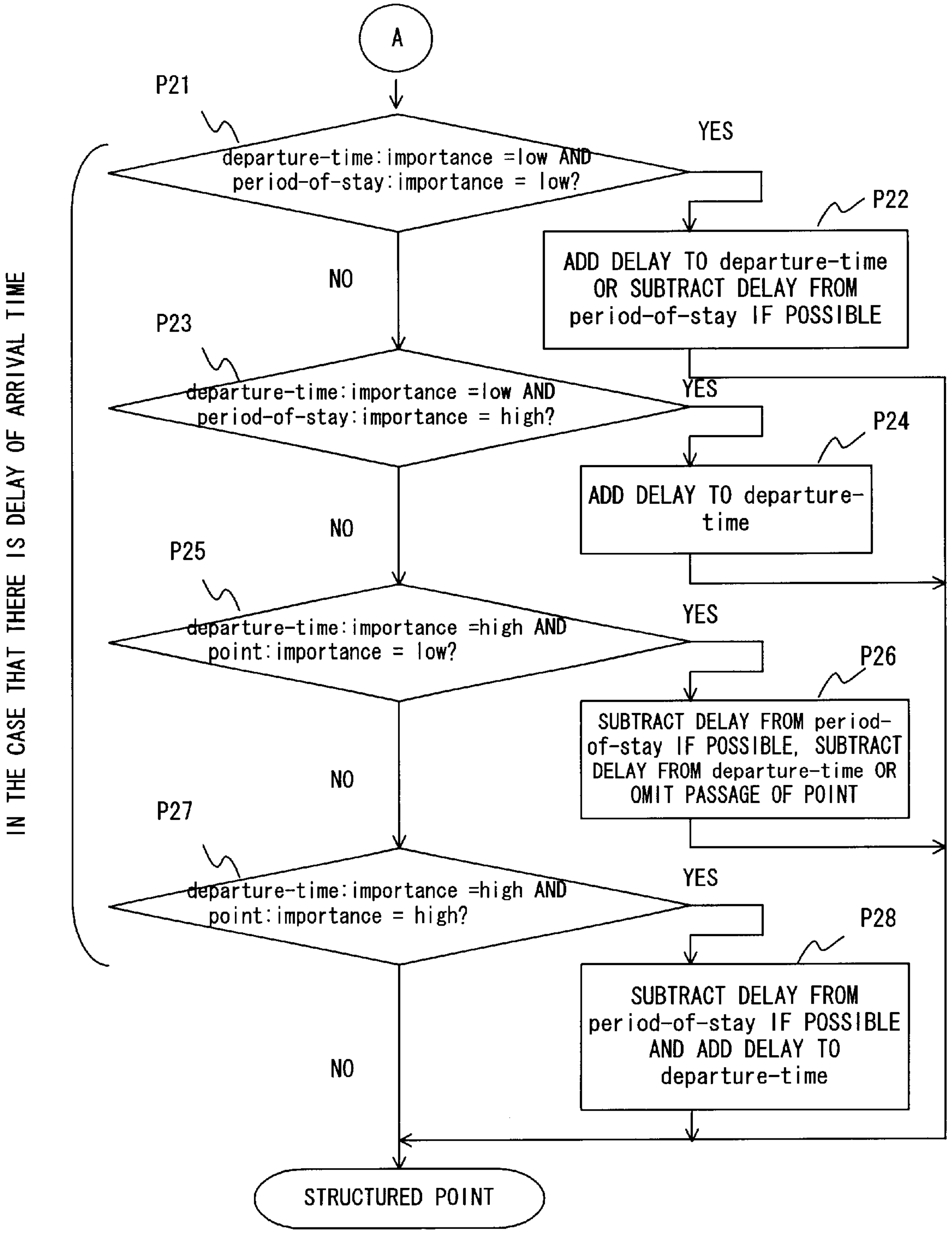
F I G. 1 E

ACTIVE TIME/POINT SCHEDULER

| PLACE | TIME | MEANS | FEE |
|---|---|---|---|
| KAIHIN MAKUHARI TOKYO | 09:00 10:00 | TRAIN (JR. KEIYO LINE) | 540 |
| TOKYO YAESU | 09:00 10:00 | FOOT | |
| ◆ PRESENT ◆ | 10:45 | | |
| YAESU | 10:00 | CAR (METROPOLITAN HIGHWAY) | 700 |
| KYOBASHI JC | | | |
| EDOBASHI JC | | | |
| DAIBA IC | | | |
| EDOBASHI IC | | | |
| RESTAURANT | | | |
| ◇ REQUIRED ◇ TIME/FEE | 03:40 | | 1,940 |

MAP

YOU CANNOT ARRIVE AT NEXT PLACE IN TIME

WILL YOU WANT TO RE-SCHEDULE PLAN ACCORDING TO PRIORITY?

[YES] [NO] [UNDO]

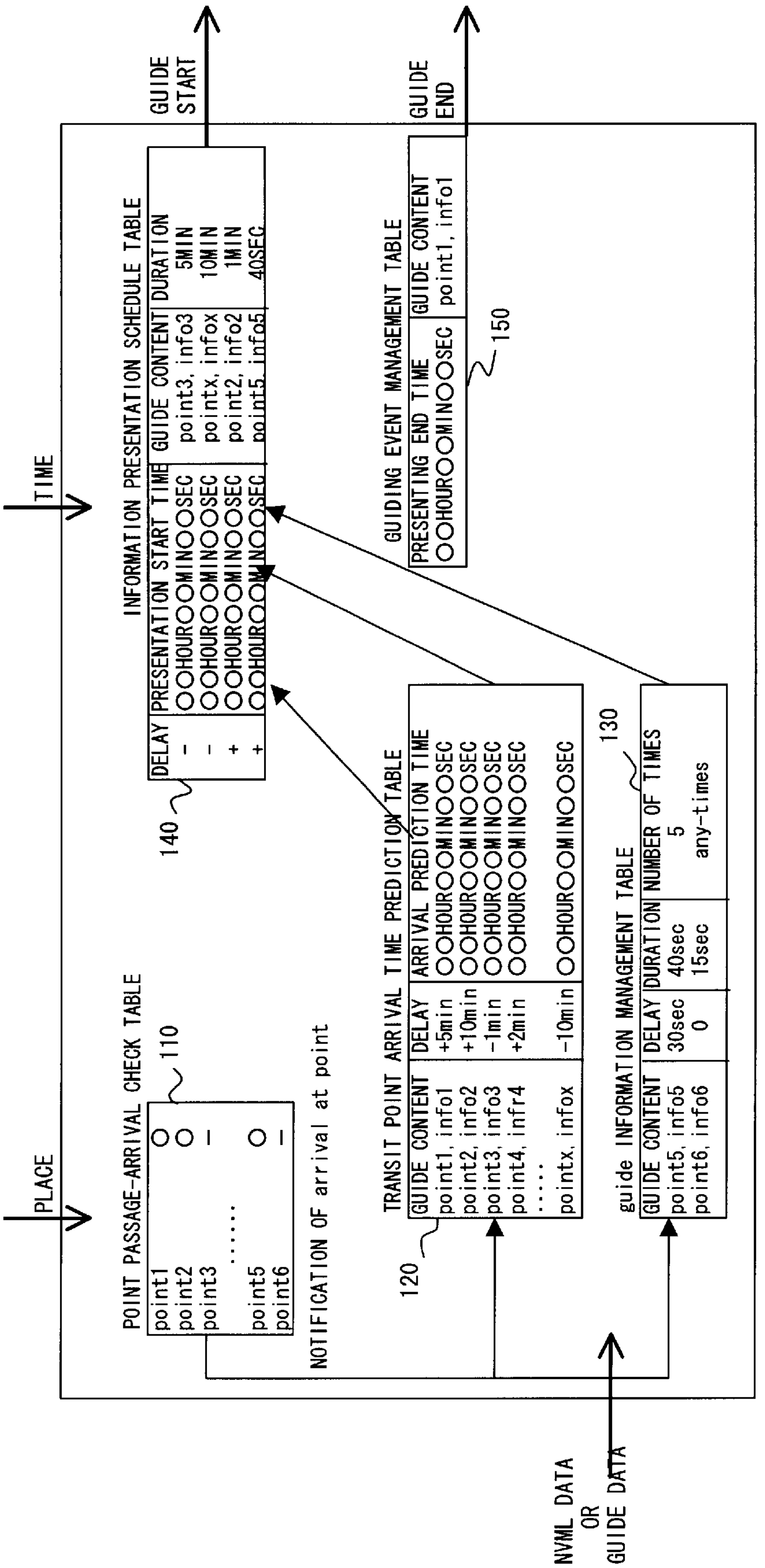
F I G. 2B

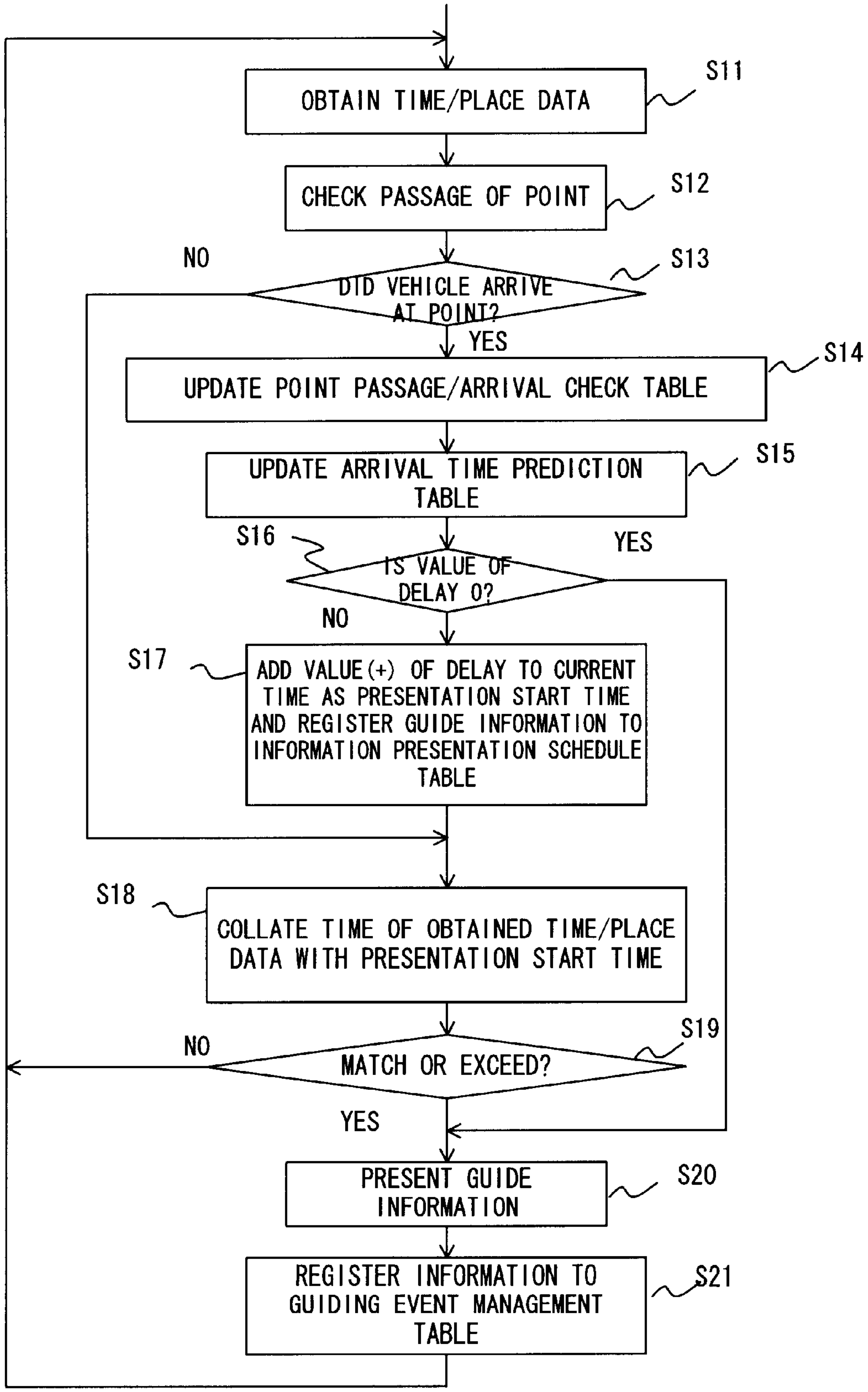
F I G. 4

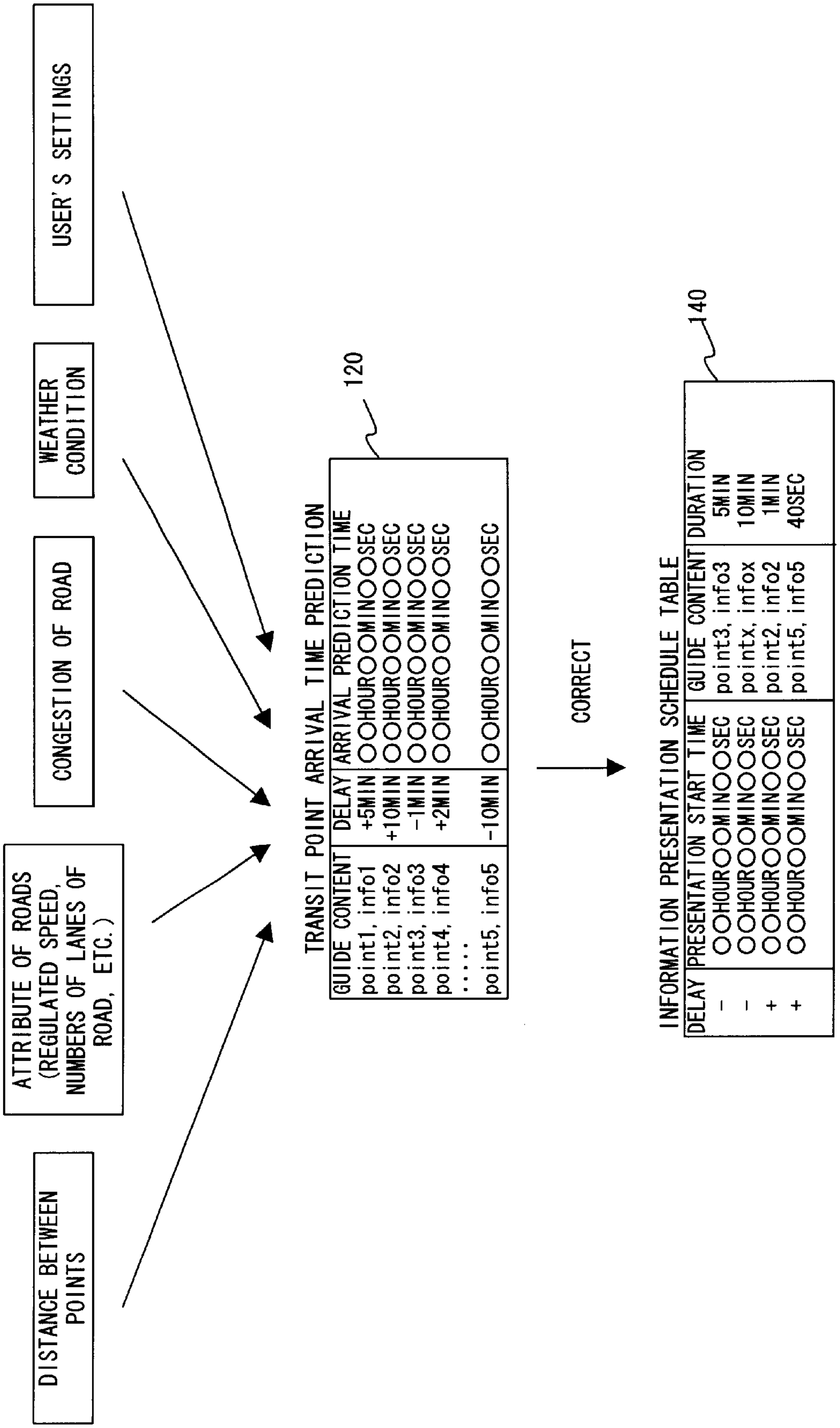
F I G. 6

PROCESS IN THE CASE THAT BEFORE DURATION OF CURRENT GUIDE IS COMPLETED, GUIDE START TIME OF NEXT POINT TAKES PLACE ⟹ PRIORITY OF navi

| CURRENT TIME | NEXT POINT | PROCESS |
|---|---|---|
| navi | navi | STOPS CURRENT GUIDE AND STARTS NEXT GUIDE |
| navi | guide | PRESENTS CURRENT GUIDE IN DURATION AND STARTS NEXT GUIDE |
| guide | navi | STOPS CURRENT GUIDE AND STARTS NEXT GUIDE |
| guide | guide | STOPS CURRENT GUIDE AND STARTS NEXT GUIDE |

F I G. 8

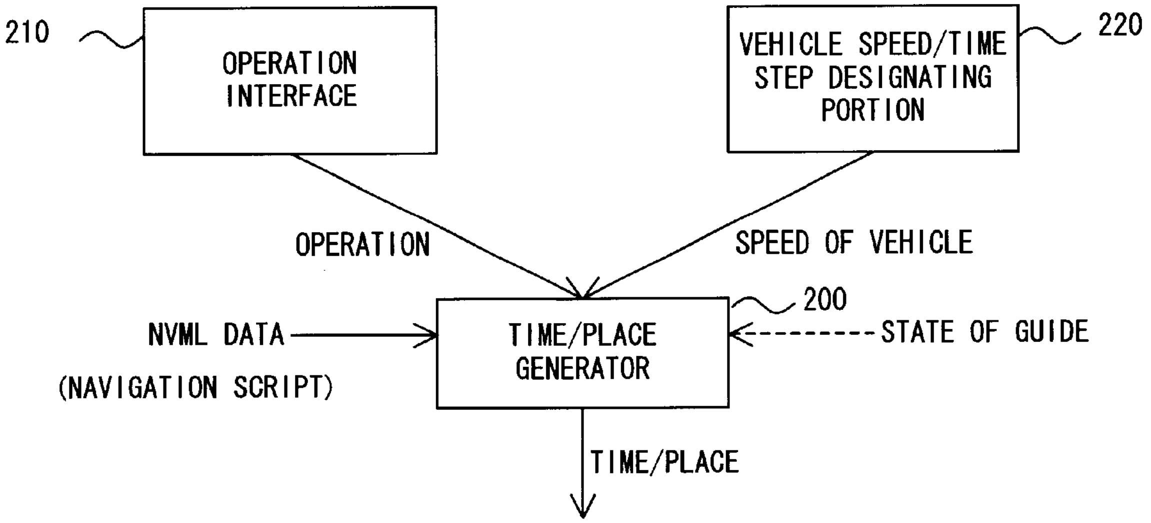
F I G. 1 2

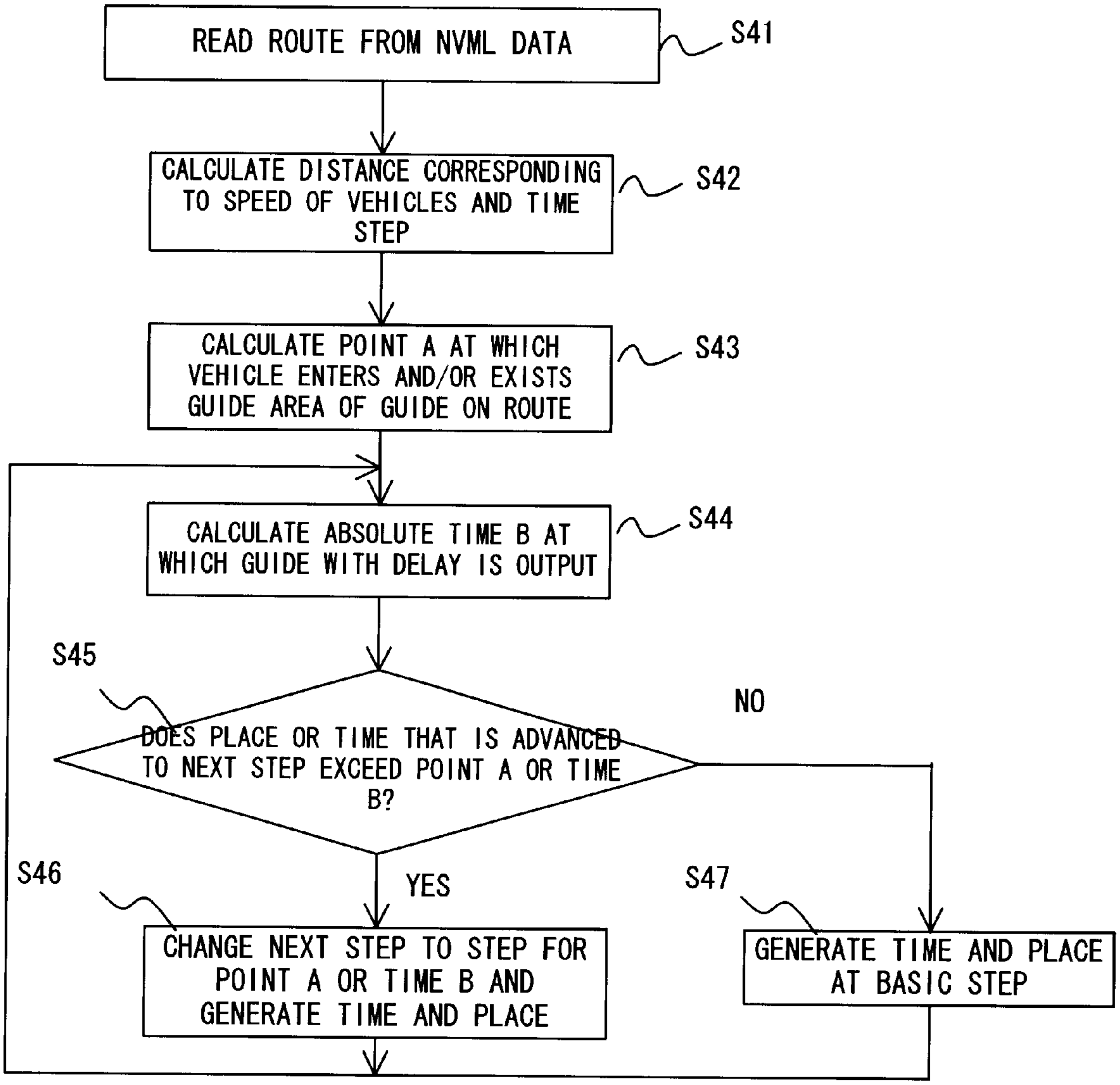
F I G. 18

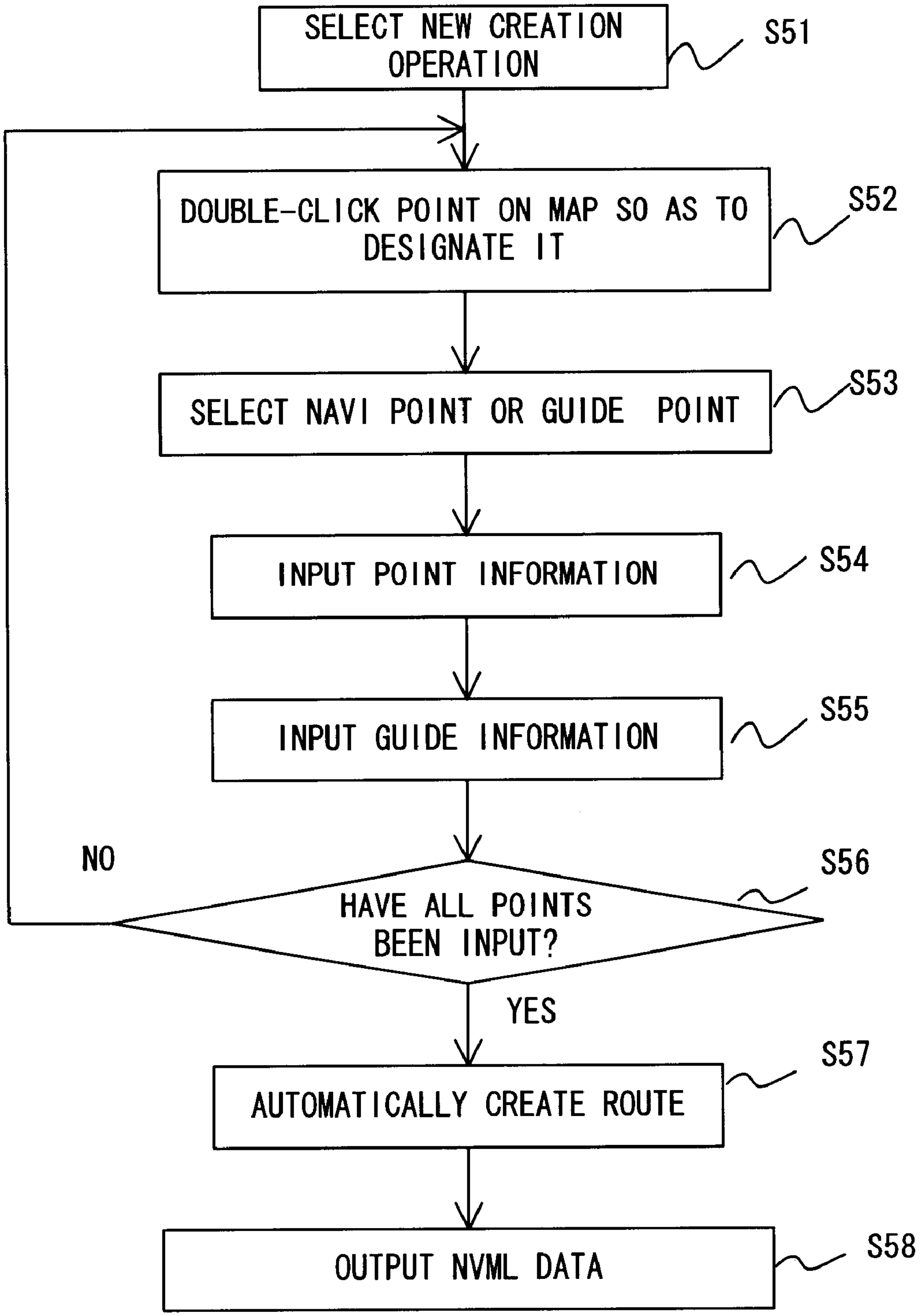
F I G. 2 7

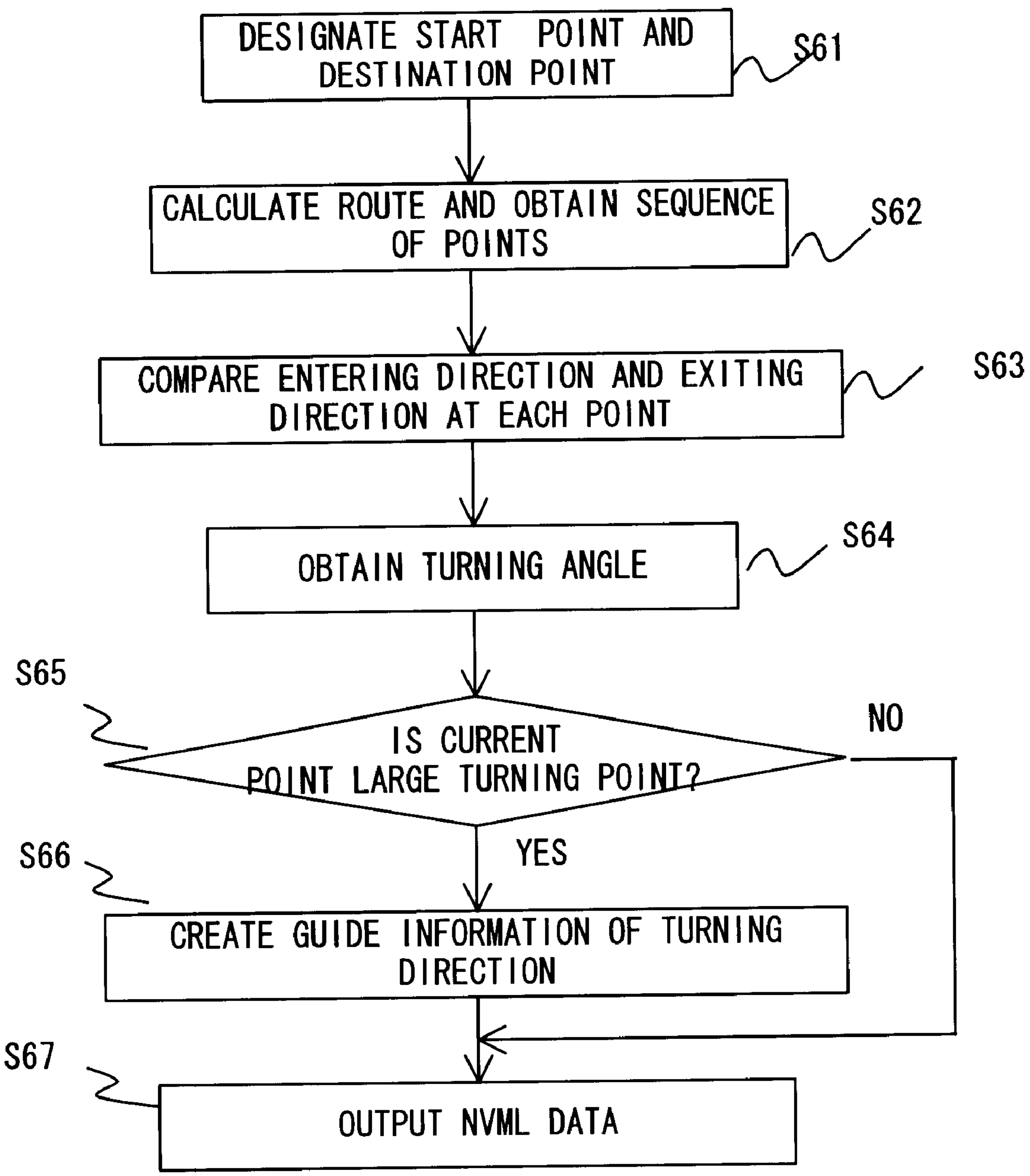
F I G. 2 8

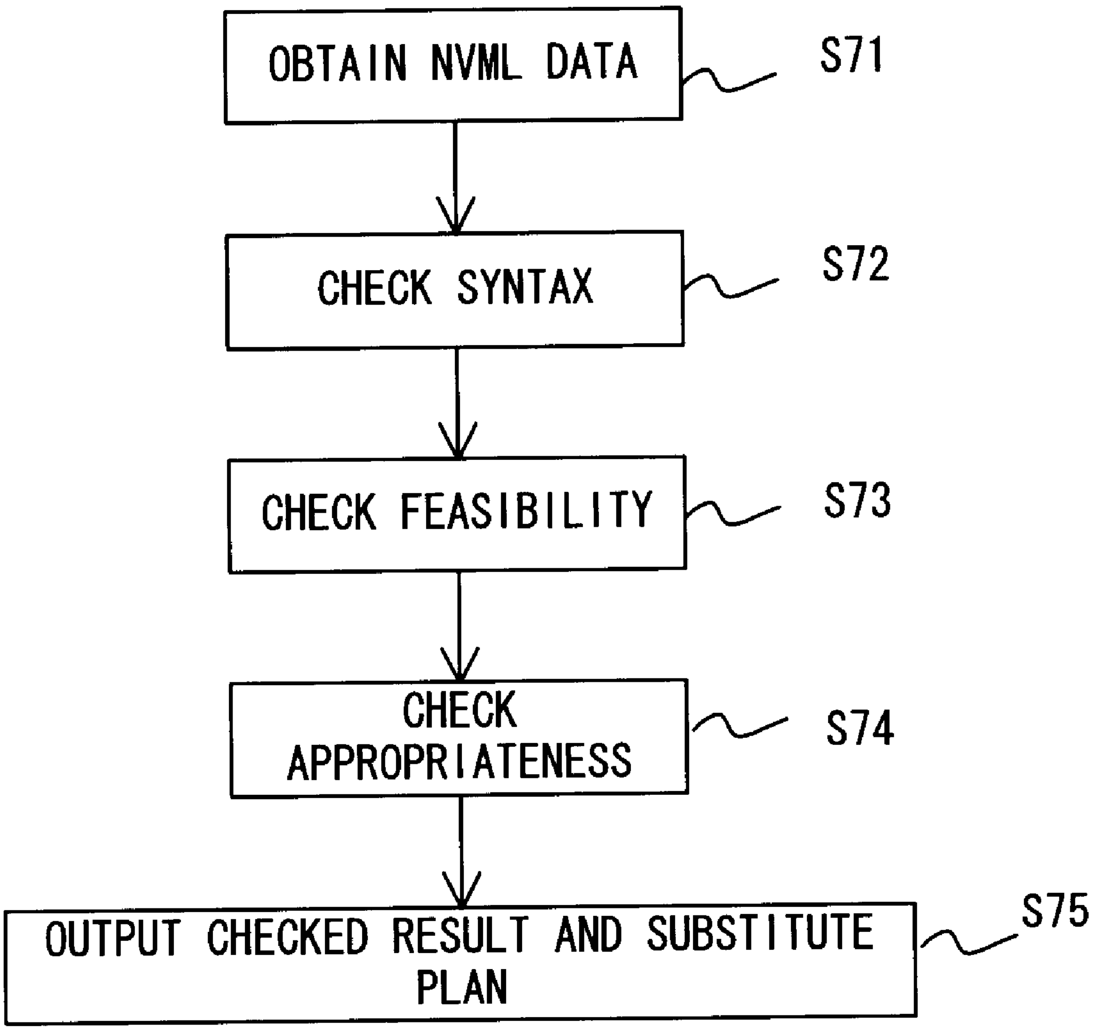
F I G. 3 5

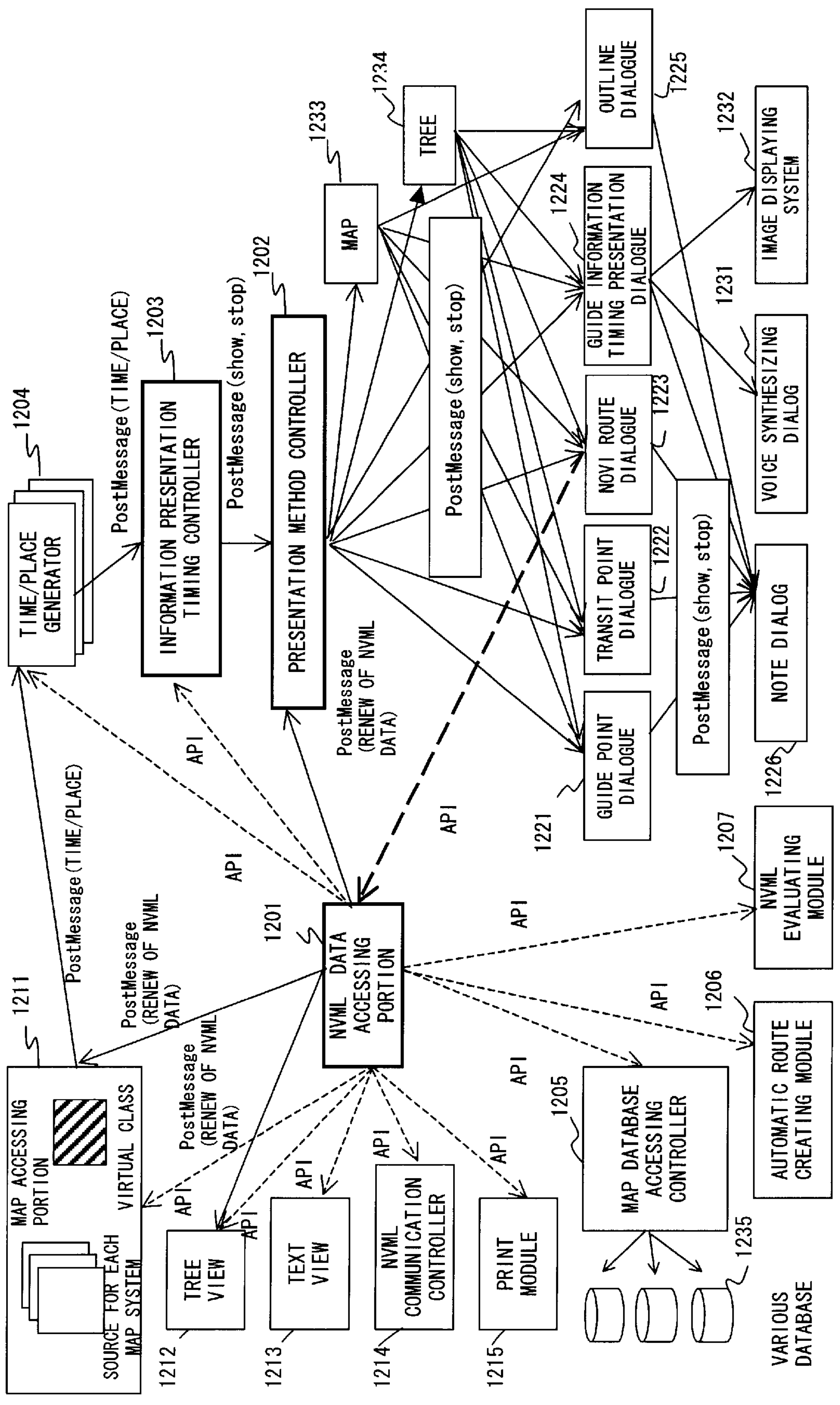
F I G. 4 1

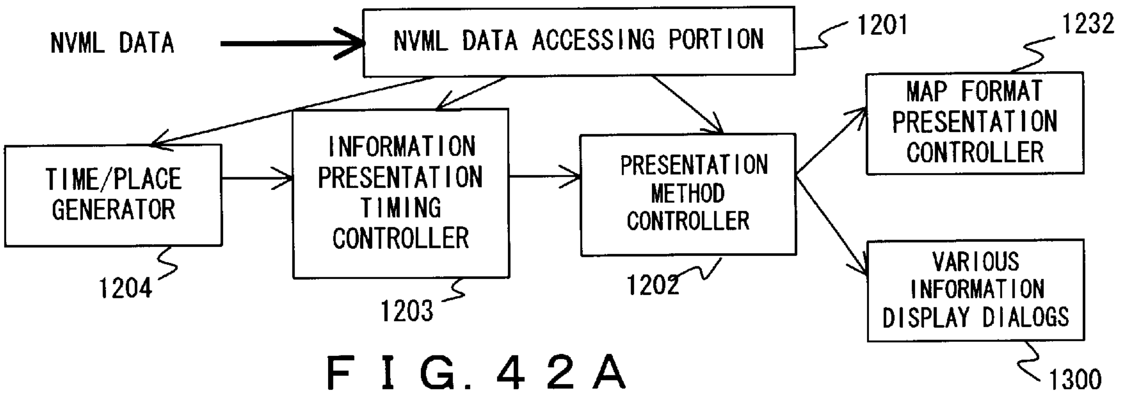
F I G. 4 2 A
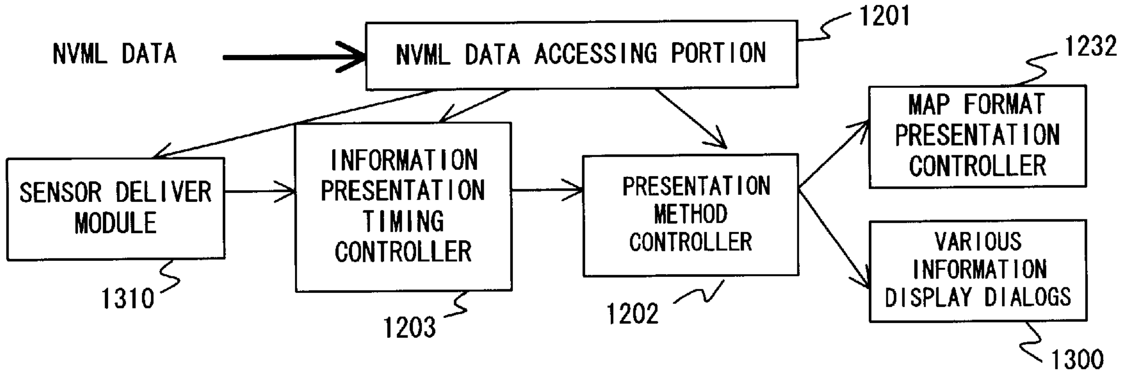
F I G. 4 2 B
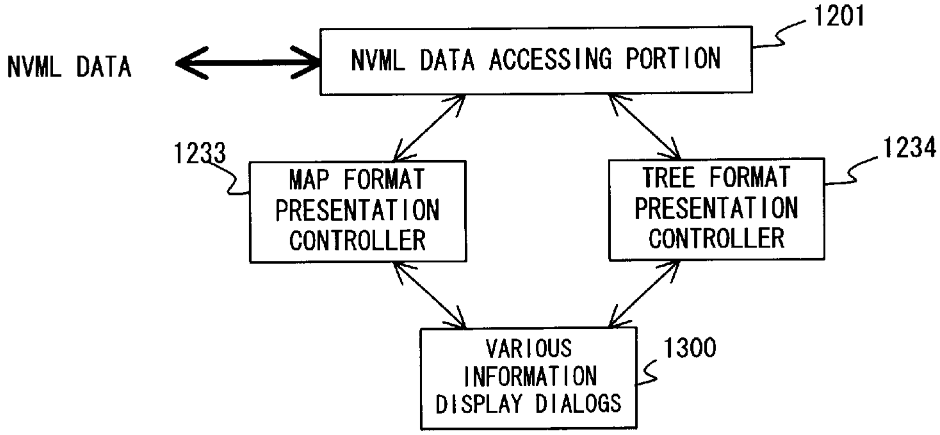
F I G. 4 2 C

NAVIGATION INFORMATION PRESENTING APPARATUS AND METHOD THEREOF

BACKGROUND OF THE INVENTION

1. Field of the Invention

The present invention relates to a navigation information presenting apparatus and its method for presenting navigation information such as a navigation service and a train transfer guide service described in a markup language, in particular, to those for use with a car navigation system, a personal computer (PC), a personal digital assistant (PDA), and a cellular phone (for example, a personal digital cellular (PDC) and a personal handy-phone system (PHS)).

In addition, the present invention relates to a navigation data processing method for presenting, creating, and presenting navigation data, in particular, to a technology for use with a car navigation system, a personal computer (PC), a personal digital assistant (PDA), a cellular phone, and a personal handy phone system (PHS) for providing various types of route information and additional information such as a navigation, a sightseeing guide, a delivery plan, a travel plan, a traffic regulation, a scheduling, an amusement, and local government service.

2. Description of the Related Art

Conventionally, when the user designates a desired destination point (destination position) to a navigation service or a train transfer service, only information about the destination point such as a point, a route, facilities, and so forth is presented. Although a technology for transmitting information at predetermined time intervals is known, a system that processes data corresponding to a condition designated by the user is not known.

In a conventional navigation information service, when the user designates a place for which he or she wants to know, data about the place is presented in a list format. The content that is presented is only information about the place (a point, a route, facilities, and so forth). Thus, the conventional navigation information service cannot flexibly present a route and transit (via) points of the designated place to the user.

In addition, conventional navigation information services provide services in their unique formats. Thus, it is difficult to use navigation information among such systems.

Conventional navigation data includes static data (such as a map, an illustration, and a moving picture) and voice navigation data used for a car navigation system. They are pre-recorded in those systems. Thus, in the related art reference, data that has been created for one system cannot be used for other systems.

In a conventional navigation data presenting method, only data corresponding to a request is output. In a conventional car navigation system, only navigation information is output at a designated place. Thus, in the car navigation system, the timing at which navigation information is presented cannot be actively controlled.

A route creating system has been used in a limited field such as delivery planning field. In such a field, a system for calculating an optimum route has been studied and developed. In other words, in such a system, the content of a guidance that is output to the user is not considered. Of course, a system that automatically creates the content of a guidance is not almost known. In addition, a system that distributes such data through a network is not known.

In such a situation, the inventers of the present invention has proposed a navigation script for describing a sequence of instructions including time information or/and point information and navigation information that is output corresponding to time information or/and point information to be presented and a system that interprets and executes the navigation script as Japanese Patent Application No. 11-113191 "Navigation information Presenting Apparatus, Navigation information Presentation Processing Method, Record Medium for Recording Navigation information Presentation Program, Record Medium for Recording Navigation script, Navigation script Generating Apparatus, Operation Managing Apparatus Using Navigation script, Method Thereof, Record Medium For Recording Program Thereof, Time Adjusting Apparatus Using Navigation script, Method Thereof, Record Medium For Recording Program Thereof, Navigation Plan Creating Apparatus, Method Thereof, Record Medium For Recording Program Thereof, Navigation information Providing Apparatus, Method Thereof, And Record Medium For Recording Program Thereof".

Thus, in addition to information of a point, a route, and facilities, a real guide and a virtual navigation can be performed along the route to a designated place. In addition to a navigation corresponding to a traveled place, a navigation corresponding to elapsed time can be performed. Moreover, a navigation can be provided in a format used by various systems and apparatuses. For example, by designating a destination, at a transit point along a route, a guide "This facility is famous for ○○". Moreover, in three minutes prior to the arrival to a destination, a guide "We will arrive at ΔΔ in 3 minutes." is presented corresponding to time and/or point at which the guide is presented. In addition, data for such navigations can be easily created and distributed.

SUMMARY OF THE INVENTION

An object of the present invention is to develop and improve the above-described technology for presenting the above-described navigation information. Another object of the present invention is to provide a presenting means that allows restrictions about time representing whether time described in time information (such as departure time, period of stay, and arrival time) is restricted at what important level, restrictions about a point representing whether a point described in point information is restricted as a transit point at what important level, and restrictions about a point representing whether a point can be omitted depending on conditions about time to be described and that outputs navigation information corresponding to the restrictions so as to flexibly present navigation information with respect to time and point.

Another object of the present invention is to provide a method for presenting navigation data at timings corresponding to situations (such as a guide that is presented in a particular range and a guide that is presented in several minutes prior to the arrival of a particular point) and effectively processing the navigation data corresponding to a user's request. Another object of the present invention is to provide a method that allows navigation data containing navigation information to be automatically created, information to be directly described in text format, and navigation data containing information about a point and a route to be effectively input.

The present invention is a navigation information presenting apparatus for presenting navigation information corresponding to a situation to a user, comprising an inputting device for inputting a navigation script including a sequence of instructions describing navigation information and restriction information according to a predetermined specification, the navigation information being output corresponding to one of time information and point information and to one of presentation time and presentation point, the restriction information corresponding to one of the time information and the point information, a situation device for obtaining one situation of a current time and a current point or generating one situation of a virtual current time and a virtual current point, an adjusting device for adjusting one of time descried in the time information and point described in the point information using the situation obtained or generated by said situation device, one of the time information and the point information, and the restriction information, an executing device for executing an instruction described in an adjusted navigation script corresponding to a situation obtained or generated by said situation device, and a presenting device for outputting navigation information corresponding to the execution of the instruction and presenting the navigation information to the user.

The major differences between the present invention and the related art reference disclosed as Japanese Patent Application 11-113191 are as follows:

According to the present invention, restriction information for time information or/and point information can be described in the navigation script.

According to the present invention, an adjusting device for adjusting one of time descried in the time information and point described in the point information using an obtained situation or a generated situation, one of the time information and the point information, and the restriction information is provided.

According to the present invention, an executing and interpreting device for executing and interpreting an instruction described in an adjusted navigation script is provided.

According to the present invention, when there is a time restriction (of which particular time or particular duration should be strictly kept) and a place restriction (of which particular place should be routed) for a business trip, a maintenance work, a sightseeing, a travel, or the like, such time restriction information and place restriction information are described in the navigation script. Using the current time or/and current point obtained or generated by the situation device and the restriction information, the time or/and point described in the time information or/and point information are adjusted. In addition, when instructions of the navigation script are executed, a proper navigation can be presented corresponding to a situation.

In addition, according to the present invention, using navigation data in an uniformed format, a general navigation can be presented.

The present invention is a navigation data processing method for interpreting and executing a navigation script that describes navigation information that is output corresponding to one of time information and point information and to one of presentation duration and a presentation point and for presenting the navigation information to a user, the navigation script being described according to a predetermined specification, the method comprising the steps of generating one timing of information presentation time and information presentation point corresponding to user's operation information for a navigation method including at least one of playback, fast forward, skip, and rewind and to one of a pre-designated traveling speed and a pre-designated time step, and presenting navigation information that matches one of time information and point information described in the navigation script corresponding to the generated timing information.

Thus, in addition to advancing time—place at predetermined steps, timings for generating time—place are generated corresponding to operation information of the user. Thus, various types of simulations can be performed.

The present invention is the navigation data processing method comprising the steps of causing the presentation of a navigation to be started when navigation information that matches one of time information and point information described in the navigation script is presented corresponding to one of timing information of generated time, timing information of generated place, measured real time, and measured real place, managing the presentation time of navigation information corresponding to attribute information of a navigation described in the navigation script, and causing the guide presentation to be stopped. Thus, the guide presentation time can be adequately controlled corresponding to attribute information of a navigation described in the navigation script. After adjusting a presentation timing corresponding to the attribute information of the navigation, the presentation timing can be adjusted depending on whether the guide is a presentation having a duration (such as a voice guide or a moving picture guide) or a presentation having no duration (such as a still picture guide or a text guide). However, according to the present invention, since the presentation timing adjustment corresponding to the attribute information is separated from the presentation timing adjustment corresponding to the guide output format, the presentation timing can be simply controlled.

The present invention is the navigation data processing method comprising the steps of determining one of the priority corresponding to a type of navigation information and the priority corresponding to an output medium in the case that output timings of a plurality of guides overlap when navigation information that matches one of time information and point information described in the navigation script corresponding to one of timing information of generated time, timing information of generated place, measured real time, and measured real place is presented to the user, and adjusting an output timing of each guide corresponding to the determined result. Thus, even if a guide for a transit point overlaps with a guide for a guide point, a guide for a more important transit point can be presented with priority.

The present invention is a navigation data processing method for interpreting and executing a navigation script that describes navigation information that is output corresponding to one of time information and point information and to one of presentation time and a presentation place and for presenting the navigation information to a user, the navigation script being described according to a predetermined specification, the method comprising the steps of checking whether or not the user arrived at one of each transit point and each guide point obtained from the navigation script, predicting the arrival time of the one point, generating schedule information about a presentation timing of navigation information described in the navigation script corresponding to the predicted arrival time, presenting the navigation information corresponding to the schedule information to the user, and correcting the schedule information corresponding to the arrival situation of the one point. Thus, even if navigation information is presented in several minutes prior to the arrival to a particular transit point, the guide can be presented at exactly predicted time.

The present invention is the navigation data processing method comprising the steps of when the number of output times of navigation information has been designated to navigation information described in the navigation script, outputting the navigation information whenever the user enters the predetermined area and decrementing the number of output times by 1, and when the number of output times becomes 0, preventing the navigation information from being output even if the user enters the designated area. Thus, even in a route of which the user frequently enters and exit a particular area, navigation information can be output a predetermined number of times.

The present invention is the navigation data processing method comprising the steps of presenting navigation information that matches one of time information and point information described in the navigation script corresponding to one of timing information of generated time, timing information of generated place, measured real time, and measured real place to the user, and presenting one of a predetermined advertisement and other general information, while no navigation information is being output. Thus, when necessary, navigation information is output. When not necessary, other types of information (such as advertisements) are output. Thus, guides may be expected to be presented free of charge.

The present invention is the navigation data processing method comprising the steps of when navigation information that matches one of time information and point information described in the navigation script corresponding to one of timing information of generated time, timing information of generated place, measured real time, and measured real place is presented to the user, in the case that navigation information that is presented is one of three-dimensional contents and a moving picture, synchronizing one of a display format of the three-dimensional contents and a traveling speed of the moving picture with one of a virtual traveling distance and a real traveling distance, and controlling a view point of an object that is displayed corresponding to the synchronized result. Thus, as a vehicle travels, three-dimensional contents and a moving picture like a scene through a window of the vehicle can be displayed.

The present invention is the navigation data processing method comprising the steps of inputting a reverse reproduction command issued by the user, automatically converting the relation of left and right and the relation of front and rear of navigation information in one of a text format and a voice format described in the navigation script corresponding to the input command, and presenting the converted navigation information to the user. Thus, when a route is navigated in the reverse direction from the destination to the start point, the user can have a comfortable navigation.

The present invention is the navigation data processing method comprising the steps of presenting a navigation route corresponding to the navigation script in a map format to the user, presenting the navigation route in a tree format to the user, in the tree format, at least either transit points and guide points being nodes, and moving the presentation in the map format and the tree format corresponding to one of a user's input that designates a node in the tree format and an execution of the navigation script to one of a point corresponding to the designated node and a point that the user arrived corresponding to the execution of the navigation script. Thus, the user can select a particular transit point or a particular guide point in the tree format and easily check navigation information of the selected point. In addition, when a simulation of a navigation script is performed or a real navigation is performed, the simulation or the navigation can be performed in the map format or the tree format.

The present invention is the navigation data processing method comprising the steps of presenting a navigation route corresponding to the navigation script in a hierarchical tree format to the user, the hierarchical tree format corresponding to a detail level, at least one of transit points or guide points being a node of the hierarchical tree format, and displaying a lower hierarchical level of the hierarchical tree format for the current point and a higher hierarchical level of the hierarchical tree format for a portion apart form the current point. Thus, even if the size of a display screen is narrow, the user can browse all the route. Moreover, in the vicinity of the current point, detail information can be obtained. At that point, when a guide is presented in the text format, as the vehicle travels, the font of the characters of the guide may be increased. Alternatively, the color of the characters may be changed. Consequently, the current point can be emphasized.

The present invention is the navigation data processing method comprising the steps of presenting a navigation route corresponding to the navigation script in a map format, displaying at least one of transit points or guide points on a navigation route corresponding to the navigation script in the presentation of the map format with a pin shaped icon, and displaying a plurality of pin shaped icons so that they do not overlap in such a manner that at least one of the pin shaped icons is varied. Thus, the user can browse a transit point or a guide point corresponding to an output of navigation information. Even if there are many transit points and guide points in a narrow area, the user can easily identify them.

The present invention is the navigation data processing method comprising the steps of checking whether or not the navigation script corresponds to the predetermined specification, performing at least one of a feasibility check and a appropriateness check for the navigation script, and outputting a substitute corresponding to the check results. By evaluating the feasibility and appropriateness of the navigation script, a navigation that is neither feasible nor appropriate can be prevented from being presented in advance.

The present invention is the navigation data processing method comprising the steps of presenting a navigation route of the navigation script that is created in one of a map format and a tree format, when at least one of a new transit point and a new guide point is designated for presenting the navigation route, inserting the designated point at a position of which the total distance of the navigation route becomes short, and creating or editing the navigation script that is created corresponding to the inserted point. Thus, even if a plurality of transit points are designated at random, a navigation script that allows a navigation for the shortest distance to be automatically presented can be created.

The present invention is the navigation data processing method comprising the steps of presenting a navigation route of the navigation script that is created in one of a map format and a tree format, inputting a command for at least one of a transit point and a guide point for presenting a navigation route, determining a navigation route corresponding to information of the point corresponding to the input command, automatically creating navigation information of a turning direction corresponding to a route calculation, and creating or editing the navigation script that is created corresponding to the determined navigation route and the automatically created navigation information. Thus, even if only a start point and a destination point are input, a navigation script that allows a guide point as a landmark and navigation information thereof to be added for a straightforward route navigation can be created.

The present invention is the navigation data processing method comprising the steps of presenting a navigation route of the navigation script that is created in one of a map format and a tree format, inputting a command for at least one of a transit point and a guide point for presenting a navigation route, determining a navigation route corresponding to information of the point corresponding to the input command, combining pre-provided image templates of an intersection and an arrow for an intersection of the navigation route and automatically creating navigation information of an image that is output at the intersection, and creating or editing the navigation script that is created corresponding to the determined navigation route and the automatically created navigation information. Thus, even if an image of an intersection is not prepared, a navigation script for a route guide that prevents the user from getting lost at an intersection can be easily created.

The present invention is the navigation data processing method comprising the steps of causing a server device to interpret and execute to the navigation script corresponding to the position of a terminal unit that presents navigation information, transmitting navigation information corresponding to an executed result of the navigation script from the server device to the terminal unit, and when the transmitted navigation information contains identification information of a predetermined template, causing the terminal unit to combine navigation information using a template corresponding to the identification information. Thus, even if a simple portable information terminal unit (PDA) is used, the amount of data transmitted from the server device can be reduced. Consequently, the load of the transmission can be reduced.

The present invention is the navigation data processing method comprising the steps of preparing parts of a module for generating one of virtual time and a virtual place, a module for controlling a timing for a presentation of navigation information corresponding to one of virtual time, real time, a virtual place, and a real place, a module for controlling a presenting method for the navigation information corresponding to one of a terminal unit of the user and an output medium at the timing controlled by the controlling module, a module for controlling a data communication, a module for controlling a presentation of navigation data in a tree format, a module for controlling a presentation of data in a map format, a module for controlling a presentation of data in a text format, and a module for controlling a dialog for designating various guides, and combining any number of parts so as to create one of a navigation script creating application, a navigation script executing application, and a navigation script simulating application. Thus, a system that creates and executes a navigation script can be easily accomplished.

A program that causes a computer to perform each process can be stored to a proper record medium from which the computer can read the program (for example, a portable medium memory, a semiconductor memory, or a hard disk).

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1A is a block diagram showing an example of the structure of a first system according to the present invention;

FIG. 1B is a flow chart showing a restriction adjusting process performed in interpreting a navigation script;

FIG. 1C is a schematic diagram showing an example of a correction of a designation of an "importance" attribute of a "time" tag;

FIG. 1D is a first part of a flow chart of the restriction adjusting process used in executing a navigation script;

FIG. 1E is a second part of the flow chart shown in FIG. 1D;

FIG. 2B is a schematic diagram showing an example of the structure of an information presentation timing controlling portion;

FIG. 4 is a flow chart showing a guide presenting process;

FIG. 6 is a schematic diagram for explaining a correction of predicted arrival time;

FIG. 8 is a schematic diagram showing an example of a designation of priority in the case that two guide presentations overlap;

FIG. 12 is a block diagram showing an example of the structure of a time—plate generation processing portion;

FIG. 18 is a flow chart showing a time—place generating process;

FIG. 27 is a flow chart showing an NVML data creating process;

FIG. 28 is a flow chart showing an automatic guide creating process;

FIG. 35 is a flow chart showing a navigation data evaluating process;

FIG. 41 is a block diagram showing the relation among means that accomplish the present invention;

FIG. 42A is a block diagram showing a first accomplished example of an application program;

FIG. 42B is a block diagram showing a second accomplished example of the application program; and FIG. 42C is a block diagram showing a third accomplished example of the application program.

DESCRIPTION OF PREFERRED EMBODIMENT

[Outline of Navigation Script]

Figure 1F:
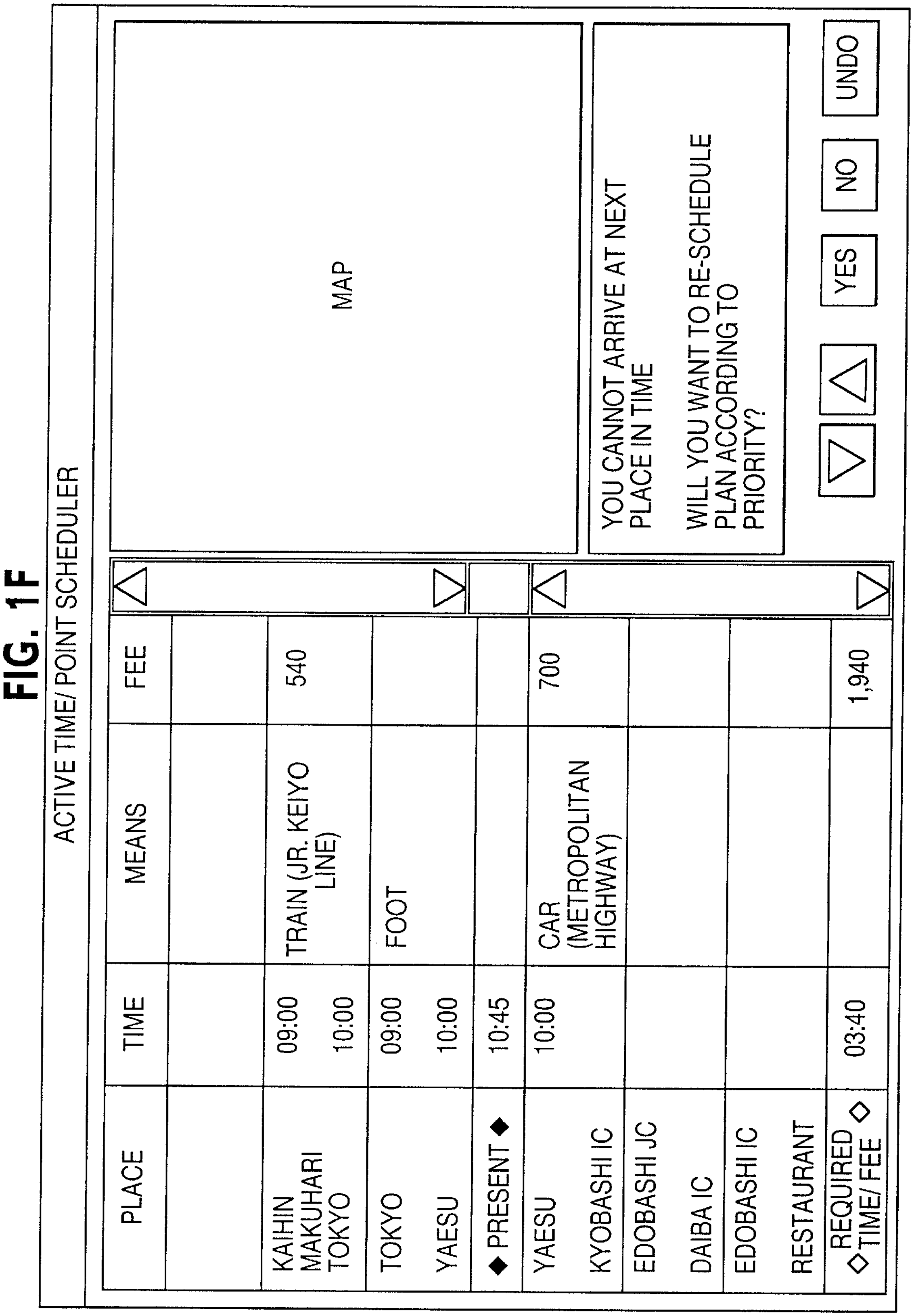
FIG. 1F is a schematic diagram showing an example of a display screen of a terminal unit.

According to the present invention, a sequence of instructions of data of time, point, and navigation information (text data, picture data, voice data, and so forth) recorded in various formats is described in a description format of a markup language.

An instruction is a unit of a script of which navigation information including time (for example, departure time, transit time, arrival time, start time, and end time), point (for example, start point, transit point, destination point, intersection, transfer point, and point of facility), and one shot and part of various medium data (a map, characters, voice, music, a still picture, and a moving picture) is treated as a structural element. An instruction is for example "At the point A on a particular course, voice data "aaa.wav" and picture data "xxx.jpg" for explaining the point A are output".

According to the present invention, a sequence of such instructions described in a markup language such as XML (extensible Markup Language) is referred to as navigation script (or navi script or NVML (Navigation Markup Language)).

A navigation script that will be described with reference to the following examples is defined as a sub set of the extensible markup language XML (extensible Markup Language) that has been standardized in W3C (World Wide Web Consortium). Next, the navigation script language will be described in brief.

A navigation script is composed of a tag, an attribute, and a content. A navigation script is described as with a real example (example-04_06.nav) of a navigation script that will be described later. In the example, an element bracketed with "<" and ">" (such as <naviscript version="0.3">, </naviscript>, <title> and </title>) is referred to as tag. A tag that does not start with "</" is referred to as start tag, whereas a tag that starts with "</" is referred to as end tag. A start tag and an end tag are used in pair (such as a pair of <naviscript version="0.3"> and </naviscript> and a pair of <title> and </title>). Such a pair is referred to as tag set.

"version" of <naviscript version="0.3"> is referred to as attribute of tag. "0.3" of <naviscript version=0.3> is referred to as value of attribute.

A navigation script is described with a hierarchical structure of tag sets as pairs of tags. When there is no tag set between a pair of a start tag and an end tag, the portion surround by the pair is referred to as content of tag.

Now, it is assumed that there is the following navigation script.

```
<inst>
<time>○</time>
<info>□</info>
</inst>
```

In the navigation script, the portion (○) surrounded by <time> and </time> between <inst> and </inst> and the portion (□) surrounded by <info> and </info> represent that "The navigation information of □ is output at the time of ○".

```
<inst>
<point>○</point>
<info>□</info>
</inst>
```

In such a navigation script, the portion (○) surrounded by <inst> and </inst> and the portion (□) surrounded by <info> and </info> represent that "The navigation information of □ is output at the point of ○".

As will be explained later, in the description of tags of <time> and <point>, restriction information using attributes such as "importance=high" and "importance=low" can be described. With the restriction information, time and point can be automatically adjusted.

[Example of Structure of Apparatus]

Next, a first system according to the present invention will be described.

FIG. 1A is a block diagram showing the structure of the first system according to the present invention.

A navigation script is stored to an external server device or the like and read to a terminal unit 1 through a network 3. Alternatively, a navigation script is recorded on various types of mediums such as a magnetic disc and a CD-ROM and read to the terminal unit 1. Alternatively, the user of the terminal unit 1 may directly input a navigation script.

An operation inputting portion 1*a* of the terminal unit 1 selects one from many navigation scripts managed by the external server device corresponding to a user's operation. Alternatively, the operation inputting portion 1*a* selects one of many navigation scripts stored in various types of mediums 4 through a medium accessing portion 1*c* corresponding to a user's operation. The operation inputting portion 1*a* inputs the selected navigation script to a script converting portion 1*d*. Alternatively, a navigation script that is input by the user with the operation inputting portion 1*a* may be directly supplied to a script converting portion 1*d*.

The script converting portion 1*d* analyzes the syntax of the navigation script and converts the navigation script into navigation structured data. Since the navigation structured data is substantially equivalent to the navigation script, the converting process of the script converting portion 1*d* is not always required.

When the user is using a navigation script while he or she is traveling (namely, in a navigation mode), an instruction executing portion 1*e* obtains the current state of the user (for example, the current time and the current point) from a state obtaining portion 1*f*, complements the route information of the navigation structured data, and outputs navigation information corresponding to the resultant navigation structured data from a guide outputting portion 1*i*. The current point is obtained by the state obtaining portion 1*f* by using for example a GPS (Global Positioning System). When two points are given by a navigation script, the route thereof can be obtained by using a known route searching technology used in a car navigation system with map information stored in for example a database portion 2.

When the user uses a navigation script in a virtual situation (referred to as simulation mode), the instruction executing portion 1*e* obtains a virtual current time or a virtual current point from a situation generating portion 1*g*, complements the route information of the navigation structured data, and outputs a guide from the guide outputting portion 1*i*. The virtual current time may be start time and a time step width designated by the user. Alternatively, the virtual current time may be generated corresponding to a time step width, a condition, and so forth designated in the system. On the other hand, the virtual current point (point information that represents the current point) may be automatically generated depending on how virtual current time elapses such as the speed of a vehicle described in a navigation script or a traveling speed designated by the user.

The navigation mode or the simulation mode is selected corresponding to an input signal of the operation inputting portion 1*a*.

A restriction adjusting portion 1*h* adjusts time and place by correcting time information and point information corresponding predetermined adjustment conditions using to the current time and the current point obtained from the state obtaining portion 1*f* and the situation generating portion 1*g*, the time information and the point information of the navigation structured data, and the restriction information thereof.

Now, it is assumed that there is a navigation script for a course of a ○○ tour "from Tokyo Station to Rainbow Bridge through Kyobashi Interchange (IC)" and the navigation script describes the following instructions.

(1) Voice data "We are at Tokyo Station." is output at Tokyo Station.

(2) 2 seconds later, voice data "Welcome to ○○ Tour." is output. In addition, picture data of an outline of the tour is displayed.

(3) Voice data "We are passing through Kyobashi IC." is output at Kyobashi IC.

(4) In 3 km prior to Rainbow Bridge, voice data "We will soon arrive at Rainbow Bridge" is output.

(5) Voice data "We arrived at Rainbow Bridge." is output at Rainbow Bridge.

Corresponding to a user's command, the operation inputting portion 1*a* reads the navigation script from a navigation script management center through the network 3 and starts executing the navigation script. At that time, the script converting portion id converts the navigation script into navigation structured data. The instruction executing portion 1*e* extracts descriptions about points and a route contained in the instructions from the navigation structured data and references the database portion 2 that contains map information and so forth so as to display an outline of the course. Thereafter, the instruction executing portion 1*e* obtains the current point of the user and the current time from the state obtaining portion 1*f* using the GPS or the like and executes the instructions. Thus, when the user is at Tokyo Station, the guide outputting portion 1*i* outputs a voice guide "We are at Tokyo Station". 2 minutes later, the guide outputting portion 1*i* outputs a voice guide "Welcome to ○○ Tour". In addition, the guide outputting portion 1*i* displays picture data of an outline of the tour. At Kyobashi IC, the guide outputting portion 1*i* outputs a voice guide "We are passing through Kyobashi IC". In 3 km prior to Rainbow Bridge, the guide outputting portion 1*i* outputs a voice guide "We will soon arrive at Rainbow Bridge". When the vehicle arrived at Rainbow Bridge, the guide outputting portion 1*i* outputs a voice guide "We arrived at Rainbow Bridge". Thus, the user can be adequately guided while he or she is traveling along the course of the ○○ Tour.

As with a conventional markup language, a navigation script can be easily read, written, searched, and processed. Thus, the creator of a navigation script can easily know the meaning of data thereof and the sequence of instructions corresponding to the sequences of guides.

With a navigation script, instructions can be for example re-arranged, sequentially arranged (in series), arranged in parallel, and optimized. In addition, instructions can be structured (as a hierarchy or a group). Thus, various guides about time and point can be presented. Consequently, navigation information can be easily created and corrected.

In addition, a navigation script obtained from a center or the like that provides many navigation scripts can be converted into navigation structured data corresponding to the user's terminal unit. Thus, one navigation script can be used in various apparatuses and systems.

On the other hand, it is clear that guides are presented to the user corresponding to a sequence of instructions (time sequence or/and point sequence). Thus, guides suitable in the situation can be obtained at proper timings. In the navigation mode, navigation information can be obtained corresponding to real positions. Moreover, in the simulation mode, navigation information can be obtained corresponding to virtual positions.

A navigation script can be easily created and edited using a conventional text editor. A created navigation script can be registered to the center or the like. In such a case, anyone can use navigation information through a network or the like at any place.

[Outline of Process of Restriction Adjusting Portion]

Next, with reference to FIGS. 1B, 1C, 1D, and 1E, the process and the operation algorithm of the restriction adjusting portion 1*h* that is the most important portion of the structure shown in FIG. 1A will be described. As an important point in the process of the restriction adjusting portion 1*h*, when a navigation script (navigation structured data) is interpreted, if there is a contradiction in time or/and point described in the time information or/and point information of the navigation script, the restriction adjusting portion 1*h* adjusts the time and the point corresponding to the description of the restriction information referred to as "importance" so as to solve the contradiction. In addition, when guides of a navigation script are executed, if it is difficult or impossible to output the guides corresponding to the schedule described in the navigation script, the restriction adjusting portion 1*h* automatically adjusts the schedule by issuing a guide representing that the departure time of a particular point is delayed or a particular transit point is omitted.

(a) Restriction Adjusting Process in Interpreting Navigation Script

FIG. 1B is a flow chart showing the restriction adjusting process performed in interpreting a navigation script. When a navigation script (navigation structured data) is interpreted, if the arrival time, period of stay, and departure time have a contradiction (at step P1) (namely, three of arrival time, period of stay, and departure time at a particular point have been designated and the relation of (departure time−arrival time≠period of stay) takes place, the restriction adjusting portion 1*h* corrects one of arrival time, period of stay, and departure time (at step P2). FIG. 1C shows an example of the correcting process corresponding to the designation of the "importance" attribute of the "time" tag.

(1) When the navigation structured data has been designated as follows:

arrive-time=11:00 period-of-stay=2 hours departure-time=14:00 since the relation of departure time d—arrival time a=period of stay p does not take place, a contradiction takes place. In that case, since neither the arrival time a (arrive-time), nor the period of stay p (period-of-stay), nor the departure time d (departure-time) have not been designated "time.importance=high", the restriction adjusting portion 1*h* corrects only the period of stay p rather than the arrival time a and the departure time d as:

period-of-stay:=3 hours (2) When the navigation structured data has been designated as follows:

arrive-time=11:00 period-of-stay=2 hours departure-time=14:00 departure-time.importance=high since the departure time d has been designated "time.importance =high", the restriction adjusting portion 1*h* corrects the period of stay p rather than the arrival time a and the departure time d as:

period-of-stay:=3 hours (3) When the navigation structured data has been designated as follows:

arrive-time=11:00 period-of-stay=2 hours departure-time=14:00 period-of-stay.importance=high since the period of stay p has been designated "time.importance =high", the restriction adjusting portion 1*h* corrects the departure time d as d=a+p rather than the arrival time a and the period of stay p as follows:

departure-time:=13:00

(4) When the navigation structured data has been designated as follows:

arrive-time=11:00 period-of-stay=2 hours departure-time=14:00 arrive-time.importance=high since the arrival time a has been designated "time.importance=high", the restriction adjusting portion 1*h* corrects the period of stay p as p=d a rather than the arrival time a and the departure time d as follows:

period-of-stay:=3 hours (5) When the navigation structured data has been designated as follows:

arrive-time=11:00 period-of-stay=2 hours departure-time=14:00 period-of-stay.importance=high departure-time.importance=high since the period of stay p and the departure time d have been designated "period-of-stay.importance=high" and "departure-time.importance =high", respectively, the restriction adjusting portion 1*h* corrects the arrival time a as a=d−p rather than the period of stay p and the departure time d as follows:

arrive-time:=12:00

(6) When the navigation structured data has been designated as follows:

arrive-time=11:00 period-of-stay=2 hours departure-time=14:00 arrive-time.importance=high departure-time.importance=high since the arrival time a and the departure time d have been designated "arrive-time.importance=high" and "departure-time.importance=high", respectively, the restriction adjusting portion 1*h* corrects the period of stay p as p=d−a rather than the arrival time a and the departure time d as follows:

period-of-stay:=3 hours (7) When the navigation structured data has been designated as follows:

arrive-time=11:00 period-of-stay=2 hours departure-time=14:00 arrive-time.importance=high period-of-stay.importance=high since the arrival time a and the period of stay p have been designated "arrive-time.importance=high" and "period-of-stay.importance=high", respectively, the restriction adjusting portion 1*h* corrects the departure time d as d=a+p rather than the arrival time a and the period of stay p as follows:

departure-time:=13:00

(8) When the navigation structured data has been designated as follows:

arrive-time=11:00 period-of-stay=2 hours departure-time=14:00 arrive-time.importance=high period-of-stay.importance=high departure-time.importance=high since the arrival time a, the period of stay p, and the departure time d have been designated "arrive-time.importance=high", "period-of-stay.importance=high", and "departure-time.importance=high", respectively, the restriction adjusting portion 1*h* corrects the period of stay p as p=d−a rather than the arrival time a and the departure time d as follows:

period-of-stay:=3 hours (b) Restriction Adjusting Process in Executing Navigation Script FIGS. 1D and 1E are flow charts showing a restriction adjusting process performed in executing a navigation script.

When a navigation script is executed, the restriction adjusting portion 1*h* compares the current time and the current point obtained from the state obtaining portion 1*f* or the situation generating portion 1*g* with the time information and the point information of the navigation structured data. When there is a margin against the arrival time (arrive-time) of the next point (point), the restriction adjusting portion 1*h* performs the following process.

(1) When the navigation structured data has been designated "departure-time.importance=low" and "period-of-stay.importance=low/high" (at step P11), the restriction adjusting portion 1*h* subtracts the margin from the "departure-time" or adds the margin to the "period-of-stay" (at step P12). When the navigation structured data has been designated as follows:

arrive-time=11:00 period-of-stay=3 hours departure-time=14:00 if the vehicle arrived at 10:00, there is a margin of 1 hour. In that case, the restriction adjusting portion 1*h* corrects the departure time d as follows:

departure-time:=14:00−1 hour=13:00

Alternatively, the restriction adjusting portion 1*h* correct the period of stay as follows:

period-of-stay:=3 hours+1 hour=4 hours

The restriction adjusting portion 1*h* can correct either the departure time or the period of stay corresponding to a predetermined rule or a user's preference.

(2) When the navigation structured data has been designated "departure-time.importance=high" and "period-of-stay.importance=low/high" (at step P13), the restriction adjusting portion 1*h* adds the margin to the "period-of-stay" (at step P14). When the navigation structured data has been designated as follows:

arrive-time=11:00 period-of-stay=3 hours departure-time=14:00 if the vehicle arrived at 10:00, since there is a margin of 1 hour, the restriction adjusting portion 1*h* corrects the period of stay p as follows:

period-of-stay:=3 hours+1 hour=4 hours

When the navigation script is executed, the restriction adjusting portion 1*h* compares the current time and the current point obtained from the state obtaining portion if or the situation generating portion 1*g* with the time information and the point information of the navigation structured data. When there is a delay against the "arrivetime" of the next "point", the restriction adjusting portion 1*h* performs the following process.

(1) When the navigation structured data has been designated "departure-time.importance=low" and "period-of-stay.importance=low" (at step P21), the restriction adjusting portion 1*h* adds the delay to the "departure-time" or if possible subtracts the delay from the "period-of-stay" (at step P22). When the navigation structured data has been designated as follows:

arrive-time=11:00 period-of-stay=3 hours departure-time=14:00 if the vehicle arrived at 12:00, since there is a delay of 1 hour, the restriction adjusting portion 1*h* corrects the "departure-time" as follows:

departure-time:=14:00+1 hour=15:00

Alternatively, the restriction adjusting portion 1*h* corrects the "period-of-stay" as follows:

period-of-stay:=3 hours−1 hour=2 hours

When the vehicle arrived at 15:00, since there is a delay of 4 hours, the restriction adjusting portion 1*h* corrects the "departure-time" as follows:

departure-time:=14:00+4 hours=18:00

Alternatively, the restriction adjusting portion 1*h* corrects the "period-of-stay" and the "departure-time" as follows:

period-of-stay:=3 hours−3 hours=0 hours departure-time:=14:00+1 hour=15:00

When the navigation structured data has been designated "departure-time.importance =low" and "period-of-stay: importance =high", respectively (at step P23), the restriction adjusting portion 1*h* adds the delay to the "departure-time" (at step P24). When the navigation structured data has been designated as follows:

arrive-time=11:00 period-of-stay=3 hours departure-time=14:00 if the vehicle arrived at 12:00, since there is a delay of 1 hour, the restriction adjusting portion 1*h* corrects the "departure-time" as follows:

departure-time:=14:00+1 hour=15:00

When the navigation structured data has been designated "departure-time.importance=high" and "point.importance=low" (at step P25), the restriction adjusting portion 1*h* subtracts the delay from the "period-of-stay" if possible, adds the delay to the "departure-time", or omits the passage of the point (at step P26). When the navigation structured data has been designated as follows:

arrive-time=11:00 period-of-stay=3 hours departure-time=14:00 if the vehicle arrived at 12:00, since there is a delay of 1 hour, the restriction adjusting portion 1*h* corrects the "period-of-stay" as follows:

period-of-stay:=3 hours−1 hour=2 hours

Alternatively, the restriction adjusting portion 1*h* omits the passage of the point.

If the vehicle arrived at 15:00, since there is a delay of 4 hours, the restriction adjusting portion 1*h* corrects the navigation structured data as follows:

period-of-stay:=3 hours−3 hours=0 hour departure-time:=14:00+1 hour=15:00

Alternatively, the restriction adjusting portion 1*h* omits the passage of the point.

(4) When the navigation structured data has been designated "departure-time.importance=high" and "point.importance=high", respectively (at step P27), the restriction adjusting portion 1*h* subtracts the delay from "period-of-stay" if possible and adds the delay to the "departure-time" (at step P28). When the navigation structured data has been designated as follows:

arrive-time=11:00 period-of-stay=3 hours departure-time=14:00 if the vehicle arrived at 12:00, since there is a delay of 1 hour, the restriction adjusting portion 1*h* corrects the navigation structured data as follows:

period-of-stay:=3 hours−1 hour=2 hours

In addition, if the vehicle arrived at 15:00, since there is a delay of 4 hours, the restriction adjusting portion 1*h* corrects the navigation structured data as follows:

period-of-stay:=3 hours−3 hours=0 hour departure-time:=14:00+1 hour=15:00

In the above-described examples, there are two values “high” and “low” of the “importance” attribute. However, it should be noted that restriction information may have multiple values that are more than three.

FIG. 1F shows an example of a display screen of the terminal unit 1. On the display screen, destination places corresponding to a schedule, schedule arrival time thereof, traveling means, and a map appear. In addition, on the display screen, the current point of the user. The display screen show that in a traveling schedule of Rainbow Tour that starts from Kaihin Makuhari Station, the user is walking from Tokyo Station to Yaesu. The display screen also shows the current time. In the case, although the user is scheduled to depart by car from Yaesu at 10:30, at the present time (10:45), it is clear that the user cannot arrive there in time. Thus, the display screen shows a message “Your will not arrive at the next place in time. Do you want to re-schedule the plan corresponding to the priority ?”. When the user inputs “Yes”, the terminal unit 1 performs the above-described time adjusting process corresponding to restriction information described in a navigation script.

[Real Example of Navigation Script]

Next, a real example of a navigation script will be described. Details of the specifications of tags will be described later.

```
<naviscript version=0.3>
<title> Rainbow Town Tour </title>
<version> example-04_06 </version>
<copyright> All Rights Reserved, Copyright (C) Fujitsu Laboratories Ltd. 1999. </copyright>
<navi>
<title> Rainbow Town </title>
<author> Fujitsu Tourists Company </author>
<date> 99/10/10 </date>
<duration> 3 hours 40 min </duration>
<distance> 95.0 km </distance>
<cost> 1940 yen </cost>
<par>
<seq>
<inst ref=“inst-info—Introduction”> </inst>
<inst ref=“inst-point—Kaihin Makuhari Station”> </inst>
<inst ref=“inst-point—Tokyo Station”> </inst>
<inst ref=“inst-point—Yaesu Central Entrance, Tokyo Station”> </inst>
<inst ref=“inst-point—Kyobashi IC”> </inst>
<inst ref=“inst-info—Rainbow Bridge—Guide 1”> </inst>
<inst ref=“inst-info—Rainbow Bridge—Guide 2”> </inst>
<inst ref=“inst-point—Edobashi JC”> </inst>
<inst ref=“inst-point—Daiba IC”> </inst>
<inst ref=“inst-object—restaurant”> </inst>
<inst ref=“inst-object—cafe”> </inst>
<inst ref=“inst-point—Tukitsutsumi”> </inst>
<inst ref=“inst-object—Fuji San Television”> </inst>
<inst ref=“inst-point—Yaesu Central Entrance, Tokyo Station”> </inst>
<inst ref=“inst-info—End Message”> </inst>
</seq>
<seq>
<inst ref=“inst-info—Noon”> </inst>
</seq>
</par>
</navi>
<inst id=“inst-info—Introduction”>
<time> +5 sec </time>
<info>
<text> Welcome to Rainbow Town Tour! </text>
</info>
</inst>
<inst id=“inst-point—Kaihin Makuhari Station”>
<time> 9:00 </time>
<point>
<category> station </category>
<name> Kaihin Makuhari Station </name>
</point>
<route>
<means> train </means>
<category> JR </category>
<category> Keiyo Line </category>
<duration> 41 min </duration>
<distance> 31.7 km </distance>
<cost> 540 yen </cost>
</route>
</list>
<inst id=“inst-point—Tokyo Station”>
<time importance=“high”> 10:00 </time>
<point importance=“high”>
<category> station </category>
<name> Tokyo </name>
</point>
<route>
<means> walk </means>
</route>
</inst>
<inst id=“inst-point—Yaesu Central Entrance, Tokyo Station”>
<point>
<name> Yaesu Central Entrance, Tokyo Station </name>
<longitude> 133. 33. 36 </longitude>
<latitude> 36. 2. 5 </latitude>
</point>
<route>
<means> car </means>
<category> Metropolitan Highway </category>
<cost> 700 yen </cost>
</route>
</inst>
<inst id=“inst-point—Kyobashi IC”>
<point>
<name> Kyobashi IC </name>
<longitude> 133. 33. 36 </longitude>
<latitude> 36. 2. 5 </latitude>
</point>
<route>
  thesame
</route>
</inst>
<inst id=“inst-info—Rainbow Bridge—Guide 1”>
<time> −10 min </time>
<info>
<text> We will arrive at Rainbow Bridge in 10 minutes. </text>
</info>
</inst>
<inst id=“inst-info—Rainbow Bridge—Guide 2”>
<location> −1.0 km </location>
<info ref=“object—Rainbow Bridge #info”>
</info>
```

```
</inst>
<inst id=“inst-point—Edobashi JC”>
<point>
<name> Edobashi JC </name>
</point>
<route>
<title> Rainbow Bridge </title>
<means> car </means>
<category> Metropolitan Highway </category>
</route>
</inst>
<inst id=“inst-point—Daiba IC”>
<point ref=“point—Daiba IC”> </point>
<route> thesame </route>
</list>
<inst id=“inst-object—restaurant”
  if=“(ref (inst-point—Daiba IC #time) &ge 11:30) &&
  (ref (inst-point—Daiba IC #time) &le 13:30)”>
<time importance=“low”> 1 hour 30 min</time>
<point ref=“object—restaurant”> </point>
<info>
<text ref=“object—restaurant #text”> </text>
<image ref=“object—restaurant #image”> </image>
</info>
</inst>
<inst id=“inst-object—cafe”
  if=“(ref (inst-point—Daiba IC #time) &1t 11:30 ||
  (ref (inst-point—Daiba IC #time) &gt 13:30)”>
<time importance=“low”> 45 min </time>
<object ref=“object—cafe”> </object>
</info>
<inst id=“inst-point—Tsukitsutsumi”>
<point ref=“http://www.naviscript.com/japan/tokyo/
  odaiba.nav#point-breakwater”>
</point>
</inst>
<inst id=“inst-object—Fuji San Television”>
<object>
<name> Fuji San Television </name>
<address> Daiba 9—9—9, Minato Ku, Tokyo To
</address>
</object>
</inst>
<inst id=“inst-point—Yaesu Central Entrance, Tokyo Sta-
  tion”>
<point importance=“high”>
<name> Yaesu Central Entrance, Tokyo Station
</name>
<longitude> 133. 33. 36 </longitude>
<latitude> 36. 2. 5 </latitude>
</point>
</inst>
<inst id=“inst-info—End Message”>
<time> +0 sec </time>
<info>
<par>
<voice times=“1”> Did you enjoy it? </voice>
<sound src=“sound-bye.wav” duration=“2 min 30 sec”>
</sound>
</par>
</info>
</inst>
<inst id=“inst-info—Noon”>
<time> 12:00 </time>
<info>
<voice> It’s noon. </voice>
</info>
```

```
</inst>
<point id=“point—Daiba IC”>
<name> Daiba IC </name>
<longitude> 133. 37. 46 </longitude>
<latitude> 36. 3. 5 </latitude>
</point>
<object id=“object—Rainbow Bridge”>
<name> Rainbow Bridge /name>
<category> bridge </category>
<info>
<text> The Rainbow Bridge is 125 m above the sea level and
  its length is 826 m. . . . </text>
</info>
<object id=“object—restaurant”>
<name> Restaurant Fujitsu </name>
<category> restaurant </category>
<category> Italian </category>
<phone> 987-654-3210 </phone>
<text> Cooked by Italian chef . . . </text>
<image src=“image-restaulant.jpg”> </image>
</object>
<object id=“object—cafe”>
<name> Cafe Fujitsu </name>
<category> cafe </category>
<phone> 999—999–9999 </phone>
</object>
</naviscript>
```

The above-described navigation script is converted into navigation structured data by the script converting portion id. Next, a real example of a conversion into structured data will be described.

```
[example-04_06.h]
naviscript.title
  =Rainbow Town Tour;
naviscript.version
  =example-04_06;
naviscript.copyright
  =All Rights Reserved, Copyright (C) Fujitsu Laboratories
    Ltd. 1999.;
naviscript.navi.title
  =Rainbow Town;
naviscript.navi.author
  =Fujitsu Tourists Company;
naviscript.navi.date
  =99/10/10;
naviscript.navi.duration
  =3 hours 40 min;
naviscript.navi.distance
  =95.0 km;
naviscript.navi.cost
  =1940 yen;
naviscript.navi-instlist
  =par (seq (1, 2, 3, 4, 5, 6, 7, 8, 9, 10, 11, 12, 13, 14, 15),
    seq (16));
naviscript.navi.inst[1].id
  =inst-info—Introduction;
naviscript.navi.inst[1].time
  =+5 sec;
naviscript.navi.inst[1].info.text
  =Welcome to Rainbow Town Tour!;
naviscript.navi-inst[2].id
  =inst-point—Kaihin Makuhari Station;
naviscript.navi.inst[2].time.arrive-time
  =9:00;
```

naviscript.navi.inst[2].time.departure-time
=9:00;
naviscript.navi.inst[2].point.category
=station;
naviscript.navi.inst[2].point.name
=Kaihin Makuhari Station;
naviscript.navi.inst[2].route.means
=train;
naviscript.navi.inst[2].route.category
=JR;
naviscript.navi.inst[2].route.category
=Keiyo Line;
naviscript.navi.inst[2].route.duration
=41 min;
naviscript.navi.inst[2].route.distance
=31.7 km;
naviscript.navi.inst[2].route.cost
=540 yen;
naviscript.navi.inst[3].id
=inst-point—Tokyo Station;
naviscript.navi.inst[3].time.arrive-time
=10:00;
naviscript.navi.inst[3].time.arrive-time.importance
=high;
naviscript.navi.inst[3].time.departure-time
=10:00;
naviscript.navi.inst[3].time.departuretime. importance
=high;
naviscript.navi.inst[3].point.category
=station;
naviscript.navi.inst[3].point.name
=Tokyo;
naviscript.navi.inst[3].route.thesame
=yes
naviscript.navi.inst[4].id
=inst-point—Yaesu Central Entrance, Tokyo Station;
naviscript.navi.inst[4].point.name
=Yaesu Central Entrance, Tokyo Station;
naviscript.navi.inst[4].point.longitude
=133. 33. 36;
naviscript.navi.inst[4].point.latitude
=36. 2. 5;
naviscript.navi.inst[4].route.means
=car;
naviscript.navi.inst[4].route.category
=Metropolitan Highway;
naviscript.navi.inst[4].route.cost
=700 yen;
naviscript.navi.inst[5].id
=inst-point—Kyobashi IC;
naviscript.navi.inst[5].point.name
=Kyobashi IC;
naviscript.navi.inst[6].point.longitude
=133. 33. 36;
naviscript.navi.inst[5].point.latitude
=36. 2. 5;
naviscript.navi.inst[5].route.thesame
=yes;
naviscript.navi.inst[6].id
=inst-info—Rainbow Bridge—Guide 1;
naviscript.navi.inst[6].time
=−10 min;
naviscript.navi.inst[6].info.text
=We will arrive at Rainbow Bridge in 10 minutes.;
naviscript.navi.inst[7].id
=inst-info—Rainbow Bridge—Guide 2;
naviscript.navi.inst[7].location
=−1.0 km;
naviscript.navi.inst[7].info.text
=The Rainbow Bridge is 125 m above the sea level and its length is 826 m. . . . ;
naviscript.navi.inst[8].id
=inst-point—Edobashi JC;
naviscript.navi.inst[8].point.name
=Edobashi JC;
naviscript.navi.inst[8].route.title
=Rainbow Bridge;
naviscript.navi.inst[8].route.means
=car;
naviscript.navi.inst[8].route.category
=Metropolitan Highway;
naviscript.navi.inst[9].id
=inst-point—Daiba IC;
naviscript.navi.inst[9].name
=Daiba IC;
naviscript.navi.inst[9].longitude
=133. 37. 46;
naviscript.navi.inst[9].latitude
=36. 3. 5;
naviscript.navi.inst[9].route.thesame
=yes
naviscript.navi.inst[10].id
=inst-object—restaurant;
naviscript.navi.inst[10].if
=(res (inst-point—Daiba IC #time) &ge 11:30) && (ref (inst-point—Daiba IC #time) &le 13:30);
naviscript.navi.inst[10] . time.period-of-stay
=1 hour 30 min;
naviscript.navi.inst[10].time.period-of-stay.importance
=low;
naviscript.navi.inst[10].point.id
=object—restaurant;
naviscript.navi.inst[10].point.name
=Restaurant Fujitsu;
naviscript.navi.inst[10].point.category
=restaurant;
naviscript.navi.inst[10].point.category
=Italian;
naviscript.navi.inst[10].point.phone
=987-654-3210
naviscript.navi.inst[10].point.info.text
=Cooked by Italian chef . . . ;
naviscript.navi.inst[10].point.info.image.src
=image-restaulant.jpg;
naviscript.navi.inst[11].id
=inst-object—cafe;
naviscript.navi.inst[ll].if
(ref (inst-point—Daiba IC #time) &1t 11:30) || (ref (inst-point—Daiba IC #time) > 13:30);
naviscript.navi.inst[11].object.id
=object-cafe;
naviscript.navi.inst[11].time.period-of-stay
=45 min;

naviscript.navi.inst[11].time.period-of-stay.importance
=low
naviscript.navi.inst[11].object.name
=Cafe Fujitsu;
naviscript.navi.inst[11].object.category
=cafe;
naviscript.navi.inst[11].object.phone
=999-999-9999;
naviscript.navi.inst[12].id
=inst-point—Tsukitsutsumi;
naviscript.navi.inst[12].point.ref
=http://www.-navi-com/japan/tokyo/odaiba.nav#point-breakwater;
naviscript.navi.inst[13].id
=inst-object—Fuji San Television;
naviscript.navi.inst[13].object.name
=Fuji San Television;
naviscript.navi.inst[13].object.address
=9-9-9, Daiba, Minato Ku, Tokyo To;
naviscript.navi.inst[14].id
inst-point—Yaesu Central Entrance, Tokyo Station;
naviscript.navi.inst[14].point.importance
=high;
naviscript.navi.inst[14].point.name
=Yaesu Central Entrance, Tokyo Station;
naviscript.navi.inst[14].point.longitude
=133. 33. 36;
naviscript.navi.inst[14].point.latitude
=36. 2. 5;
naviscript.navi.inst[15].id
=inst-info—End Message;
naviscript.navi.inst[15].time
=+0 sec;
naviscript.navi.inst[15].infolist
=par (1, 2);
naviscript.navi.inst[15].info[1].voice.times
=1;
naviscript.navi.inst[15].info[1].voice.value
=Than you very much. See you soon !;
naviscript.navi.inst[15].info[1].sound.src
=sound-bye.wav;
naviscript.navi.inst[15].info[1].sound.duration
=2 min 30 sec;
naviscript.navi.inst[16].id
=inst-info—Noon;
naviscript.navi.inst[16].time
=12:00;
naviscript.navi.inst[16].info.voice
=It's noon.;

In the beginning portion of the navigation script, the portion surrounded by <navi> and </navi> defines the title, version, and instructions used in the navigation script.

The portion preceded by the </navi> defines the contents of individual instructions. The instruction surrounded by <inst id="inst-infoInstruction"> and </inst> outputs a message "Welcome to Rainbow Town Tour!" five seconds after the departure time.

The instruction surrounded by <inst id="inst-point—Kaihin Makuhari Station"> and </inst> notifies the user that he or she should get on a train of Keiyo Line at Kaihin Makuhari Station at 9 o'clock.

The instruction surrounded by <inst id="inst-point—Tokyo Station"> and </inst> contains:

<time importance="high"> 10:00 </time>
<point importance="high"> and notifies the user that he or she should arrive at Tokyo Station at 10:00.

The tenth instruction surrounded by <inst id=inst-object—restaurant . . . > and </inst> contains:

if="(ref (inst-point—Daiba IC #time) &ge 11:30) &&
(ref (inst-point—Daiba IC #time) &le 13:30">
<time importance="low"> 1 hour 30 min </time>. The eleventh instruction surrounded by <inst id="inst-object—cafe . . . "> and </inst> contains:
if="(ref (inst-point—Daiba IC #time) < 11:30) ||
(ref (inst-point—Daiba IC #time) > 13:30)">
<time importance="low"> 45 min </time>.

The tenth instruction outputs navigation information of a restaurant when the arrival time at Daiba IC is in the range from 11:30 to 13:30. The eleventh instruction outputs navigation information of a cafe when the arrival time at Daiba IC is before 11:30 or after 13:30.

In these instructions, the <time> tag that represents guide output time contains an "importance" attribute that represents the importance of the event.

The "importance" attribute is an attribute that represents the importance of the event at the time. The "importance" attribute has two values "high" and "low" where "high" is a default value.

The following tag set represents that both the arrival time of 11:00 and the departure time of 13:30 are important.

<time importance="high"> 11:00–13:30 </time>

The following tag sets represent that although the arrival time of 11:00 is important, the departure time of 13:30 is not important.

<time importance="high"> 11:00- </time>
<time importance="low"> -13:30 </time>

The following tag set represents that the period of stay of 1 hour 30 min is not important.

<time importance="low"> 1 hour 30 min </time>

When the above-described navigation script is interpreted, the tenth instruction and the eleventh instruction are converted into the following navigation structured data so as to prevent the scrip from contradicting.

naviscript.navi.inst[10].id
=inst-object—restaurant;
naviscript.navi.inst[10].if
=(ref (inst-point—Daiba IC #time) &ge 11:30) &&
(ref (inst-point—Daiba IC #time) &le 13:30);
naviscript.navi.inst[10].time.period-of-stay
=1 hour 30 min;
naviscript.navi.inst[10].time.period-of-stay.importance
=low
naviscript.navi.inst[10].point.id
=object-restaurant;
. . .
naviscript.navi.inst[11].id
=inst-object—cafe;
naviscript.navi.inst[11].if
=(ref (inst-point—Daiba IC #time) < 11:30) ||
(ref (inst-point—Daiba IC #time) > 13:30);
naviscript.navi.inst[11].object.id
=object—cafe;
naviscript.navi.inst[11].time.period-of-stay
=45 min;
naviscript.navi.inst[11].time.period-of-stay.importance
=low;
. . .

When the navigation script is executed, the restriction adjusting portion 1*h* performs the following process corresponding to the example of the correction shown in FIG. 1C.

(a) When the arrival time at Daiba IC is 11:45, the restriction adjusting portion 1*h* subtracts the margin (15 min) from the departure time of 13:30 and designates the departure time to 13:15. Alternatively, the restriction adjusting portion 1*h* adds the margin to the period of stay and designates the period of stay to 1 hour 15 min.

(b) When the arrival time at Daiba IC is 12:15, the restriction adjusting portion 1*h* adds the delay (15 min) to the departure time of 13:30 and designates the departure time to 14:45. Alternatively, the restriction adjusting portion 1*h* subtracts the delay from the period of stay and designated the period of stay to 1 hour 15 min.

[Specifications of Navigation Script Language]

Next, tags, attributes, and contents of the navigation script will be described in the following order.

| | | | | | | | |
|---|---|---|---|---|---|---|---|
| 01. | <naviscript> | | | | | | |
| 02. | | <title> | | | | | |
| 03. | | <version> | | | | | |
| 04. | | <author> | | | | | |
| 05. | | <affiliation> | | | | | |
| 06. | | <date> | | | | | |
| 07. | | <copyright> | | | | | |
| 08. | | <comment> | | | | | |
| 09. | | <navi> | | | | | |
| 10. | | | <title> | | | | |
| 11. | | | <author> | | | | |
| 12. | | | <date> | | | | |
| 13. | | | <country> | | | | |
| 14. | | | <area> | | | | |
| 15. | | | <genre> | | | | |
| 16. | | | <duration> | | | | |
| 17. | | | <distance> | | | | |
| 18. | | | <cost> | | | | |
| 19. | | | <course> | | | | |
| 20. | | | <comment> | | | | |
| 21. | | | <seg> | | | | |
| 22. | | | <par> | | | | |
| 23. | | | | <inst> | | | |
| 24. | | | | | <time> | | |
| 25. | | | | | <point> | | |
| 26. | | | | | | <name> | |
| 27. | | | | | | <category> | |
| 28. | | | | | | <latitude> | |
| 29. | | | | | | <longitude> | |
| 30. | | | | | | <altitude> | |
| 31. | | | | | | <cost> | |
| 32. | | | | | | <comment> | |
| 33. | | | | | <location> | | |
| 34. | | | | | <object> | | |
| 35. | | | | | | <name> | |
| 36. | | | | | | <category> | |
| 37. | | | | | | <address> | |
| 38. | | | | | | <zip-code> | |
| 39. | | | | | | <country> | |
| 40. | | | | | | <phone> | |
| 41. | | | | | | <fax> | |
| 42. | | | | | | <url> | |
| 43. | | | | | | <e-mail> | |
| 44. | | | | | | <latitude> | |
| 45. | | | | | | <longitude> | |
| 46. | | | | | | <altitude> | |
| 47. | | | | | | <open> | |
| 48. | | | | | | <close> | |
| 49. | | | | | | <reservation> | |
| 50. | | | | | | <comment> | |
| 51. | | | | | | <text> | |
| 52. | | | | | | <voice> | |
| 53. | | | | | | <audio> | |
| 54. | | | | | | <image> | |
| 55. | | | | | | <video> | |
| 56. | | | | | <route> | | |
| 57. | | | | | | <means> | |
| 58. | | | | | | <name> | |
| 59. | | | | | | <category> | |
| 60. | | | | | | <cost> | |
| 61. | | | | | | <comment> | |
| 62. | | | | | <info> | | |
| 63. | | | | | | <seq> | |
| 64. | | | | | | <par> | |
| 65. | | | | | | | <text> |
| 66. | | | | | | | <voice> |
| 67. | | | | | | | <audio> |
| 68. | | | | | | | <image> |
| 69. | | | | | | | <video> |

01. <naviscript>

Tag: <naviscript>

Represents that this description is a naviscript.

Attribute: version

Represents the version of the naviscript.

Content: The following tag sets can be contained.

<title>

<version>

<author>

<affiliation>

<date>

<copyright>

<comment>

<navi>

02. <title> below <naviscript>

Tag: <title>

Attribute: None

Content: Describes the title of a guide of the naviscript.

Example: Rainbow Town Tour

03. <version> below <naviscript>

Tag: <version>

Attribute: None

Content: Describes the version of the guide of the naviscript.

Example: example-04_06

04. <author> below <naviscript>

Tag: <author>

Attribute: None

Content: Describes the author of the guide of the naviscript.

Example: Ueo Ai, Kukeko Kaki

05. <affiliation> below <naviscript>

Tag: <affiliation>

Attribute: None

Content: Describes the affiliation of the guide of the naviscript.

Example: Fujitsu Tourists Company

06. <date> below <naviscript>

Tag: <date>

Attribute: None

Content: Describes the date and time of the creation of the guide of the naviscript.

Example: 99/10/10

07. <copyright> below <naviscript>

Tag: <copyright>

Attribute: None

Content: Describes the copyright of the guide of the naviscript.

Example: All Rights Reserved, Copyright (C) Fujitsu Laboratories Ltd. 1999.

08. <comment> below <naviscript>

Tag: <comment>

Attribute: None

Content: Describes a comment of the guide of the naviscript.

09. <navi> below <naviscript>

Tag: <navi>

Attribute: None

Content: The following tag sets can be contained.

<title>

<author>

<date>

<country>

<area>

<genre>

<duration>

<distance>

<cost>

<course>

<comment>

<seq> or <par>

10. <title> below <navi>

Tag: <title>

Attribute: None

Content: Describes the title of the content of the guide.

Example: Rainbow Town

11. <author> below <navi>

Tag: <author>

Attribute: None

Content: Describes the author of the content of the guide.

Example: Fujitsu Tourists Company

12. <date> below <navi>

Tag: <date>

Attribute: None

Content: Describes the date and time of the content of the guide.

Example: 99/10/10

13. <country> below <navi>

Tag: <country>

Attribute: None

Content: Describes the name of the country to which a point, a route, or a facility of the guide belongs.

Example: Japan

14. <area> below <navi>

Tag: <area>

Attribute: None

Content: Describes the area to which a point, a route, or a facility of the guide belongs.

Example: Odaiba, Tokyo

15. <genre> below <navi>

Tag: <genre>

Attribute: None

Content: Describes the genre to which the content of the guide belongs.

Example: Drive, Sightseeing

16. <duration> below <navi>

Tag: <duration>

Attribute: None

Content: Describes the duration of a course of the guide.

Example: 3 hours 40 min

17. <distance> below <navi>

Tag: <distance>

Attribute: None

Content: Describes the traveling distance of a course of the guide.

Example: 95.0 km

18. <cost> below <navi>

Tag: <cost>

Attribute: None

Content: Describes the cost of a course of the guide.

Example: 1940 yen

19. <course> below <navi>

Tag: <course>

Attribute: None

Content: Describes a course of the guide.

Example: Kaihin Makuhari Station—Tokyo Rainbow Bridge—Fuji San Television—Tokyo

20. <comment> below <navi>

Tag: <comment>

Attribute: None

Content: Describes a comment of the content of the guide.

21. <seq> below <navi>

Tag: <seq>

<seq> (sequential) represents that elements contained are sequentially executed.

Attribute: None

Content: The following tag sets or any number of combinations thereof can be contained.

<inst>

<seq>

<par>

22. <par> below <navi>

Tag: <par>

<par> represents parallel.

<par> represents that elements contains are executed in parallel.

Attribute: None

Content: The following tag sets or any number of combinations thereof can be contained.

<inst>

<seq>

<par>

23. <inst> below <seq> or <par>

Tag: <inst>

<inst> represents "instruction"

Attribute:

id

"id" assigns an ID for referencing an internal or external <inst>.

Example: id="inst-info—Introduction"

ref

"ref" describes the ID assigned to an internal or external <inst> so as to reference the <inst>.

Example: ref="inst-info—Instruction"

if

"if" describes a condition with which the instruction is executed. When the condition is satisfied, the instruction is executed. Otherwise, the instruction is not executed.

Example: if="(ref (inst-point—Daiba IC #time) &ge 11:30) &&

(ref (inst-point—Daiba IC #time) &le 13:30)">

That condition represents that the content of the tag set of the internal <time> of the tag set assigned with the ID "inst-point—Daiba IC" should be after 11:30 and before 13:30.

Symbols used in the "if" attribute and their meanings are as follows:

Relational Operators:

&eq or==(=:equal)

The left side and the right side are equal.

&ne or !=(!=:not equal)

The left side and the right side are not equal.

&le

The left side is less than or equal to the right side. (<=:less or equal)

&ge

The left side is greater than or equal to the right side. (>=:greater or equal)

<

The left side is less than the right side. (<:less than)

>

The left side is greater than the right side. (<: greater than)

Logical Operators:

¬ or !

NOT

&and

AND

&OR

OR

Content: The following tag sets or any number of combinations thereof can be contained.

<time> or

<point> or <location> or <object>, and, <route>

<info>

24. <time> below <inst>

Tag: <time>

<time> represents the time at which the guide is performed.

When "time" is used along with "point", "time" represents the departure time from the "point", the period of stay at the "point", and the departure time at the "point".

Attribute:

id

"id" assigns an ID for referencing an internal or external <inst>.

ref

"ref" describes an ID assigned to an inter or external <inst> so as to reference the <inst>.

importance

"importance" designates the importance of the time. "importance" has the following values:

Example: high, low

Unless "importance" is designated (as a default value of "importance"), "high" is designated.

Usage:

<time importance="high"> 11:00–13:00 </time>

Both the arrival time of 11:00 and the departure time of 13:00 are important.

<time importance="high"> 11:00- </time>

<time importance="low"> -13:00 </time>

Although the arrival time of 11:00 is important, the departure time of 13:00 is not important.

Content: Describes the time at which the guide of <info> below <inst>.

"time" can be designated in the absolute format and relative format as follows.

<time> 12:00 </time>

Absolutely designates the time (for example at 12:00).

<time> +5 sec </time>

Relatively designates the time (for example, 5 sec after the execution of the preceding instruction).

<time> −10 min </time>

Relatively designates the time (for example, 10 minutes before the execution of the next instruction).

When "time" is used along with "point", "time" represents the departure time from the "point", the period of stay at the "point", and the arrival time at the "point".

<time> 11:00 </time>

Arrives at 11:00 and departs at 11:00.

<time> 11:00- </time>

Stays from 11:00 (namely, arrives at 11:00).

<time> -13:00 </time>

Stays until 13:00 (namely, departs at 13:00).

<time> 11:00–13:00 </time>

Stays after 11:00 until 13:00.

<time> 1 day 2 hours </time>

Stays for 1 day and 2 hours.

25. <point> below <inst>

Tag: <point>

<point> represents a point to be guided.

<point> absolutely defines a point.

Attribute:

id

"id" assigns an ID for referencing an internal or external <inst>.

Example:

id="point—Daiba IC"

ref

"ref" describes an ID assigned to an internal or external <inst> so as to reference the <inst>.

Example:

ref="point—Daiba IC"

ref=http://www.naviscript.com/japan/tokyo/odaiba.nav#point-breakwater importance "importance" designates the importance of the passage of the point. The "importance" attribute has the following values.

Example: high, low

A default value of the "importance" attribute is high.

Usage:

<point importance ="high"> . . . </point>

The passage of the point designated by . . . is important.

Content: The following tag sets can be contained.

<name>

<category>

<latitude>

<longitude>

<altitude>

<cost>

<comment>

Those tag sets are elements for defining a point to be guided.

26. <name> below <point>

Tag: <name>

Attribute: None

Content: Describes the name of the point.

27. <category> below <point>

Tag: <category>

Attribute: None

Content: Describes the category of the point.

Example: Station

28. <latitude> below <point>

Tag: <latitude>

Attribute: None

Content: Describes the latitude of the point.

Example: 36. 2. 5

29. <longitude> below <point>

Tag: <longitude>

Attribute: None

Content: Describes the longitude of the point.

Example: 133. 33. 36

30. <altitude> below <point>

Tag: <altitude>

Attribute: None

Content: Describes the altitude of the point.

Example: 100 m

31. <cost> below <point>

Tag: <cost>

Attribute: None

Content: Describes the cost necessary for the point such as admission fee.

Example: 540 yen

32. <comment> below <point>

Tag: <comment>

Attribute: None

Content: Describes a comment of the point.

33. <location> below <point>

Tag: <location>

<location> represents the location to be guided.

The "location" relatively defines a point.

Attributes:

id

"id" assigns an ID for referencing an internal or external <inst>.

ref

"ref" describes an ID assigned to an internal or external <inst> so as to reference the <inst>.

importance

"importance" designates the importance of the passage of the point.

The "importance" attribute has the following values.

Example: high, low

As a default value of the "importance", the value "high" is designated.

Usage:

<location importance="high"> . . . </location>

The passage of the spot designated by . . . is important.

Content: Describes the location of the content of <info> below <inst> to be guided.

The location can be relatively designated.

<location> +1.0 km </location>

Relatively designates a location (such as 1 km past the preceding point).

<location> −1.0 km </location>

Relatively designates a location (such as 1 km prior to the next point).

34. <object> below <inst>

Tag: <object>

<object> represents an object such as a facility to be guided.

Attribute:

id

"id" assigns an ID for referencing an internal or external <inst>.

Example: id="object—Rainbow Bridge"

ref

"ref" describes an ID assigned to an internal or external <inst> so as to reference the <inst>.

Example: ref="object—cafe"

Content: The following tag sets can be contained.

<name>

<category>

<address>

<zip-code>

<country>

<phone>

<fax>

<url>

<e-mail>

<latitude>

<longitude>

<altitude>

<open>

<close>

<reservation>

<comment>

Those tag sets can be treated as elements for defining an object such as a facility to be guided.

35. <name> below <object>

Tag: <name>

Attribute: None

Content: Describes the name of the object.

Example: Restaurant Fujitsu

36. <category> below <object>

Tag: <category>

Attribute: None

Content: Describes the category of the object.

Example: Restaurant, Italian, . . .

37. <address> below <object>

Tag: <address>

Attribute: None

Content: Describes the address of the object.

Example: 9-9-9, Daiba, Minato Ku, Tokyo To

38. <zip-code> below <object>

Tag: <zip-code>

Attribute: None

Content: Describes the zip code of the object.

Example: 012-3456

39. <country> below <object>

Tag: <country>

Attribute: None

Content: Describes the name of the country to which the object belongs.

Example: Japan

40. <phone> below <object>

Tag: <phone>

Attribute: None

Content: Describes the telephone number of the object.

Example: 987-654-3210

41. <fax> below <object>

Tag: <fax>

Attribute: None

Content: Describes the fax number of the object.

Example: 999-999-9999

42. <urn> below <object>

Tag: <url>

Attribute: None

Content: Describes the web page address (URL:Uniform Resource Locator) of the object.

Example: http://www.fujisan-tv.com/

43. <e-mail> below <object>

Tag: <e-mail>

Attribute: None

Content: Describes the e-mail address of the object.

Example: www@fujisan-tv.com

44. <latitude> below <object>

Tag: <latitude>

Attribute: None

Content: Describes the latitude of the object.

Example: 36. 3. 5

45. <longitude> below <object>

Tag: <longitude>

Attribute: None

Content: Describes the longitude of the object.

Example: 133. 37. 46

46. <altitude> below <object>

Tag: <altitude>

Attribute: None

Content: Describes the altitude of the object.

Example: 999 m

47. <open> below <object>

Tag: <open>

Attribute: None

Content: Describes the open days and open hours of the object.

Example: Monday–Friday, 10:00–17:00

48. <close> of <object>

Tag: <close>

Attribute: None

Content: Describes the close days and close hours of the object.

Example: Saturdays, Sundays, National Holidays

49. <reservation> of <object>

Tag: <reservation>

Attribute: None

Content: Describes whether or not a reservation of the object is required.

Example: A reservation is required.

50. <comment> of <object>

Tag: <comment>

Attribute: None

Content: Describes a comment of the object.

51. <text> of <object>

Tag: <text>

Attribute: duration

"duration" represents the duration for which the object is displayed.

Content: Describes a text for the guide of the object in the text format.

Example: Cooked by Italian chef. . . .

52. <voice> of <object>

Tag: <voice>

Attribute: duration

"duration" represents the duration for which a voice guide of the object is generated.

Content: Describes a voice guide of the object in the text format.

Example: Cooked by an Italian chef . . . .

53. <audio> of <object>

Tag: <audio>

Attribute:

src

"src" designates an audio file as a guide of the object.

duration

"duration" designates the duration of the audio file.

Content: None

54. <image> of <object>

Tag: <image>

Attribute:

src

"src" designates an image file as a guide of the object.

duration

"duration" designates the duration of the image file.

Content: None

55. <video> of <object>

Tag: <video>

Attribute:

src

"src" designates a video file reproduced as a guide of the object.

duration

"duration" designates the duration for which the video file is reproduced.

Content: None

56. <route> of <inst>

Tag: <route>

"route" represents a route to be guided.

Attribute:

id

"id" assigns an ID for referencing an internal or external <inst>.

ref

"ref" describes an ID assigned to an internal or external <inst> so as to reference the <inst>.

Content: The following tag sets can be contained.

<means>

<name>

<category>

<cost>

<comment>

Those tag sets can be treated as elements for defining a route to be guided. Alternatively, the following attribute can be contained.

thesame

"thesame" represents that information of a route from the current point to the next point is the same as that from the preceding point to the current point.

57. <means> below <route>
Tag: <means>
Attribute: None
Content: Describes a traveling means of the route.
Example: walk, bicycle, car, bus, train, ship, plane, . . .

58. <name> below <route>
Tag: <name>
Attribute: None
Content: Describes the name of the route.
Example: National Road Route 1

59. <category> below <route>
Tag: <category>
Attribute: None
Content: Describes the category of the route.
Example: General road, toll road, highway, walk road, . . .

60. <cost> below <route>
Tag: <cost>
Attribute: None
Content: Describes the fee necessary for the route.
Example: 540 yen 61. <comment> below <route>
Tag: <comment>
Attribute: None
Content: Describes a comment of the route.

62. <info> below <inst>
Tag: <info>
<info> represents information to be guided.
Attribute:
ref
"ref" describes an ID assigned to an internal or external <inst> so as to reference the <inst>.
Example:
ref=object- Rainbow Bridge #info
Content: The following tag sets can be contained.
<seq> or <par>

63. <seq> below <info>
Tag: <seq>
<seq> represents that elements contained are sequentially executed.
Attribute: None
Content: The following tag sets and any number of combinations thereof can be contained.
<text>
<voice>
<audio>
<image>
<video>

64. <par> below <info>
Tag: <par>
<par> represents that elements contained are sequentially executed.
<par> represents that elements contained are sequentially executed. When the default value of the tag set <info> is <par>, the <par> tag can be omitted.
Attribute: None
Content: The following tag sets and any number of combinations thereof can be contained.
<text>
<voice>
<audio>
<image>
<video>

65. <seq> below <seq> or <par>
Tag: <seq>
Attribute:
ref
"ref" describes an ID assigned to an internal or external <inst> so as to reference the <inst>.
Example: ref="object- restaurant # text"
duration
="duration" designates the duration of the <inst> to be displayed.
Content: Describes a text to be displayed as a guide in the text format.
Example: Welcome to Rainbow Town Tour !

66. <voice> below <seq> or <par>
Tag: <voice>
Attribute:
ref
"ref" describes an ID assigned to an internal or external <inst> so as to reference the <inst>.
Example: ref="object- restaurant #voice"
duration
"duration" designates the duration of a voice guide to be generated.
Content: Describes a voice guide in the text format.
Example: Did you enjoy it ?

67. <audio> below <seq> or <par>
Tag: <audio>
Attribute:
ref
"ref" describes an ID assigned to an internal or external <inst> so as to reference the <inst>.
Example: ref="object—restaurant #audio"
src
"src" designates an audio file to be reproduced as a guide.
duration
"duration" designates the duration of the audio file to be reproduced.
Content: None 68. <image> below <seq> or <par>
Tag: <image>
attribute:
ref
"ref" describes an ID assigned to an internal or external <inst> so as to reference the <inst>.
Example: ref="object- restaurant #image"
src
"src" designates an image file to be displayed as a guide.
duration
"duration" designates the duration of the image file to be displayed.
Content: None 69. <video> below <seq> or <par>
Tag: <video>
Attribute:
ref
"ref" describes an ID assigned to an internal or external <inst> so as to reference the <inst>.
Example: ref"object—restaurant #video"

src

"src" designates a video file to be reproduced as a guide.

duration

"duration" designates the duration of the video file to be reproduced.

Content: None

Since the specifications of the navigation script language according to the embodiment of the present invention has been described in detail, a system that interprets and executes a navigation script corresponding to the language specifications can be easily accomplished by those in the art.

As was described above, according to the structure shown in FIG. 1A, schedules of a business trip, a maintenance work, sightseeing, a travel, and so forth can be accurately described. In addition, guides corresponding to real situations can be presented.

Next, a second system according to the present invention will be described.

[Example of Structure of Apparatus]

Figure 2A:
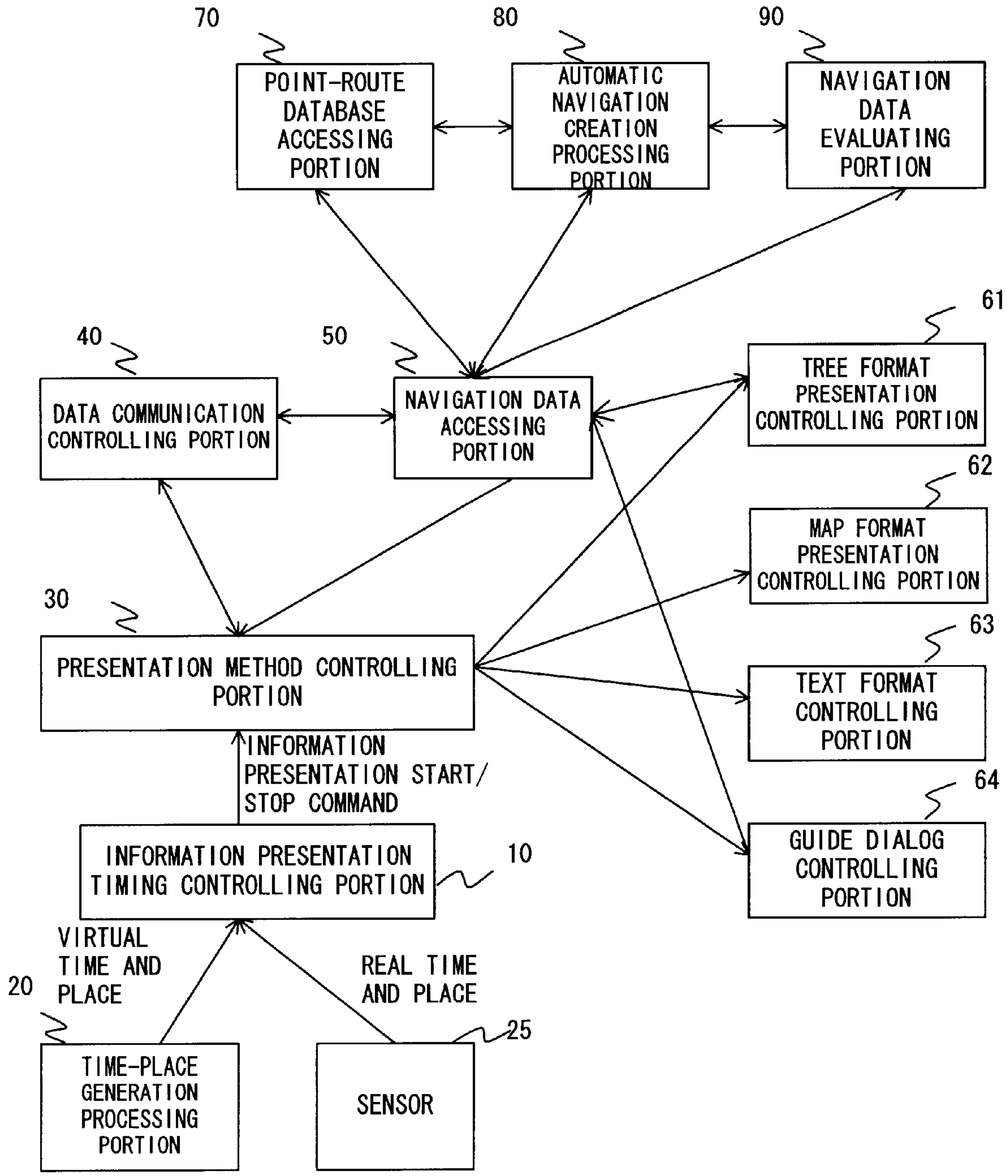
FIG. 2A is a block diagram showing an example of the structure of a second system according to the present invention.

FIG. 2A is a block diagram showing an example of the structure of the second system according to the present invention. The system shown in FIG. 2A comprises an information presentation timing controlling portion 10, a time and place generation processing portion 20, a sensor 25, a presentation method controlling portion 30, a data communication controlling portion 40, a navigation data accessing portion 50, a tree format presentation controlling portion 61, a map format presentation controlling portion 62, a text format controlling portion 63, a guide dialog controlling portion 64, a point/route database accessing portion 70, an automatic navigation creation processing portion 80, and a navigation data evaluating portion 90. The information presentation timing controlling portion 10 controls the presentation timing of navigation data corresponding to time and place generated by the time and place generation processing portion 20 or the sensor 25. The time and place generation processing portion 20 generates time and place. The sensor 25 obtains the current time and the current place. The presentation method controlling portion 30 controls the presentation method of a guide corresponding to the user's terminal unit. The data communication controlling portion 40 controls a data communicating process. The navigation data accessing portion 50 controls an accessing process of navigation data. The tree format presentation controlling portion 61 presents navigation data in the tree format. The map format presentation controlling portion 62 presents navigation data in the map format. The text format controlling portion 63 controls the data presentation of navigation data and commands in the text format. The guide dialog controlling portion 64 controls various view and edit dialogs. The point—route database accessing portion 70 controls an accessing process for a database of information of points and routes. The automatic navigation creation processing portion 80 semi-automatically or automatically creates and edits navigation data. The navigation data evaluating portion 90 evaluates navigation data that has been created and edited.

According to the present invention, a sequence of instructions of data of time, place, and navigation information recorded in various formats is described in the description format of a markup language. An instruction is a unit of a script of which navigation information including time (for example, departure time, transit time, arrival time, start time, and end time), point (for example, start point, transit point, destination point, intersection, transfer point, and place of facility), and one shot and part of various medium data (a map, characters, voice, music, a still picture, and a moving picture) is treated as a structural element. An instruction is for example "At the point A on a particular course, voice data "aaa.wav" and picture data "xxx.jpg" for explaining the point A are output". Hereinafter, the description language in such a format is referred to as NVML (NaVigation Markup Language).

In the guide executing process, the navigation data accessing portion 50 reads navigation data described in the NVML (hereinafter, the navigation data is referred to as NVML data) from a network or one of various types of mediums to the user's terminal unit. The information presentation timing controlling portion 10 presents navigation information corresponding to virtual time and place received from the time and place generation processing portion 20 or real time and place obtained from the sensor 25 at a proper timing. In addition, the information presentation timing controlling portion 10 stops the presentation at a proper timing.

The presentation method controlling portion 30 determines what information is presented (displayed) in what format corresponding to the presentation start—stop signal and the process performance of the terminal unit, the screen size, the user's request, and so forth and supplies the determined result to the tree format presentation controlling portion 61, map format presentation controlling portion 62, the text format controlling portion 63, and the guide dialog controlling portion 64.

In the navigation creating process, corresponding to the user's preference, the tree format presentation controlling portion 61, the map format presentation controlling portion 62, the text format controlling portion 63, and the guide dialog controlling portion 64 are operated so that various types of information such as contents of guides presented at the points and timings thereof are input.

At that point, the point—route database accessing portion 70 may extract necessary information (such as geographical information (for example, a facility, a landmark, and a geographical shape) and road additional information (for example, an intersection, a traffic signal, and a road width) and automatically add the extracted information to route navigation data.

The automatic guide creation processing portion 80 calculates a route corresponding to a start point, a destination point, and (when necessary) a transit point that have been input by the user, adds navigation information necessary for the route (for example, a direction and a landmark at each intersection), and automatically creates navigation data.

The navigation data evaluating portion 90 considers the required time, road conditions, and so forth, evaluates the feasibility and appropriateness of the navigation data, and when necessary creates a substitute plan so as to assist to create navigation data.

Since the presentation and creation of navigation data are assisted in such a manner, navigation data can be output in various presentation formats to various apparatuses. In addition, various programs of navigation data (NVML data) can be used.

[Outline of NVML]

Next, the NVML according to the embodiment of the present invention will be described.

An element bracketed by "<" and ">" (such as "<nvml version="0.60">", "<head>" and "</head>") is referred to as tag. An element that does not start with "</" is referred to as start tag, whereas an element that starts with "</" is referred to as end tag. The start tag and the end tag are used in pair as with "<title> NVML Ver. 0.60 Test Sample </title>". This pair is referred to as tag set. In addition, "version" of "<nvml version="0.60">" is referred to as attribute of tag, whereas "0.60" of "<nvml version=0.60>" is referred to as value of attribute.

In the NVML, tag sets are described in a hierarchical structure. When there is no tag set in a portion surrounded by one tag set, the portion is referred to as content of the tag set. The NVML script is composed of the above-described tag, attribute, and content.

Now, it is assumed that there is the following NVML script.

```
<body>
  <navi>
    <point>
      <name>○○ </name>
    </point>
    <info>
      <text>ΔΔ </text>
    </info>
  </navi>
</body>
```

That script represents that "route navigation information of ΔΔ is output (in text format) at a point of ○○". The portion surrounded by <point> and </point> represents a point. The portion surrounded by <info> and </info> represents navigation information to be output.

Now, it is assumed that there is the following NVML script.

```
<body>
  <guide>
    <point area="100 m">
      <name>○○ </name>
    </point>
    <info>
      <text> □□ </text>
    </info>
  </guide>
</body>
```

That script represents "in an area of 100 m of the radius of a point of ○○, navigation information of □□ is output (in the text format)". The portion surrounded by "<point area="100 m">" and "</point>" represents an area. The portion surrounded by "<info>" and "</info>" represents navigation information to be output.

(1) Guide Point ("guide" element)

A "guide" element is a child element of a "body" element. The "guide" element can be omitted. In addition, the "guide" element can be described many times. The "guide" element describes real information of a guide for a point.

Next, an example of the description of the "guide" point will be described.

```
<guide>
<point area="1.0 km">
<name> Kinuta Park </name>
<category> park </category>
<latitude> N35. 37. 30. 200 </latitude>
<longitude> E139. 37. 43. 227 </longitude>
<address> 2, Yoga, Setagaya Ku, Tokyo To </address>
<zip-code> 158-0097 </zip-code>
<phone> 01-2345-6789 </phone>
</point>
<info>
<text>
  Kinuta Park
</text>
<voice>
Kinuta Park is a successor of Great Green Zone planned as a commemorative event of the 2600th year of Japanese Emperors' era.
</voice>
<image src="image/Kinuta-Park-01.jpg/">
</info>
</guide>
```

That script represents that when the user is in a predetermined area (in an area of 1.0 [km] of the radius of the point), information described in an "info" element is output.

When the "guide" element is described in the NVML, at predetermined time or in a predetermined area of a point described in the "guide" element when the user travels along a course defined with several "navi" elements or when the user simply travels, information described in the "info" element is output.

A "guide" element can be described between two "navi" elements. In contrast, a "navi" element can be described between two "guide" elements. Moreover, any combination of "guide" elements and "navi" elements can be described. In those case, a sequence of "navi" elements is interpreted omitting all "guide" elements.

(2) Navi Point (transit point) ("navi" element)

A "navi" element is a child element of a "body" element. The "navi" element can be omitted. The "navi" element can be described many times. The "navi" element describes real information of a course navigation. The "navi" element does not have an attribute.

The "navi" element has child elements that are a "point" element, a "route" element, and an "info" element. At least one of a "point" element and a "route" element should be described. An "info" element can be omitted. Only one "info" element can be described. Child elements should be described in the order of a "point" element and an "info" element or in the order of a "route" element and an "info" element.

```
<navi>
<route>
<category> general road </category>
<means> car </means>
</route>
</navi>
<navi>
<point>
<name> Nishi Ginza IC </name>
<category> Metropolitan Highway </category>
<latitude> N35. 40. 19. 960 </latitude>
<longitude> E139. 46. 13. 122 </longitude>
<address> Cyuo Ku, Tokyo To </address>
</point>
<info>
<text> We will enter Metropolitan Highway at Nishi
  Ginza IC. </text>
<voice> We will enter Metropolitan Highway at Nishi
  Ginza IC. </voice>
</info>
</navi>
```

That example represents that a car passes through a route described in a "route" element and information described in an "info" element is output at a point described in a "point" element.

When a "navi" element is described a plurality of times, a navigation along a route via a point 1, a point 2, . . . and so forth can be described. The content of a “route” element does not always describe a full route from the current point to the next point. If a “route” element is not described or if it is improperly described, when the NVML system executes the “route” element, the system properly complements it.

(3) Point Information (“point” element)

A “point” element is a child element of a “navi” element or a “guide” element. When the “point” element is a child element of a “navi” element, one of a “point” element and a “route” element should be described one time. When a “point” element is a child element of a “guide” element, one “point” element should be described once time. A “point” element describes real information of a point.

When a “latitude” element and a “longitude” element are described as child elements of a “point” element, the NVML system determines the accurate location of the point using such information. When they are not described, the NVML system determines the location using the content of another element. When the NVML system cannot accurately determine one point due to improper description, the system estimates a proper point as proper as possible and selects one particular point. When the NVML system cannot estimate a proper point, an error takes place.

Only when a parent element of a “point” element is a “guide” element, an “area” attribute can be described. The “area” attribute designates an area of a point at which information described in an “info” element is output with the radius of a point described in a “point” element. For example, the “area” attribute is described as follows:

<point area=“1.0 km”>

(4) Route Information (“route” element)

A “route” element is a child element of a “navi” element. The “route” element describes real information of a route. The “route” element does not have an attribute.

(5) Navigation information (“info” element)

An “info” element is a child element of a “head” element, a “navi” element, or a “guide” element. The “info” element can be omitted. When necessary, the “info” element can be described one time. An “info” element describes real information of information to be output.

When the parent element of the “info” element is a “head” element, the system determines at what time and at what point information described in the “info” element is output. In the case that the parent element of the “info” element is a “navi” element, when the user arrives at a point described in a “point” element as a brother element of the “info” element, the information is output. When the patent element of the “info” element is a “guide” element, information is output at time or a time range described in a “time” element as a brother element of the “info” element. Alternatively, when the user is in the area of the point described in the “point” element as a brother element of the “info” element, information is output.

The content of a “navi” element may conflict with the content of a “guide” element. In such a situation, the system determines whether to output both or either of the contents corresponding to preset information or the like.

Next, an example of the description of the “info” element will be explained.

```
<info delay="-5 min" duration="1 min">
<text>
  Yoga Promenade
</text>
<voice>
This is a walkway called Yoga Promenade.
Let's walk to Kinuta Park.
</voice>
<image src="image/Youga-Promenade-01.jpg/">
</info>
```

That example causes the system to output navigation information of text, voice, and picture (image) for one minute in five minutes prior to the arrival at a particular point or a particular area or prior to particular time.

Next, attributes of an “info” element will be described.

(a) delay

The “delay” attribute designates the start time at which information is output. The “delay” attribute has the following values.

```
("+"|"−")?
((0|[1-9] [0-9]*) ("." [0-9]*)? "h")?
((0|[1-9] [0-9]*) ("." [0-9]*)? "min")?
((0|[1-9] [0-9]*) ("." [0-9]*)? "s")?
```

When the “delay” attribute does not have a sign or has a “+” sign, the attribute represents a delay from the start time (positive elapsed time). When the “delay” attribute has a “−” sign, the attribute represents an advance from the start time (negative elapsed time). The start time is defined as follows:

When the parent element of an “info” element is a “head” element, the system determines the start time.

When the parent element of an “info” element is a “navi” element, the start time is the time at which the user arrives at a point described in a “point” element as a brother element of the “info” element.

When the parent element of an “info” element is a “guide” element, if there is a “time” element as a brother element, not a “point” element as a brother element, the start time is the beginning of the time range described in the “time” element. In addition, when designated in a “times” attribute, the start time can be designated a plurality of times in the range of the time described in the “time” element (the start time is re-designated whenever the user enters the area).

if there are a “time” element and a “point” element as brother elements of the “info” element, the start time is time at which the user enters an area described in the “area” attribute in a time range described in the “time” element (the start time is re-designated whenever the user enters the area).

The “delay” attribute does not have a default value. When the “delay” attribute is not designated, the system determines the value of the “delay” attribute.

The following example represents “when the user arrives in an area of 1 km of the radius of a point (Point No. 12), navigation information (Guide Sample No. 12) is output in the text and voice formats in 0.1 hours after the arrival time”.

```
<guide>
<point area="1 km">
<name> Point No. 12 </name>
<latitude> N035. 03. 10. 0 </latitude>
<longitude> E140. 03. 10. 0 </longitude>
</point>
<info delay="+0.1 h">
<text> Guide Sample No. 12 </text>
<voice> Guide Sample No. 12 </voice>
</info>
</guide>
```

The following example represents “when the user passes through a point (Point No. 14), navigation data (Guide Sample No. 14) is output in the text and voice formats in five minutes prior to the passing time”.

<navi>
<point>
<name> Point No. 14 </name>
<latitude> N035. 03. 30. 0 </latitude>
<longitude> E140. 03. 30. 0 </alongitue>
</point>
<info delay="−5.0 min">
<text> Guide Sample No. 14 </text>
<voice> Guide Sample No. 14 </voice>
</info>
</navi>

(b) duration

A "duration" attribute designates the duration of information that is output. The "duration" attribute has the following values.

(0|[1-9] [0-9]*) ("."[0-9]*)? "hp")?
((0|[1-9] [0-9]*) ("."[0-9]*)? "min"))?
((0|[1-9] [0-9]*) ("."[0-9]*)? "s")?
"full-time"

"full-time" represents that output is continued in the following conditions:

When the parent element of the "info" element is a "head" element, the system determines the continuation of the output.

When the parent element of the "info" element is a "navi" element, information is continuously output until the next "navi" element becomes valid.

When the parent element of the "info" element is a "guide" element, information is continuously output until the current time exceeds the time range described in a "time" element of a brother element of the "info" element or until the current point exceeds an area of a point described in a "point" element as a brother element of the "info" element.

The "duration" attribute does not have a default value. When the value of the "duration" attribute is not designated, the system determines the value of the "duration" attribute.

The following example represents "after the user arrives in an area of 100 m of the radius of a point (Point No. 26), a guide (Guide Sample No. 26) is output in the text and voice formats for 1 minute and 30 seconds".

<guide>
<point area="100 m">
<name> Point No. 26 </name>
<latitude> N035. 04. 50. 0 </latitude>
<longitude> E140. 04. 50. 0 </longitude>
</point>
<info duration="1 min 30 sec">
<text> Guide Sample No. 26 </text>
<voice> Guide Sample No. 26 </voice>
</info>
</guide>

The following example represents "after the user arrives in an area of 1 km of the radius of a point (Point No. 45), in 100 sec after the arrival time, a guide (Guide Sample No. 45) is output in the text and voice formats for 0.001 hours".

<guide>
<point area="1 km">
<name> Point No. 45 </name>

<latitude> N035. 06. 40. 0 </latitude>
<longitude> E140. 06. 40. 0 </longitude>
</point>
<info delay="100 s" duration="0.001 h">
<text> Guide Sample No. 26 </text>
<voice> Guide Sample No. 26 </voice>
</info>
</guide>

(c) times

A "times" attribute is valid only when the parent element of the "info" element is a "guide" element. When there is a "point" element as a brother element of the "info" element, whenever the user enters an area of a point described in an "area" attribute, information described in an "info" element is output a number of times described in the "times" attribute. When there is not a "point" element as a brother element of the "info" element (namely, there is only a "time" element as a brother element), depending on the system, information described in the "info" element may be output a number of times described in the "times" attribute in a time range described in the "time" element. The "times" attribute has the following values.

(0|[1-9] [0-9]*)|"any-times"

"any-times" represents that information can be output any number of times. The "times" attribute does not have a default value. When the value of the "times" attribute is not designated, the system determines the number of times of the output of information.

The following example represents "when the user arrives in an area of 1 km of the radius of a point (Point No. 92), after the arrival time, a guide (Guide Sample No. 92) is output in the text and voice formats up to three times". In other words, whenever the user enters and exits a designated area, a guide is output up to three times.

<guide>
<point area="1 km">
<name> Point No. 92 </name>
<latitude> N035. 11. 10. 0 </latitude>
<longitude> E140. 11. 10. 0 </longitude>
</point>
<info times="3">
<text> Guide Sample No. 92 </text>
<voice> Guide Sample No. 92 </voice>
</info>
</guide>

The following example represents "when the user arrives in an area of 1 km of the radius of a point (Point No. 94), after the arrival time, a guide (Guide Sample No. 45) is output in the text and voice formats. Even if the user repeatedly enters and exits the area of 1 km of the radius of the point, the guide is always output".

<guide>
<point area="1 km">
<name> Point No. 94 </name>
<latitude> N035. 11. 30. 0 </latitude>
<longitude> E140. 11. 30. 0 </longitude>
</point>
<info times="any-times">
<text> Guide Sample No. 94 </text>
<voice> Guide Sample No. 94 </voice>
</info>
</guide>

Next, each portion of the apparatus (shown in FIG. 2A) according to the present invention will be described.

[Information Presentation Timing Controlling Portion 10]

The information presentation timing controlling portion 10 obtains virtual time and place received from the time—place generation processing portion 20 and real time and place received from the sensor 25 and causes the presentation of information to be started and stopped corresponding to various information presentation conditions described in NVML data. As shown in FIG. 2B, the information presentation timing controlling portion 10 has a point passage—arrival check table 110, a navi arrival time prediction table 120, a navigation information management table 130, an information presentation schedule table 140, and an guiding event management table 150.

The point passage—arrival check table 110 is a table for checking whether or not the user passed or arrived at a point described in a "navi" element or a "guide" element. The navi arrival time prediction table 120 is a table for managing the guide content (info), the delay, and the arrival prediction time of a point described in the "navi" element. The navigation information management table 130 is a table for managing the guide content (info), the delay, the presentation period (duration), and the number of presentation times (times) of a point described in a "guide" element.

The information presentation schedule table 140 designates the presentation start time calculated with the delay information, the arrival prediction time, or the point passage—arrival time for each point of the navi arrival time prediction table 120 and the navigation information management table 130 so as to manage the presentation schedule of navigation information. The guiding event management table 150 is a table for designating the presentation end time of navigation data having the duration so as to manage the duration of the navigation data.

Figure 3:
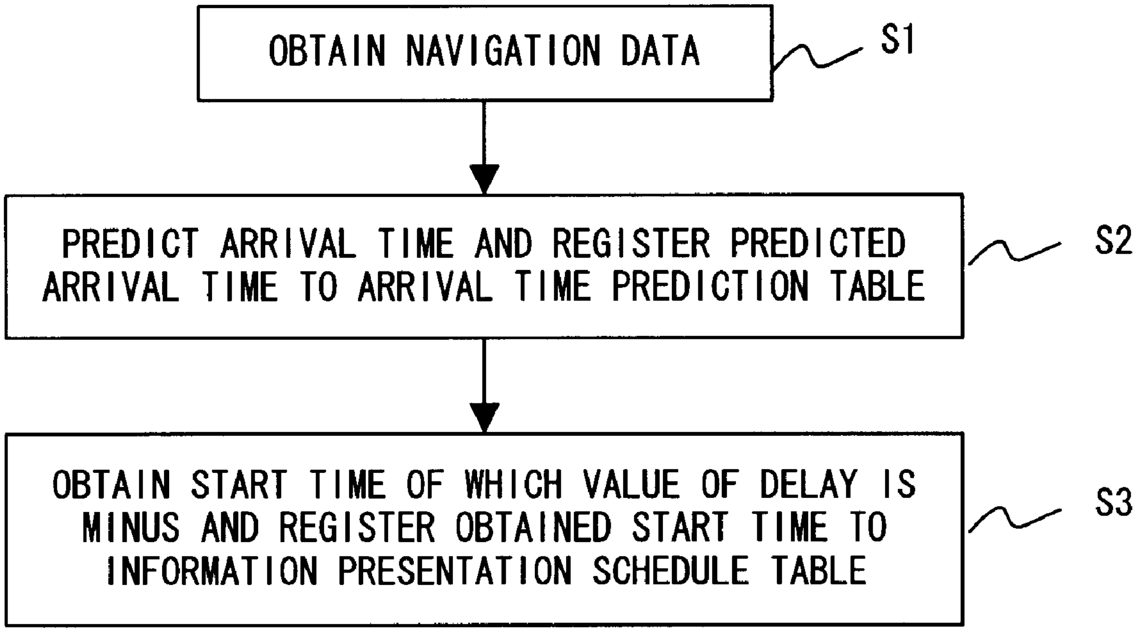
FIG. 3 is a flow chart showing a guide preparing process.

As shown in FIG. 3, as the guide preparing process, when the information presentation timing controlling portion 10 receives navigation data (NVML data) (at step S1), the information presentation timing controlling portion 10 predicts the arrival time corresponding to the distance between points and the speed of the vehicle and writes the arrival prediction time to the navi arrival time prediction table 120 (at step S2).

Only for a guide of which the value of the delay as an attribute of a transit point (navi) is minus, the information presentation timing controlling portion 10 obtains the presentation start time corresponding to the arrival prediction time and registers the obtained presentation start time to the information presentation schedule table 140 (at step S3).

Thereafter, if the information presentation timing controlling portion 10 obtains time data from the time—place generation processing portion 20 or the sensor 25, the information presentation timing controlling portion 10 references the information presentation schedule table 140. When the time of the time data matches or exceeds the presentation start time, the information presentation timing controlling portion 10 starts presenting the guide.

When the value of the delay of a guide of a transit point (navi) is plus, the information presentation timing controlling portion 10 checks the current position of the vehicle using the point passage—arrival check table 110. When the current position is in a predetermined area of the designated point, the information presentation timing controlling portion 10 determines that the vehicle arrived at the point. After the information presentation timing controlling portion 10 has determined that the vehicle had arrived at the point, the information presentation timing controlling portion 10 adds the plus value of the delay to the current time as the presentation start time and registers the resultant presentation start time to the information presentation schedule table 140.

If the delay has not been defined, when the information presentation timing controlling portion 10 has determined that the vehicle had arrived at the point, the information presentation timing controlling portion 10 starts presenting the guide. In other words, the information presentation timing controlling portion 10 registers the current time as the presentation start time to the information presentation schedule table 140 and starts presenting the guide.

Since the arrival time cannot be predicted for a guide of a guide point (guide), when the information presentation timing controlling portion 10 has determined that the vehicle had entered a predetermined area of the guide point (guide) corresponding to the point passage—arrival check table 110, the information presentation timing controlling portion 10 designates time at which the guide with the delay and registers the resultant time to the information presentation schedule table 140.

In other words, the information presentation timing controlling portion 10 registers the presentation start time to the information presentation schedule table 140 at the following timings. For a guide of a transit point (navi), if the value of the delay is minus, the information presentation timing controlling portion 10 initially registers the presentation start time to the information presentation schedule table 140. On the other hand, if the value of the delay is plus, the information presentation timing controlling portion 10 registers the presentation start time to the information presentation schedule table 140 when the vehicle arrived at the point. For a guide of a guide point (guide), the information presentation timing controlling portion 10 registers the presentation start time to the information presentation schedule table 140 when the vehicle arrived in a predetermined area of the point.

In such a manner, the information presentation timing controlling portion 10 registers the presentation start time to the information presentation schedule table 140. The information presentation timing controlling portion 10 checks the guide list for the presentation start time whenever the information presentation timing controlling portion 10 receives the current time and place from the time—place generation processing portion 20 or the sensor 25. When the current time becomes the presentation start time designated on the guide list, the information presentation timing controlling portion 10 starts presenting the guide.

Since the user may deviate from a course defined in the NVML data, the information presentation timing controlling portion 10 checks the point passage—arrival check table 110. When the value of the delay is minus, the information presentation timing controlling portion 10 checks the point passage—arrival check table 110. When the value of the delay is minus, the information presentation timing controlling portion 10 determines whether or not the vehicle arrived at the preceding point. When the vehicle did not arrive at the preceding point, the information presentation timing controlling portion 10 does not present a guide. When the vehicle arrived at the preceding point, the information presentation timing controlling portion 10 presents a designated guide for a designated duration. Since the information presentation timing controlling portion 10 cannot check the passage and arrival of the vehicle at the first point, the information presentation timing controlling portion 10 does not present a guide. If the value of the delay is plus, when the vehicle arrived at the point, since the information presentation timing controlling portion 10 registers the information to the information presentation schedule table 140, the information presentation timing controlling portion 10 does not check the point passage—arrival check table 110 unlike the case of which the value of the delay is minus.

At the presentation start time, the information presentation timing controlling portion 10 outputs a guide start signal and presents a guide. At that point, the information presentation timing controlling portion 10 interprets the duration of the navigation data and registers the obtained presentation end time to the guiding event management table 150. Thereafter, the information presentation timing controlling portion 10 checks the guiding event management table 150, continuously presents the guide until the presentation end time, and outputs a guide end signal at the presentation end time. After guides are presented, if they are not necessary, the information presentation timing controlling portion 10 deletes them from the guiding event management table 150.

In the case of a guide point (guide), since the vehicle may repeatedly enter and exit an area thereof, the number of presentation times of the guide can be designated. The number of presentation times is managed on the navigation information management table 130. Whenever the information is presented, the value of the number of presentation times is decremented by 1. When the value of the number of presentation times becomes 0, the information presentation timing controlling portion 10 deletes the guide from the navigation information management table 130. In addition, a guide point can be designated "any-times". In the case, whenever the vehicle enters a predetermined area, information is output.

FIG. 4 is a flow chart showing the guide presenting process. When the information presentation timing controlling portion 10 obtains time—place data (at step S11), the information presentation timing controlling portion 10 checks the passage of the point using the point passage—arrival check table 110 corresponding to the place (at step S12). When the vehicle arrived at the point (at step S13) (namely, the determined result at step S13 is Yes), the information presentation timing controlling portion 10 updates the point passage—arrival check table 110 (at step S14). In addition, the information presentation timing controlling portion 10 re-calculates the arrival prediction time of the navi arrival time prediction table 120 and updates it (at step S15).

The information presentation timing controlling portion 10 checks whether or not the value of the delay designated to the navigation information of the point is 0 (at step S16). When the value of the delay is 0 (namely, the determined result at step S16 is Yes), the flow advances to step S20. When the value of the delay is plus (namely, the determined result at step S16 is No), the information presentation timing controlling portion 10 adds the value of the delay (+) to the current time as the presentation start time and registers the obtained presentation start time to the information presentation schedule table 140 (at step S17). When necessary, the information presentation timing controlling portion 10 corrects the presentation start time of navigation information of which the value of the delay is minus and that is registered in the information presentation schedule table 140 corresponding to an error between the pre-calculated arrival prediction time and the real arrival time.

Thereafter, the information presentation timing controlling portion 10 collates the time of the obtained time—place data with the presentation start time of navigation information registered in the information presentation schedule table 140 (at step S18). When there is navigation information of which the obtained time matches or exceeds the presentation start time registered in the information presentation schedule table 140 (at step S19) (namely, the determined result at step S19 is Yes), the flow advances to step S20. When there is no navigation information (namely, the determined result at step S19 is No), the flow returns to step S11.

Thereafter, the information presentation timing controlling portion 10 presents the guide (at step S20). Next, the information presentation timing controlling portion 10 registers the presentation end time of the guide to the guiding event management table 150 (at step S21).

Figure 5:
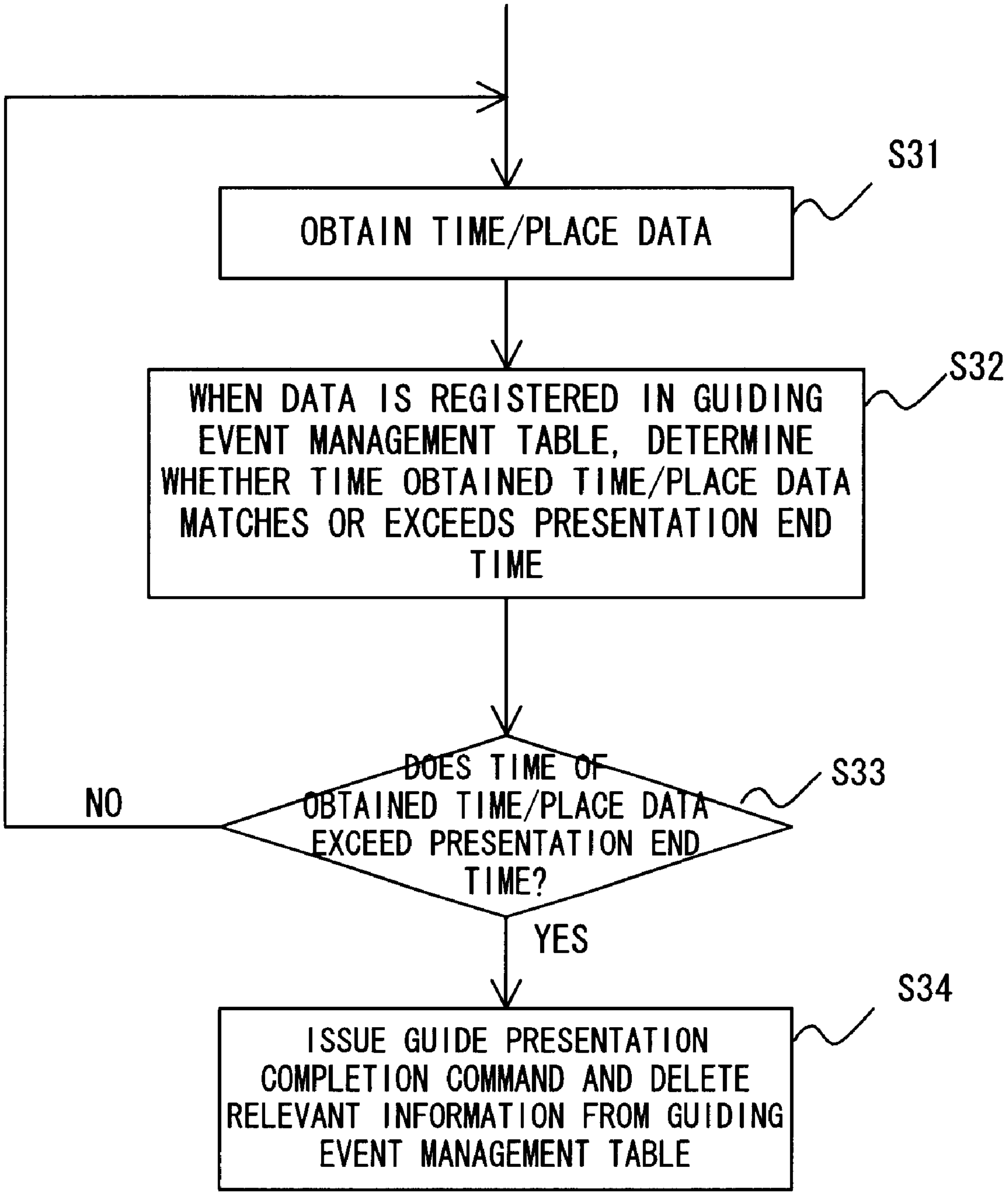
FIG. 5 is a flow chart showing a guide presentation terminating process.

FIG. 5 is a flow chart showing a guide presentation terminating process. The information presentation timing controlling portion 10 obtains time—place data (at step S31). When data is registered in the guiding event management table 150, the information presentation timing controlling portion 10 determines whether or not the time of the obtained time—place data matches or exceeds the presentation end time of navigation information registered in the guiding event management table 150 (at step S32). When the time of the obtained time—place data matches or exceeds the presentation end time (namely, the determined result at step S33 is Yes), the information presentation timing controlling portion 10 issues a guide presentation termination command and deletes the relevant information from the guiding event management table 150 (at step S34).

<Predicting Arrival Time>

Next, with reference to FIG. 6, a method for predicting arrival time will be described. In the simulation mode, although it is possible to completely designate arrival time, in reality, the arrival time is uncertain until the vehicle arrives. Thus, it is necessary to approximately obtain arrival prediction time. The arrival prediction time is obtained corresponding to the distance between points, attributes of roads (such as a regulated speed and the numbers of lanes of a road), congestions of a road, road conditions (such as presence of an accident), weather conditions, user information, and user's driving history. Since road conditions and weather conditions vary time by time, the process for obtaining the arrival prediction time is repeatedly performed at predetermined intervals so as to correct it with the latest information. As the navi arrival time prediction table 120 is corrected, since the presentation start time may be varied. In that case, it is necessary to correct the information presentation schedule table 140.

<Guide Duration>

Figure 7A:
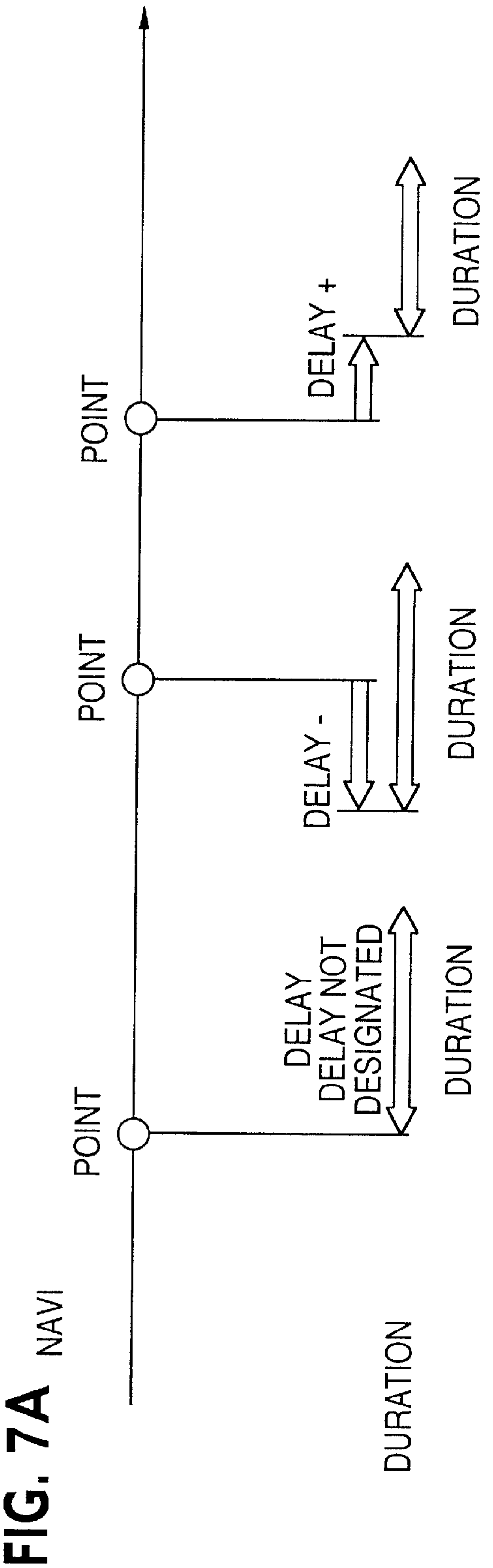
FIG. 7A is a schematic diagram for explaining a first timing of a guide presentation.

As shown in FIG. 7A, when the delay of a guide for a transit point (navi) has not been designated, time at which the vehicle arrives at the point is defined as presentation start time. From the presentation start time, the information is presented for the duration thereof. When the value of the delay is minus (−), the delay is subtracted from the arrival prediction time at which the vehicle arrives at the point. The result is defined as presentation start time. From the presentation start time, the information is presented for the duration thereof. When the value of the delay is plus (+) the value of the delay is added to the arrival time at which the vehicle arrives at the point. The result is defined as presentation start time. From the presentation start time, the information is presented for the duration thereof.

Figure 7B:
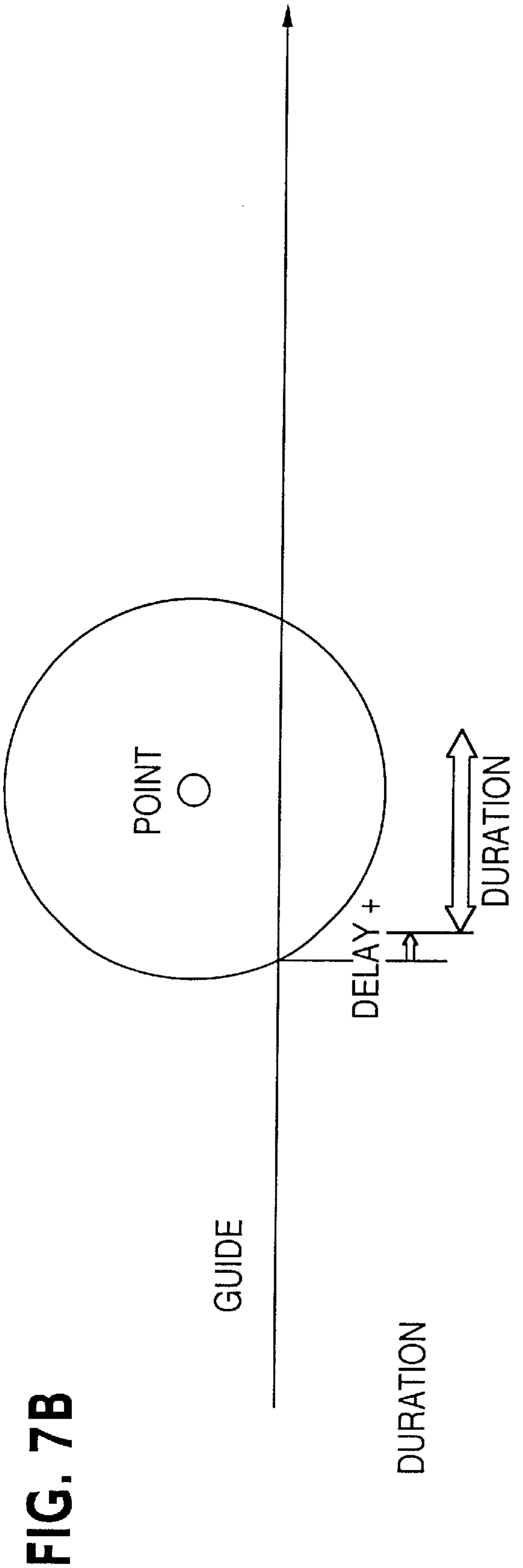
FIG. 7B a schematic diagram for explaining a second timing of the guide presentation.

As shown in FIG. 7B, for a guide for a guide point (guide), time at which the vehicle enters a predetermined area (area) of the guide point is defined as presentation start point. From the presentation start time, the information is presented for the duration thereof.

The duration for which a guide is presented depends on the duration designated in the NVML data. The duration is a designated time period for a still picture and a text that do not have a time limitation. On the other hand, for data such as a voice and a moving picture that have a time limitation (as a play duration), the data is basically output until it is completed. When the duration of data is short, the presentation of the data may be stopped in the middle depending on a situation.

For the duration, instead of directly designating time, "full-time" may be designated. When there is another transit point (navi), data may be continuously presented until the vehicle passes through the transit point. In the case of a guide point (guide), data may be presented while the vehicle enters a predetermined area of the point. In addition, when "voice-time" is designated, until a voice guide is completed, a still picture and a text may be continuously presented. Thus, the durations of various guides can be designated simply in the text format.

<Process for Guides that Overlap>

When the duration of one guide overlaps with the duration of another guide, if the guides use the same source, they may not be output due to a hardware restriction. Even if two guides can be output by the hardware, when they are output at a time, they may cause the user to confuse. When a plurality of still pictures are presented on a plurality of screens, it is very difficult for the user to see them.

Thus, when guides overlaps, it is necessary to adjust the durations of the guides so as to properly process them. To do that, guides are designated priority levels. When there are a guide for a transit point (navi) and a guide for a guide point (guide), priority levels are designated thereto so that the priority level of a transit point (navi) is higher than the priority level of a guide point (guide)". When the durations of guides in the same priority level overlap, a higher priority level is re-designated to the later guide than the earlier guide. When the duration of a guide for a point and the duration of a guide for a route overlap, a higher priority level is designated to the guide for the point than the guide for the route.

FIG. 8 shows an example of priority order. Referring to FIG. 8, in the case that the duration of an earlier guide overlaps with the duration of a later guide, priority levels are designated depending on whether the relation is (navi) and (navi), (navi) and (guide), (guide) and (navi), or (guide) and (guide). When the relation is (navi) and (navi), (guide) and (navi), or (guide) and (guide), the priority levels are designated so that "the current guide is immediately stopped and the next guide is started". When the relation is (navi) and (guide), the priority levels are designated so that "the current guide is output in the duration and then the next guide is output".

When information has reproduction time as with a voice guide and a moving picture guide, the durations of a text guide and a still picture guide may become short corresponding to the priority levels. When a text guide or a still picture guide is not completed in the designated duration, it is forcedly stopped in the middle. Even if the duration of a voice guide or a moving picture guide becomes short due to the adjustment of the priority levels, the voice guide or the moving picture guide is played and presented from the beginning.

Figure 9:
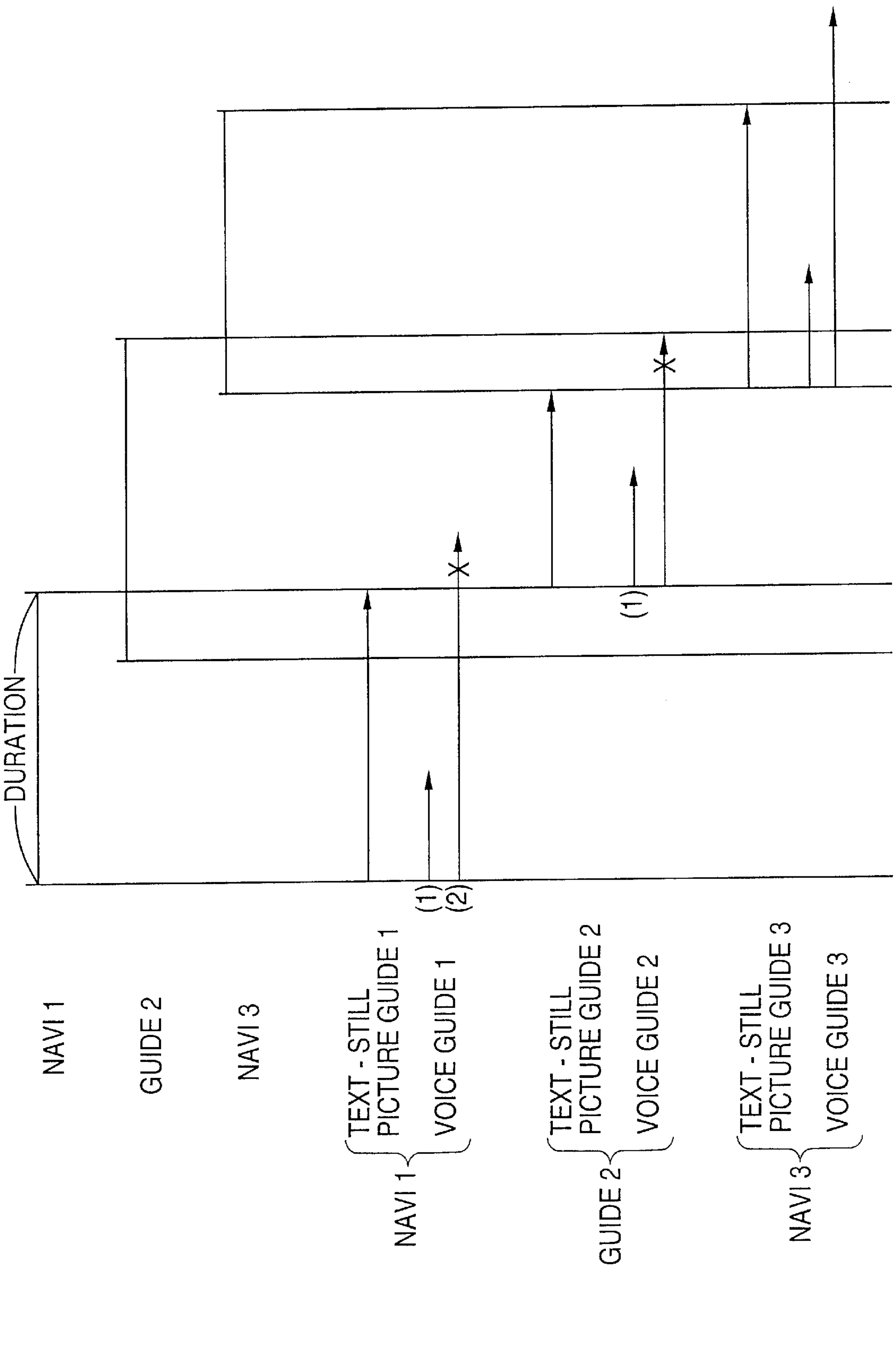
FIG. 9 is a schematic diagram showing an example of a duration in the case that two presentation guides overlap.

For example, as shown in FIG. 9, when the duration of a navi 1 (a text—still picture guide 1 and a voice guide 1 are output) and the duration of a guide 2 (a text—still picture guide 2 and a voice guide 2 are output) overlap, according to the designation of the priority levels shown in FIG. 8, until the duration of the navi 1 is completed, the text—still picture guide 1 and the voice guide 1 are continuously output. After the duration of the navi 1 is completed, the text—still picture guide 2 and the voice guide 2 are output. When the output time of the voice guide 1 exceeds the duration of the navi 1, the voice guide 1 is forcedly stopped in the middle.

When the duration of the guide 2 overlaps with the duration of a navi 3 (a text—still picture guide 3 and a voice guide 3 are output), according to the designation of the priority levels shown in FIG. 8, the text—still picture guide 2 and the voice guide 2 are forcedly stopped. Thereafter, the text—still picture guide 3 and the voice guide 3 are output. In that case, even if the output time (play time) of a voice guide exceeds the duration, when the duration of the next guide does not start, the text—still picture guide 3 and the voice guide 3 are continuously output until the duration is completed. When there is information of a route, if higher priority levels are designated to a transit point (navi-point), a passage route (navi-route), and a guide point (guide-point), the information can be processed in the same manner.

When the presentation of navigation information is processed corresponding to priority levels, information of some guides may not be presented. In such a case, navigation information may be designated the delay. In the real guide mode or the simulation mode, the presentation start time may be designated to blank time so as to present navigation information. Alternatively, navigation information may be chronologically divided. Alternatively, navigation information may be changed whenever a user's operation (such as a clicking operation) is performed.

Thus, by adjusting the delay and duration, navigation information can be effectively presented. In other words, depending on an application for use, all or desired information may be selectively presented.

<Use of Blank Time>

Even if guides are processed in such a manner, there may be blank time at which they are not presented. Thus, using blank time at which navigation information is not presented, effective services can be accomplished. For example, information about points may be pre-registered. At blank time, the registered information may be presented. In such a manner, commercial messages and previews of next guides may be presented. With such commercial messages, advertisement fees may be collected from advertisers.

<Guides of Three-Dimensional Pictures>

When a three-dimensional picture is presented as navigation information, the three-dimensional space of the picture to be presented is aligned to the current position so that the guide is clearly presented. To do that, the following designations are performed.

```
<virtual-world scr="sample.wrl"
    scale="2.0 m-per-unit"
    origin-x="10.0"
    origin-y="10.0"
    origin-z="10.0"
    north-x="0.0"
    north-y="0.0"
    north-z="0.0"/>
```

In such a definition, the display position and the orientation of a three-dimensional picture content can be matched with the information of a point and the traveling direction of the user. In addition, the size of the picture to be presented can be designated so that the picture synchronizes with the traveling distance. In other words, when the user virtually or really travels for 2 m, the picture corresponding to the user is moved for 1 unit in the virtual space. To display the picture that is moved as the user travels, the following designation is performed.

scale=2.0 m-per-unit

Thus, the distance for which the user actually travels can be converted into a unit in the virtual space. Thus, the real traveling of the user can be synchronized with the movement of the picture.

Figure 10:
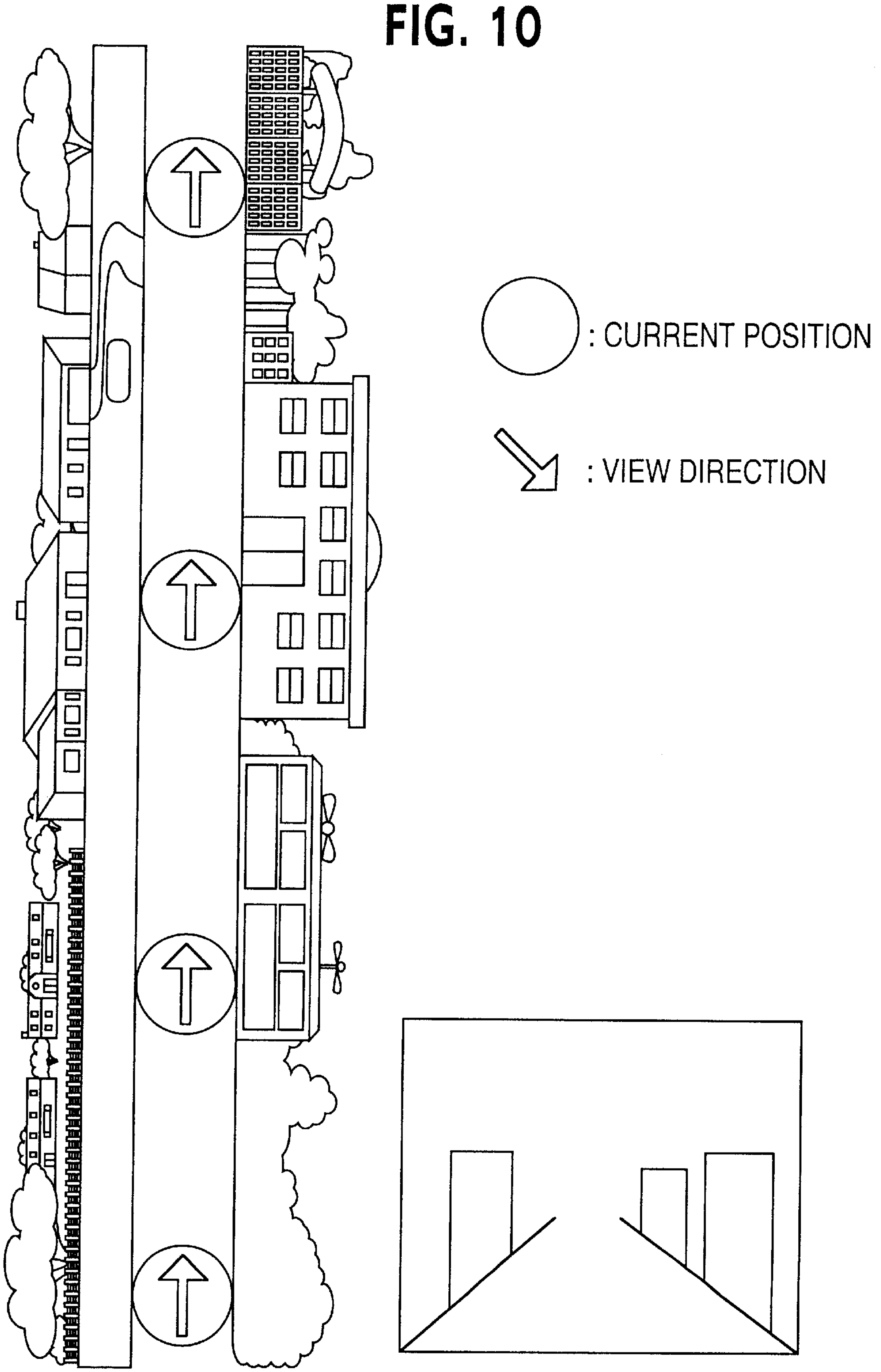
FIG. 10 is a schematic diagram for explaining a walk-through mode for a guide of a three-dimensional picture.
Figure 11:
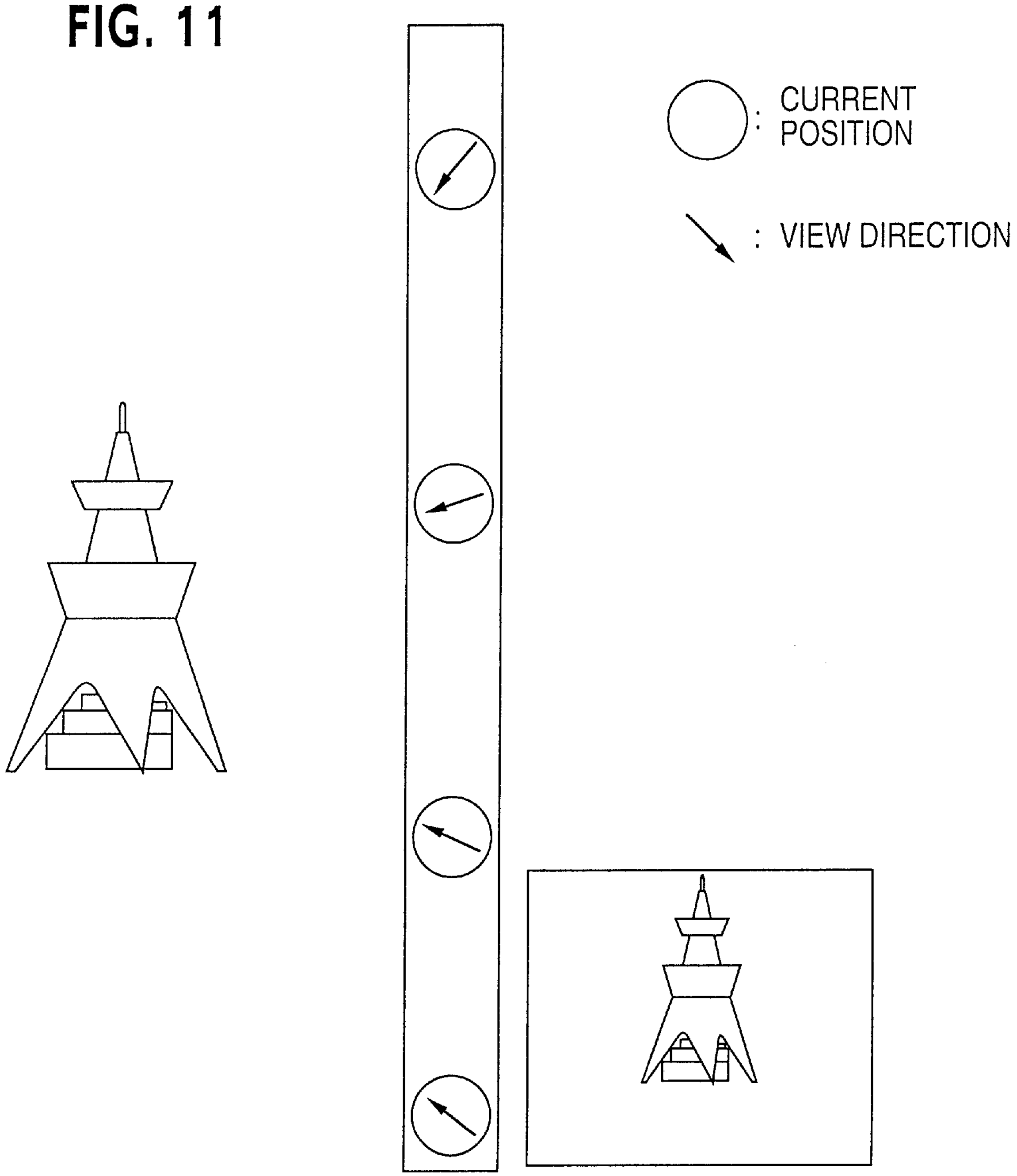
FIG. 11 is a schematic diagram for explaining a view point moving mode for a guide of a three-dimensional picture.

As a method for displaying a picture in synchronization with the traveling of the user, there are for example walk through mode and view point traveling mode. In the view point traveling mode, an object is tracked. When a picture of a street is presented, as shown in FIG. 10, the walk through mode in which the view point is oriented forward is preferred. On the other hand, when the user looks around a featured building (for example, a tower or a castle), as shown in FIG. 11, the view point traveling mode for a virtual space is preferred (the user travels while seeing a castle) According to the NVML data, a transit point (navi) is presented in the walk through mode, whereas a guide point (guide) is presented in the view point traveling mode of which the user travels while orienting a particular direction.

[Sensor 25]

The sensor 25 measures the real time—place using a position managing system that detects the current position corresponding to the position of satellite GPS or a base station of a cellular phone or a PHS and supplies the measured real time—place to the information presentation timing controlling portion 10 at predetermined intervals.

[Time—Place Generation Processing Portion 20]

The time—place generation processing portion 20 controls the generation of time—place data so as to properly present and simulate a guide corresponding to a situation. As shown in FIG. 12, the time—place generation processing portion 20 comprises an operation interface 210, a vehicle speed—time step designating portion 220, and a time—place generator 200. The operation interface 210 allows the user to perform various operations such as reproducing operation, fast forward operation, skip operation, and rewind operation. The vehicle speed—time step designating portion 220 designates the speed of a vehicle and a time step. The time—place generator 200 generates time —place data.

The time—place generation processing portion 20 obtains the speed of the vehicle and the time step information from the vehicle speed—time step designating portion 220. The time—place generator 200 generates the time—place data corresponding to the input operation of the operation interface 210 and supplies the generated time—place data to the information presentation timing controlling portion 10.

In reality, the time—place generation processing portion 20 reads a route from the received NVML data. The vehicle speed—time step designating portion 220 obtains the speed of the vehicle and the time step, calculates the required time corresponding to the obtained distance and the speed, and calculates the traveling width corresponding to the time step. The time—place generation processing portion 20 calculates a point that enters or exit a guide area of a guide point (guide) on the route and generates time—place data. The time—place generation processing portion 20 stops generating the time—place data, generates it, and quickly generates it corresponding to a request received from the operation interface 210.

In addition, the time—place generation processing portion 20 has various modes for simulating a guide and generates time—place data in various manners. For example, the time—place generation processing portion 20 presents a guide in the real scale, gradually advances a portion of which navigation information is output, intermittently presents guides (skipping), and travels all vehicles at the same speed. In other words, the time—place generation processing portion 20 changes a mode corresponding to an application for use.

As a basic process, real time is shortened. However, a process for presenting time—place at which a guide is presented from being skipped is performed. When the time step is large, time place are largely skipped. As a result, presentation start time of a guide registered in the information presentation schedule table 140 and time—place data corresponding to a point may not be generated. Consequently, no guides may be presented. In the normal guide presenting process, since the time step is sufficiently small, a situation of which no guides are presented hardly takes place. However, in the simulation mode, the vehicle may be traveled at high speed. Thus, time—place at which a guide is presented may be largely skipped.

To prevent such a problem, points at which guides are presented are pre-calculated. The step width is varied so that at least the vehicle passes through the points. As a result, time—place data is generated. In reality, when the time step width exceeds a point at which information is output, the step width is shortened.

Figure 13A:
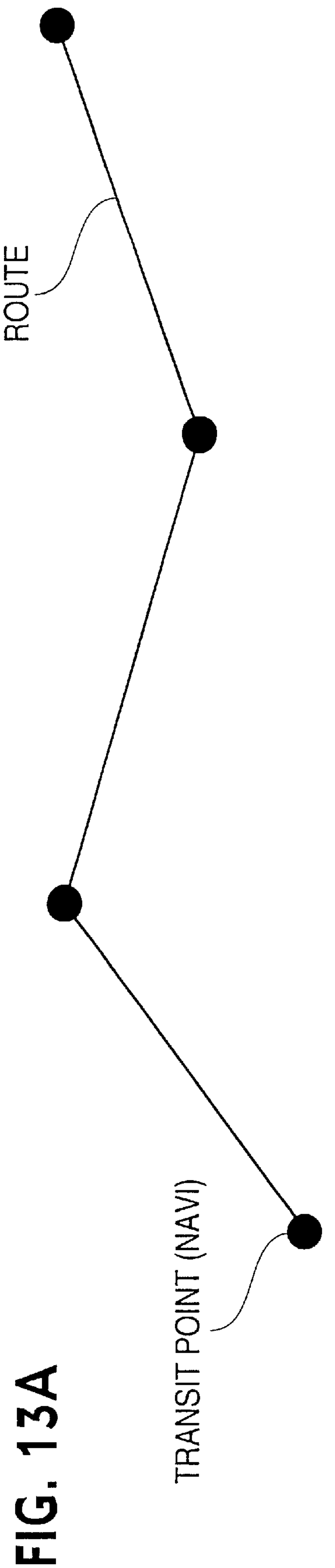
FIG. 13A is a schematic diagram showing a route.
Figure 13B:
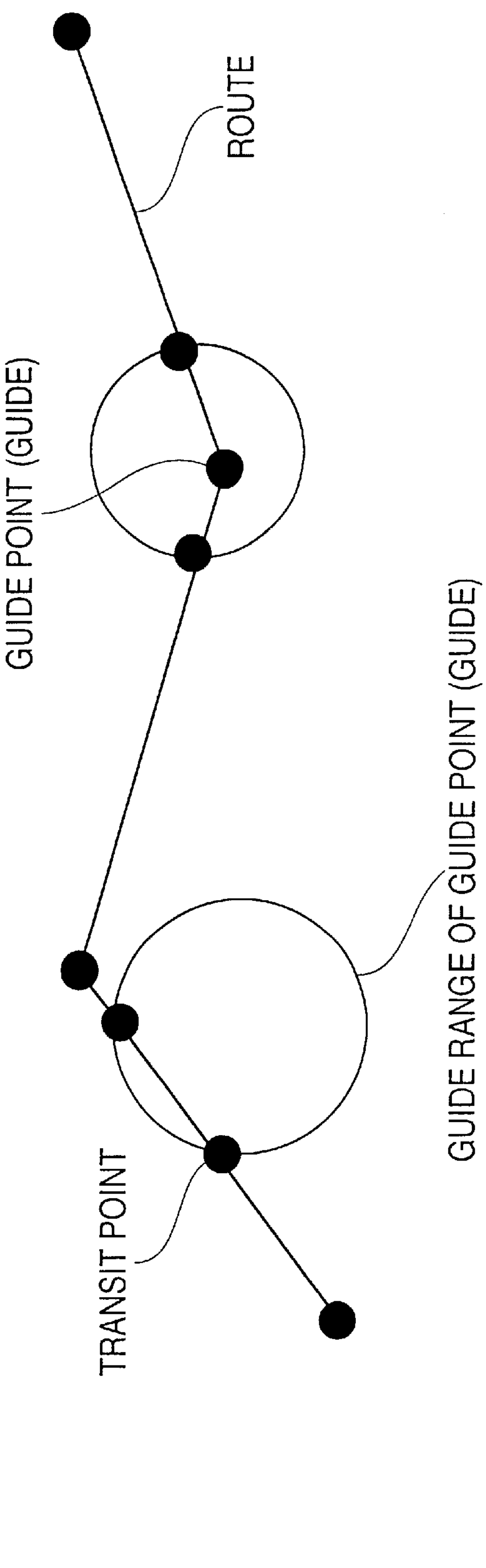
FIG. 13B is a schematic diagram for explaining an obtainment of a point and a transit point.

First of all, as shown in FIG. 13A, each point (transit point—navi) is obtained from the course. Next, as shown in FIG. 13B, a transit point that is an intersection of a circle that represents the range of a guide point (guide) and a route is obtained. In addition, a point at which a guide is output in consideration of the delay and a point at which a guide is stopped in consideration of the duration are calculated so that time—place (transit point) at which a guide is presented is always generated.

Figure 14A:
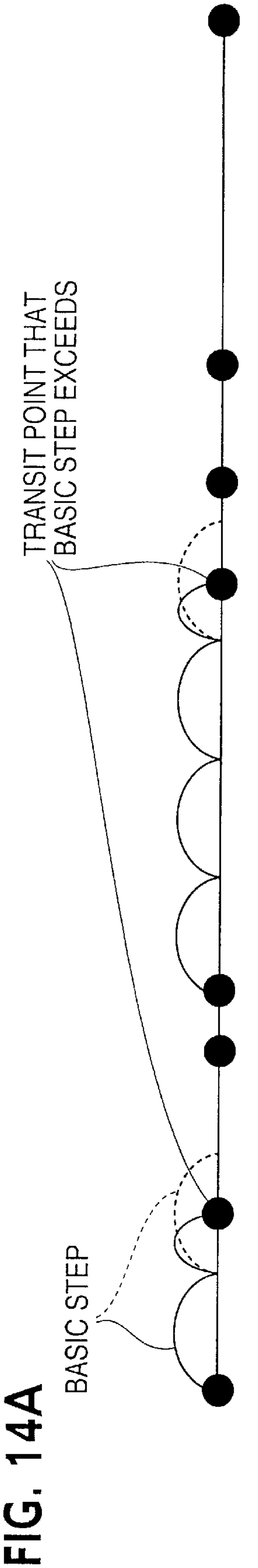
FIG. 14A is a schematic diagram showing a basic step.
Figure 14B:
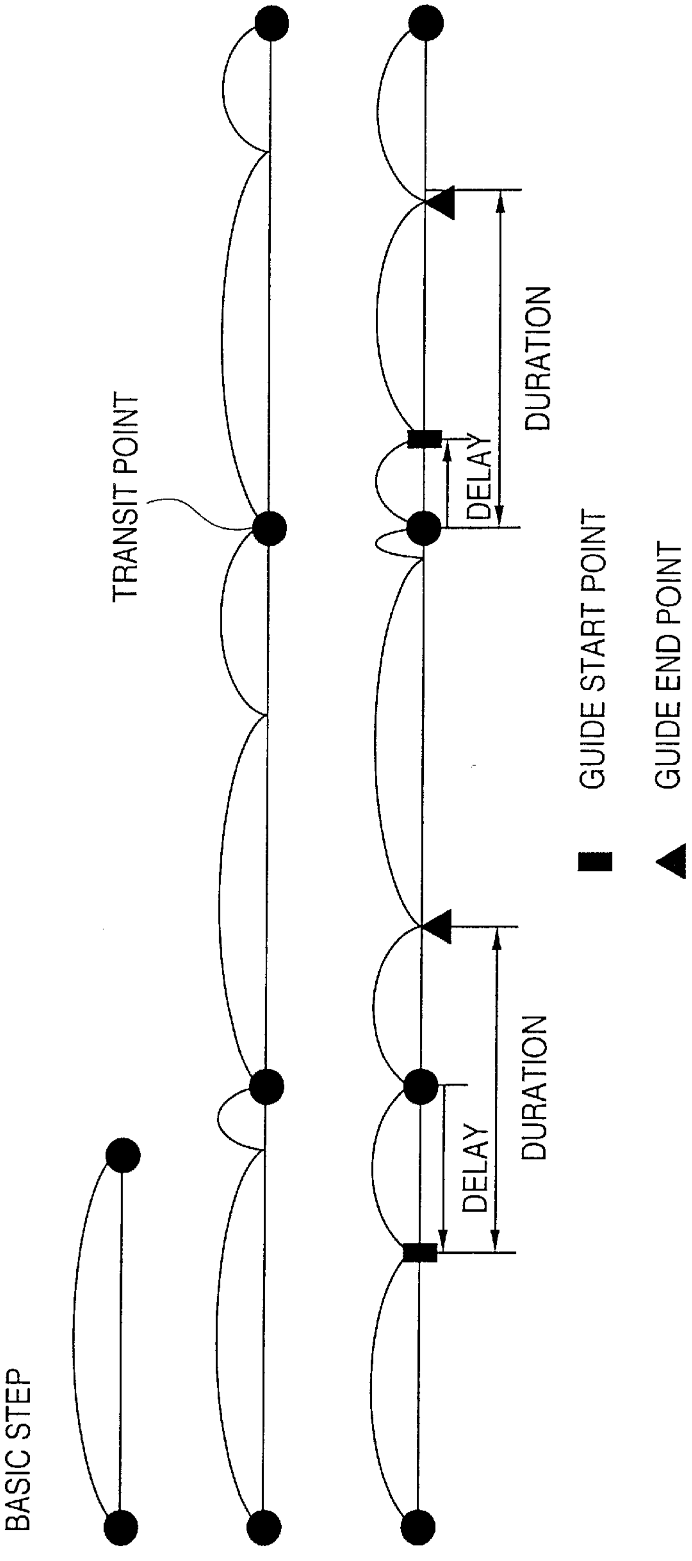
FIG. 14B is a schematic diagram for explaining an adjustment of a basic step.

Next, as shown in FIG. 14A, the traveling width is calculated at the basic step corresponding to the speed of the vehicle and time. As shown in FIG. 14B, when the basic step exceeds a place (transit point), the basic step is shortened so that it matches a transit point.

When a guide point (guide) deviates at an intersection on the rear of a circle that represents the area of the guide point or due to a delay thereof, it does not affect a guide. Thus, it is not necessary to stop the traveling at the point. However, in a real guide, the traveling is stopped at the point so that the user can easily see it.

Figure 15:
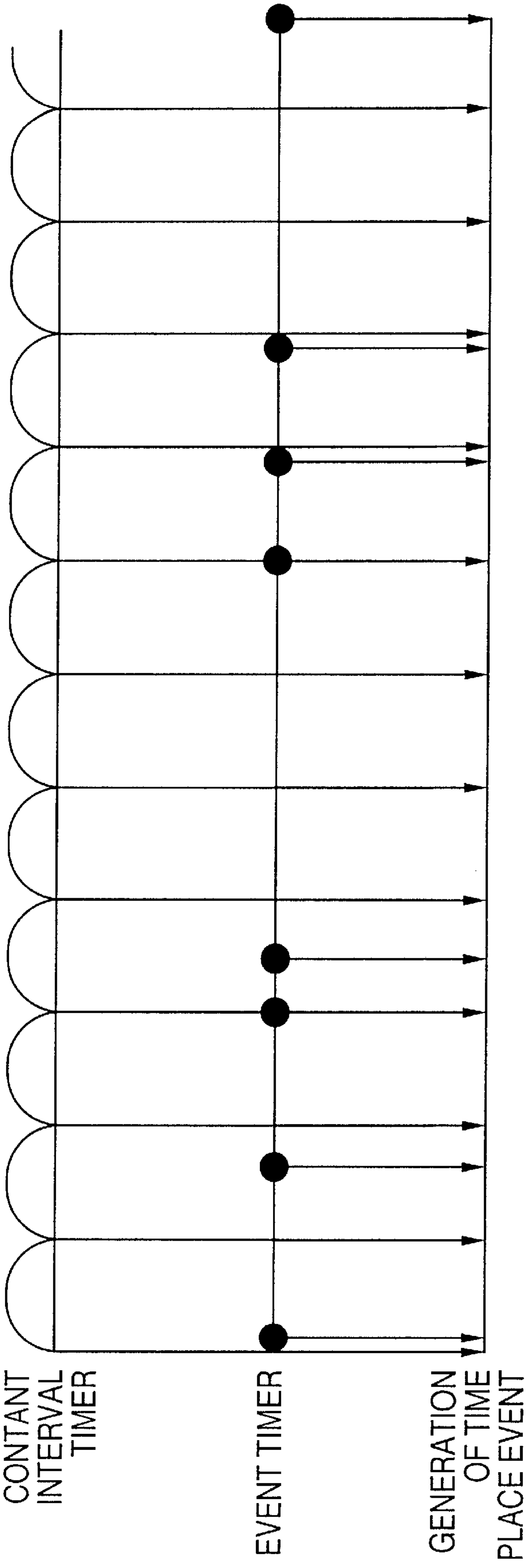
FIG. 15 is a schematic diagram for explaining occurrences of time—place events using two timers.

Time—place data may be generated using two timers. In this case, as shown in FIG. 15, a constant interval timer and an event timer corresponding to pre-designated guides are used so as to generate time—place events.

Figure 16:
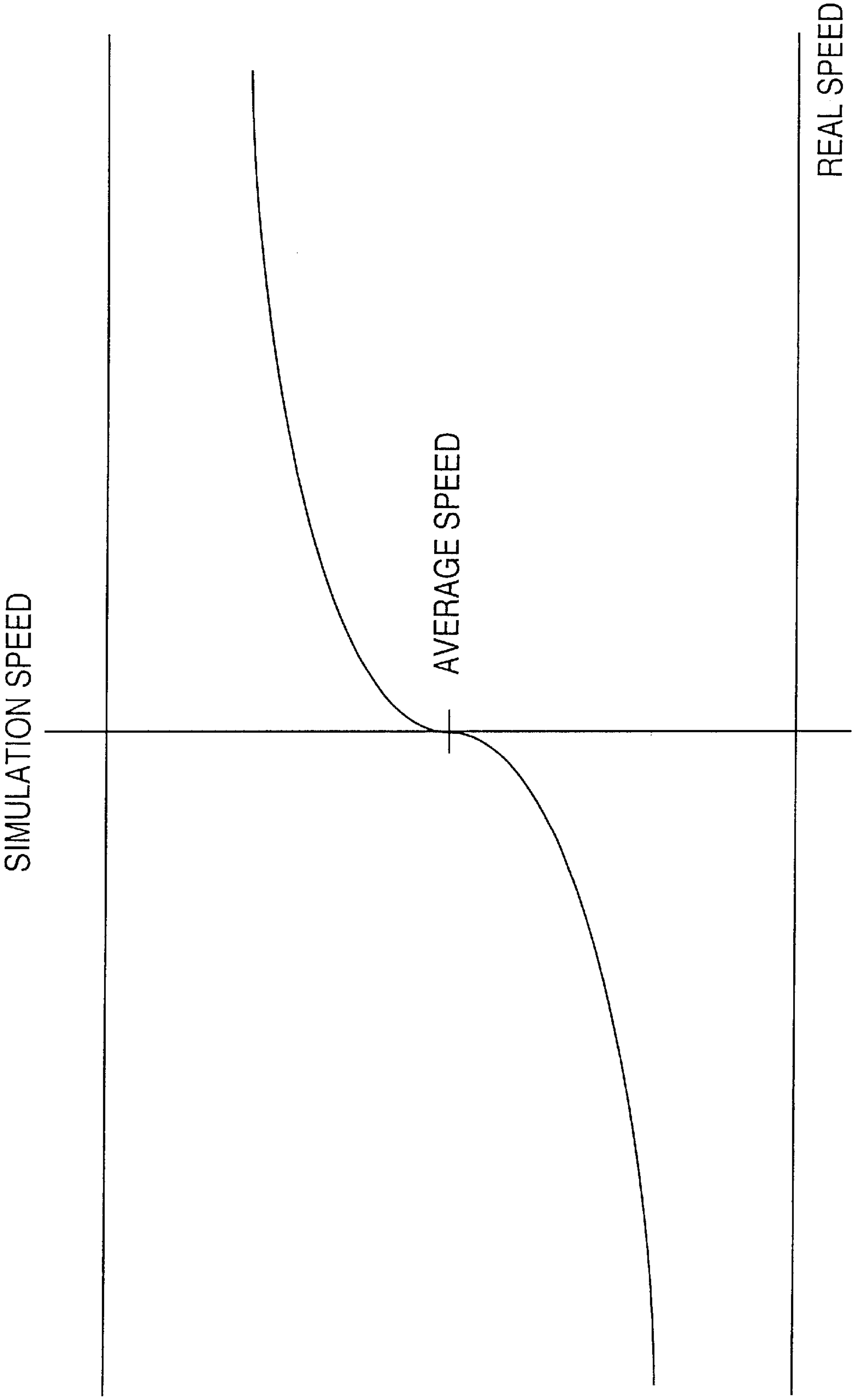
FIG. 16 is a graph showing an example of a speed filter (function) for adjusting a speed.

When the traveling of a plurality of types of vehicles is simulated with speed differences thereof, a guide presented for a high speed vehicle may not been clearly displayed. In such a case, using a function (speed filter) as shown in FIG. 16, the speed is averaged. As a result, with different speeds of the vehicles, the traveling can be simulated in the state that guides can be clearly displayed.

Figure 17A:
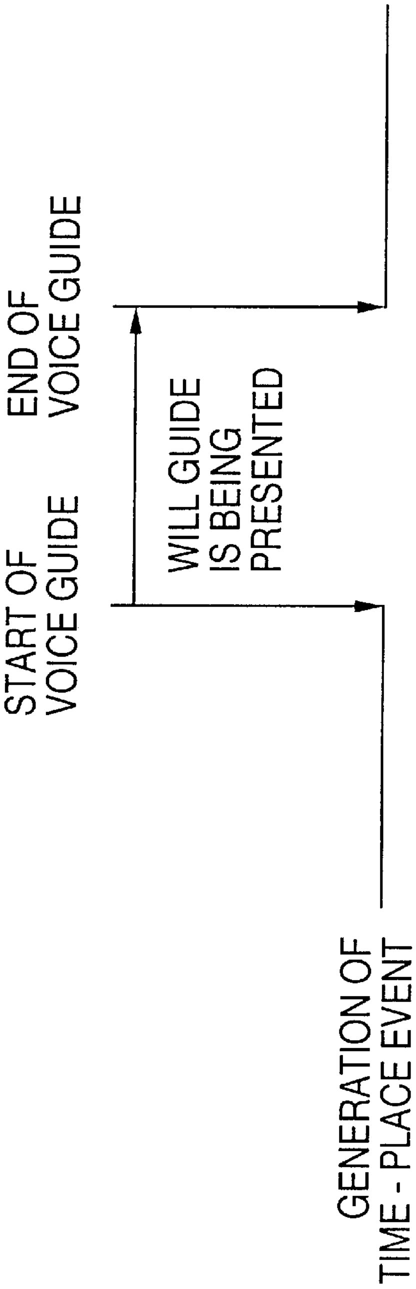
FIG. 17A is a schematic diagram showing a first example of guide presentation start—stop operations due to occurrences of time—place events.
Figure 17B:
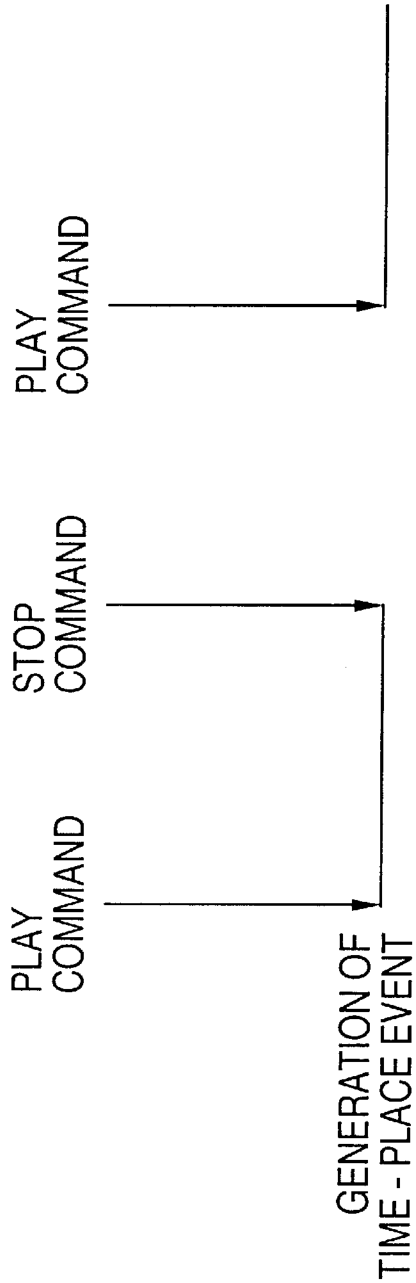
FIG. 17B is a schematic diagram showing a second example of guide presentation start—stop operations due to occurrences of time—place events.

When a process for causing the traveling to be slowed or stopped while a guide is being presented is performed, as shown in FIG. 17A, as a voice guide is started, the advancement of time—place may be stopped. After the voice guide is completed, the advancement of the time—place may be resumed. Alternatively, as shown in FIG. 17B, corresponding to a play command received from the operation interface 210, a time—place event may be generated. Corresponding to a stop command, the time—place event may be stopped. In other words, corresponding to a request, a time—place event may be generated. Likewise, the current state of a guide may be received. While the guide is being presented, only the time is advanced. In that case, the place is not advanced. After the guide is completely presented, the place is advanced again. Thus, while a guide is being presented, the time is advanced on real time basis. On the other hand, while a guide is not being presented, the time is quickly advanced.

FIG. 18 is a flow chart showing a time—place generating process. When the time—place generation processing portion 20 reads a course from NVML data (at step S41), the time—place generation processing portion 20 calculates the speed of the vehicle and the distance for which the vehicle travels per time step (at step S42). Thereafter, the time—place generation processing portion 20 calculates a point A at which the vehicle enters and/or exits a guide area of a guide point (guide) on the route (at step S43). In addition, the time—place generation processing portion 20 calculates absolute time B at which a guide is presented with a delay as presentation start time (at step S44).

Corresponding to the above-described calculated result, the time—place generation processing portion 20 determines whether or not the place or the time that is advanced at the next step exceeds the point A or the time B (at step S45). When the determined result at step S45 is Yes (namely, the place or the time that is advanced at the next step exceeds the point A or the time B), the time—place generation processing portion 20 changes the next step to a step for the point A or the time B and generates the time—place data for the time—place event (at step S46). When the determined result at step S45 is No (namely, the place or the time that is advanced at the next step does not exceed the point A or the time B), the time—place generation processing portion 20 generates the time—place data at the basic step (at step S47).

As described above, when the time—place generator 200 controls the generation of time place, various guides and simulations can be performed. In addition, the information presentation timing controlling portion 10 outputs navigation information corresponding to information of the received time—place data regardless of virtual time—place or real time—place. Thus, the time—place generating process can be simply performed.

<Operation Interface 210>

Figure 19:
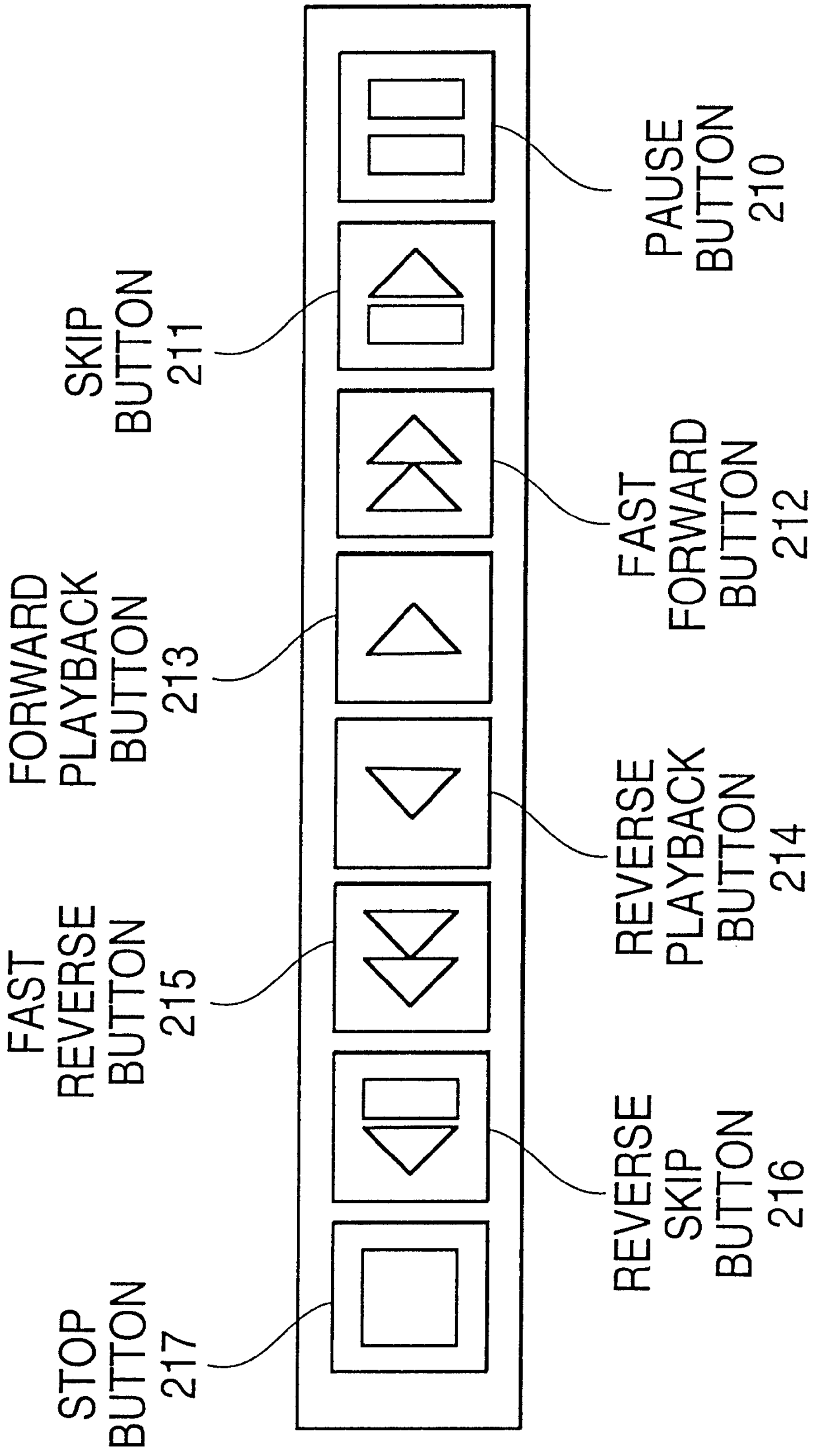
FIG. 19 is a schematic diagram showing a first example of an operation interface.

The operation interface 210 is an interface similar to an audio operation interface. FIG. 19 shows an example of the operation interface 210. Referring to FIG. 19, the operation interface 210 has various buttons that are a pause button 210*a*, a skip button 211 (advancing to the next point), a fast forward button 212, a forward playback (play) button 213, a reverse (playback) button 214, a fast reverse button 215, a reverse skip button 216, and a stop button 217. When the user presses one of those buttons, a command corresponding to the pressed button is sent to the time—place generator 200. The time—place generator 200 generates time—place data corresponding to the command. The fast forward button 212 is used to increase the speed of the vehicle several times. In that case, as was described above, the duration of a guide may be shortened. The speed of the vehicle may be restored to the normal speed while navigation information is being displayed depending on a selected mode. The skip button 211 is used to skip the current point to the next point. While a guide is being presented, when the user presses the skip button 211, the presentation of the guide is cancelled and the current point is skipped to the next point. Alternatively, in such a case, after the guide is completely presented, the current point may be skipped to the next point depending on a selected mode. The reverse playback button 214, the fast reverse button 215, and the reverse skip button 216 are used to reversely reproduce time and place. When those buttons are pressed, a guide is presented in such a manner that the descriptions of "left—right" and "front—rear" in the NVML data are automatically converted into "right—left" and "rear—front", respectively.

Besides such an operating method, information of a point may be directly accessed by a map format control or a tree format control using a pull down menu of a menu bar, a pop up window, and so forth.

Figure 20A:
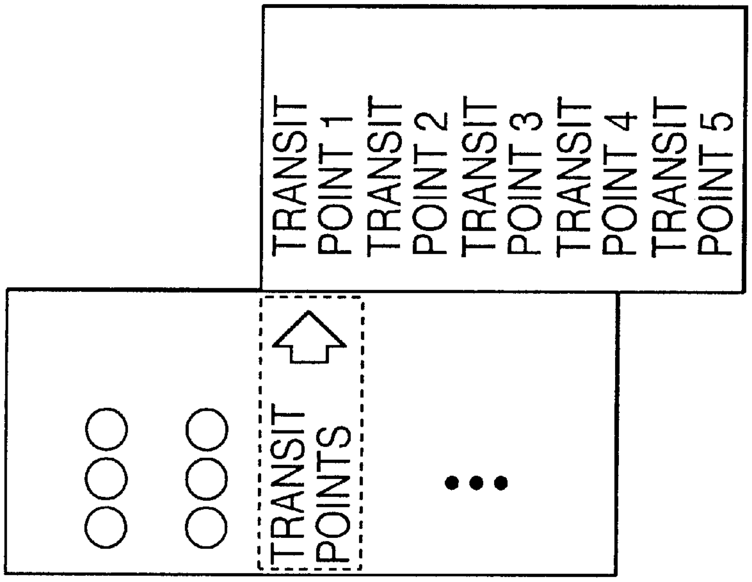
FIG. 20A is a schematic diagram showing a second example of the operation interface.
Figure 20B:
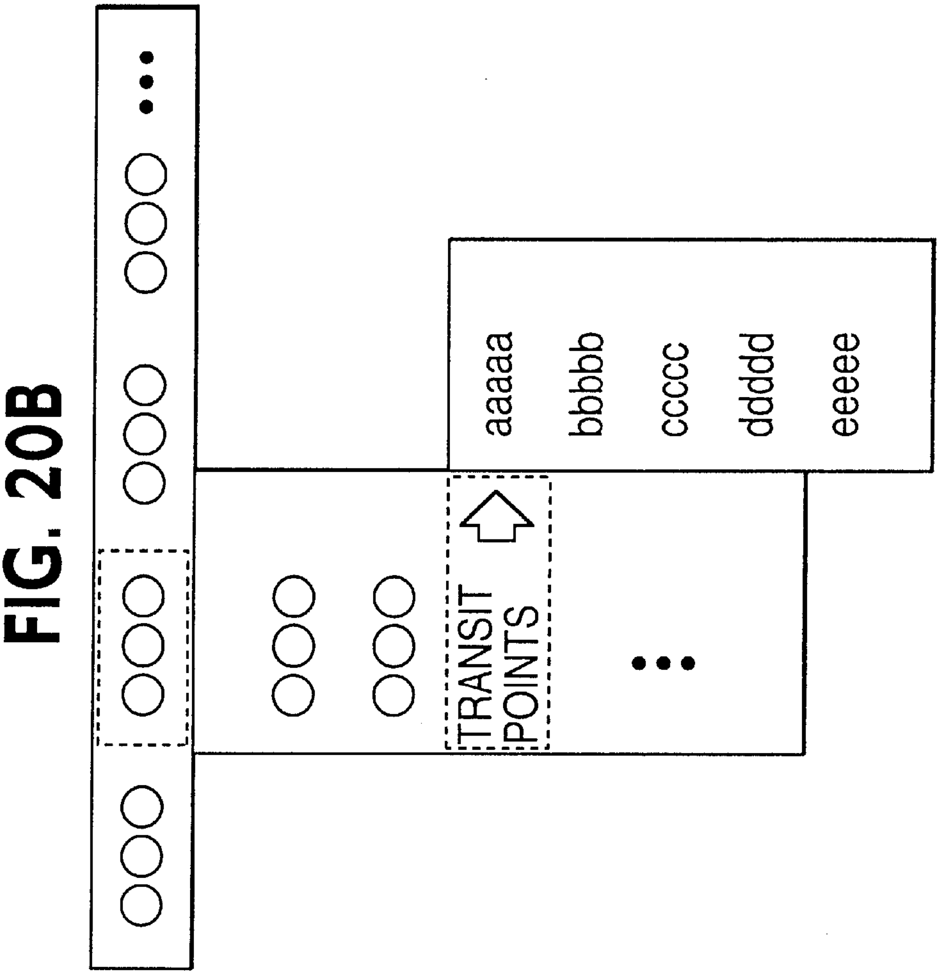
FIG. 20B is a schematic diagram showing a third example of the operation interface.

For example, transit points may be displayed on a pop up menu window shown in FIG. 20A or a pull down menu window shown in FIG. 20B. When the user selects a desired transit point from the pop up menu window or the pull down menu window, the selected transit point is directly accessed. With those windows, the same effect as the skip operation of the operation interface shown in FIG. 19 can be obtained. Items placed on the menus may be "transit point 1, transit point 2, . . . " as an abstractive notation shown in FIG. 20A or names of points ("aaaaa, bbbbb, . . . ") that are read from the NVML data as shown in FIG. 20B. Such menus may be displayed when the user clicks a particular button. When necessary, using those menus, the user can perform desired selection operations.

Figure 21A:
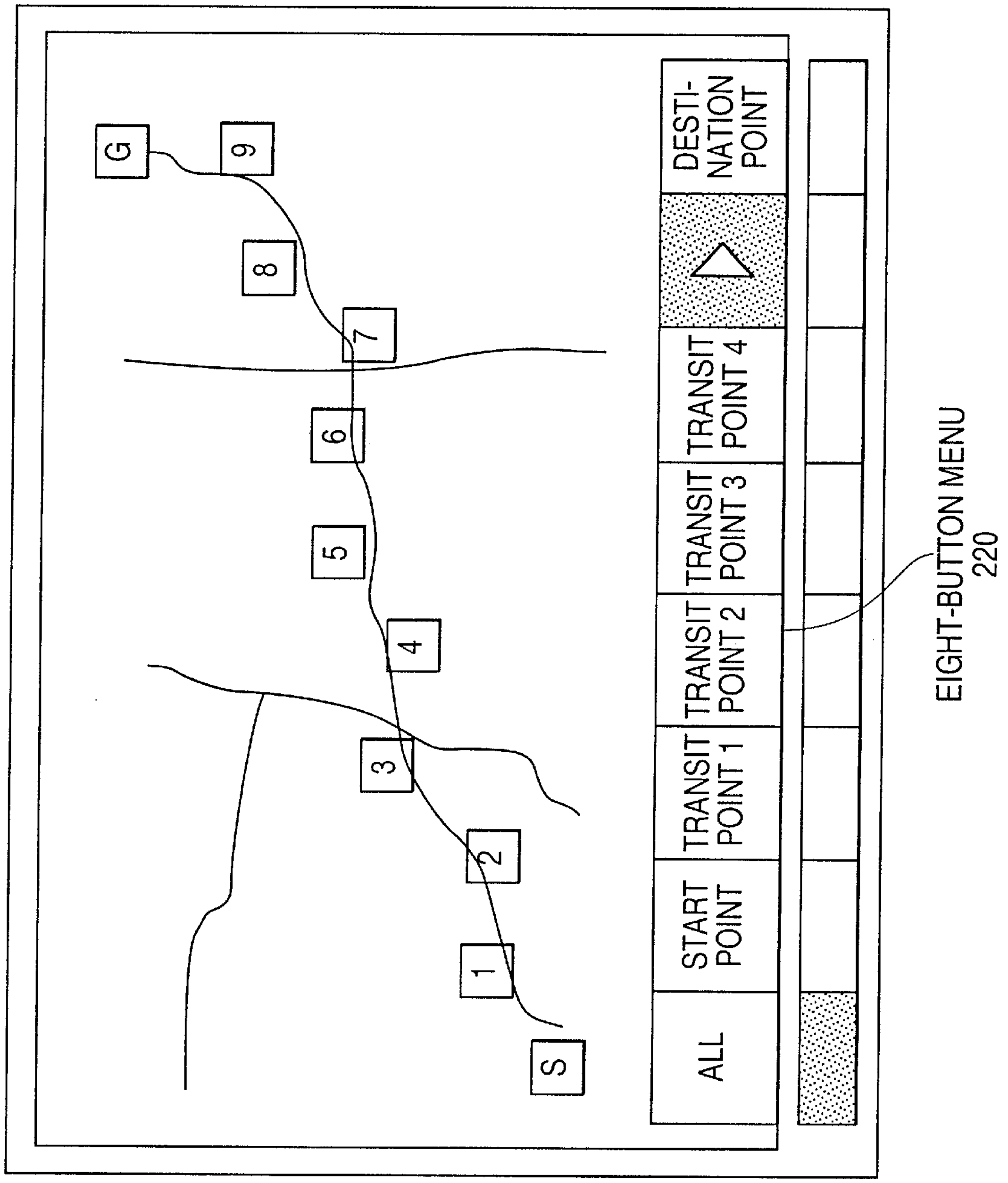
FIG. 21A is a schematic diagram showing a fourth example of the operation interface.
Figure 21B:
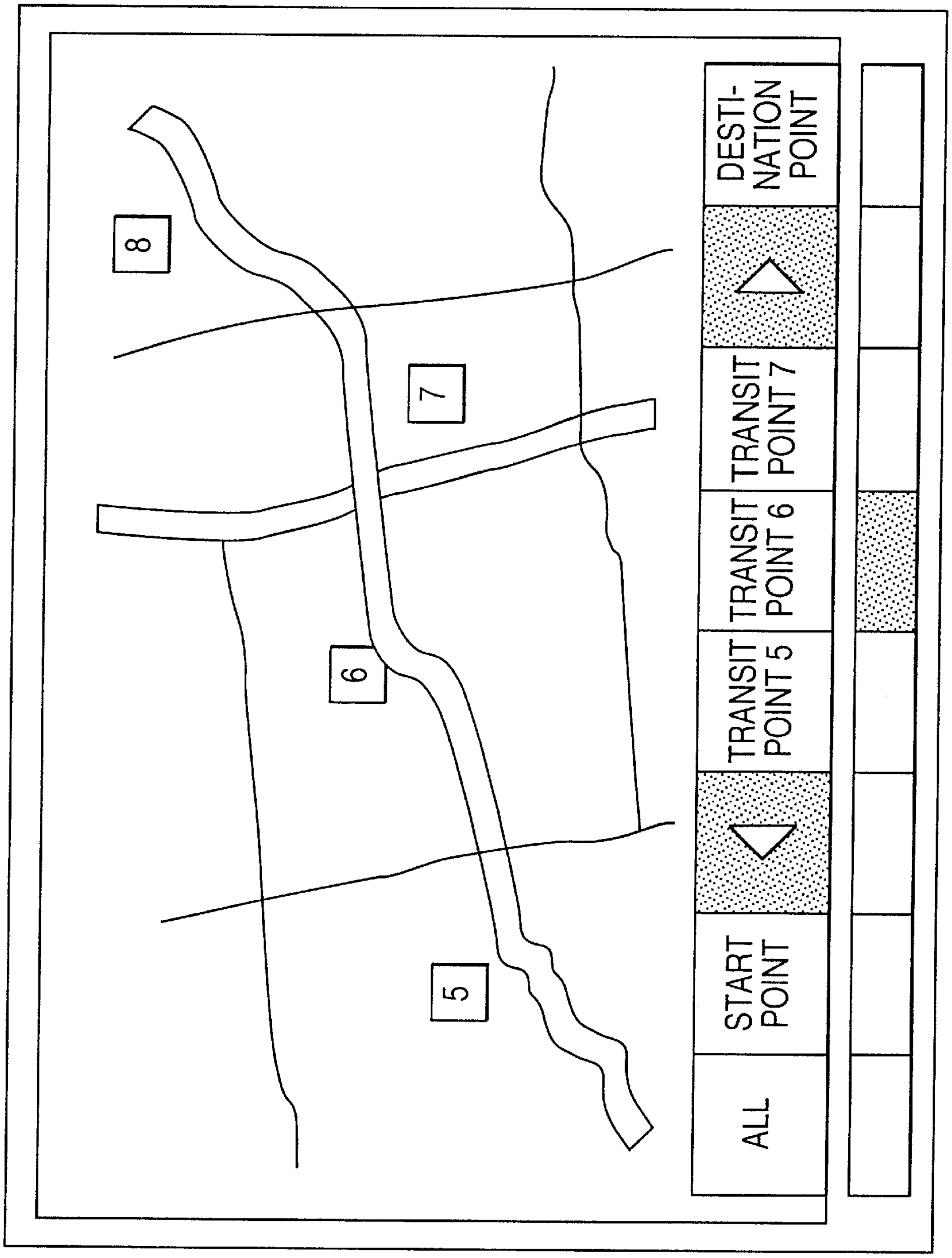
FIG. 21B is a schematic diagram showing a fifth example of the operation interface.

Alternatively, as shown in FIGS. 21A and 21B, an eight-button menu 220*a* for use with a car navigation system may be used. The eight-button menu 220*a* displays map information corresponding to the eight buttons. The eight-button menu 220*a* is composed of eight buttons and their functions displayed on the screen. When one of the buttons is pressed, a function displayed on the screen is -performed. When a button corresponding to a point is pressed, the point is accessed and when possible a guide thereof is presented. For example, as shown in FIG. 21A, when a button corresponding to "ALL" is pressed, a map of all the route is displayed. As shown in FIG. 21B, when a button corresponding to "PASSAGE POINT 6" is pressed, the periphery of the transit point 6 is enlarged and a guide thereof is presented. For detail of the operation interface 210 such as the eight-button menu 220*a*, refer to Japanese Patent Application No. 10-200237 (Japanese Patent Laid Open Publication No. 2000-029595) titled "Electronic Processing Apparatus Having Menu Interface".

The operation interface 210 corresponding to points may output an information presentation command of a point to the presentation method controlling portion 30, not through the time place generator 200 that dynamically generates time—place data so as to present a guide using various guide dialogs.

<Vehicle Speed—Time Step Designating Portion 220>

The vehicle speed—time step designating portion 220 designates the speed for each traffic means (such as car and walk). The vehicle speed—time step designating portion 220 can vary the speed of the same vehicle depending on the road type (general road, highway, and so forth). In addition, the vehicle speed—time step designating portion 220 can perform a simulation at more real speed using real traffic information. In the simulation mode, when the user tries to see a guide at real speed, it will take a very long time. To solve such a problem, the time step can be freely designated in such a manner that for example five minutes can be simulated in one second. Thus, all guides can be presented in short time.

<Presentation method Controlling Portion 30>

The presentation method controlling portion 30 determines what information is displayed at what screen position by what displaying means (view system) corresponding to the information presentation start—stop command received from the information presentation timing controlling portion 10 and the type of the user's terminal unit (the processing performance of the CPU, the screen size, and so forth) and supplies the presentation start command to the tree format presentation controlling portion 61, the map format presentation controlling portion 62, the text format controlling portion 63, and the guide dialog controlling portion 64.

For example, when the present invention is applied to a car navigation system, navigation information is normally output in the map format. When necessary, guide dialogs are output. When a guide dialog is output while the user is driving a car, a dangerous situation takes place. Thus, while the user is driving a car, only voice information is output. When the car stops, navigation information can be output in the text and picture formats. When the present invention is applied to a cellular phone and so forth, since the display thereof is narrow, a guide is presented only in the text format or the voice format.

An output of navigation information can be controlled in a predetermined format. For example, individual terminal units may have respective files that store the following description information.

file:ex1.
  point: icon
  route: route calculation
  navigation information: blow-out
  information about all course: Upper left position of window
file.ex2
  point: in text area
  route: linear
  navigation information: pop-up The presentation method controlling portion 30 reads the content of such a file and presents navigation information in a proper manner corresponding to the content of the file. As with the content of such a file, API (Application programming Interface) of each unit may be directly described and used.

[Tree Format Presentation Controlling Portion 61]

Figure 22:
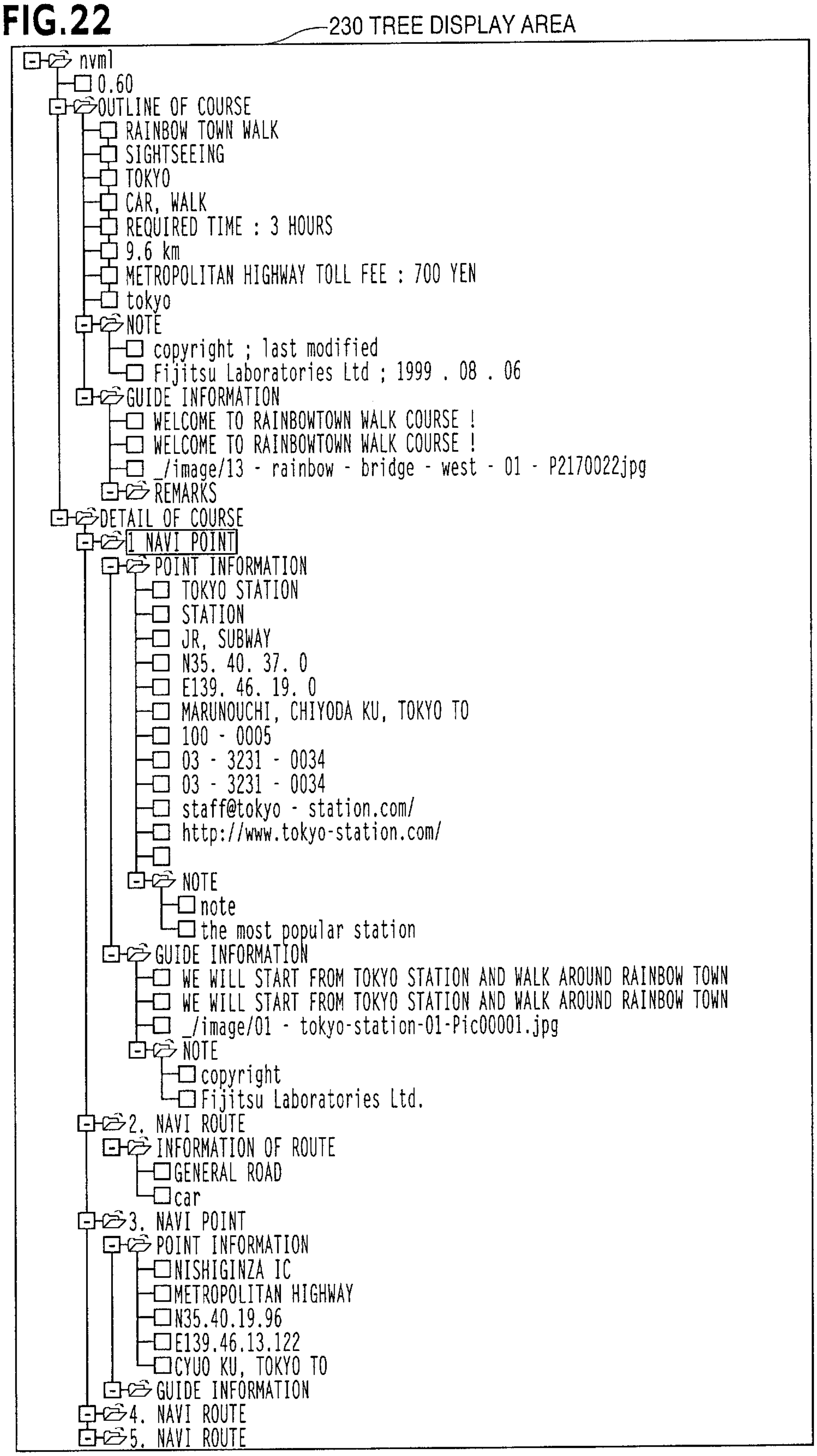
FIG. 22 is a schematic diagram showing a first example of a guide presentation in a tree format.

As shown in FIG. 22, when the tree format presentation controlling portion 61 receives NVML data, the tree format presentation controlling portion 61 displays an outline of a course, point information, navigation information, and so forth in the order of the points in a tree format. As the hierarchical level becomes lower, more detail information is displayed. When the user clicks each hierarchical level, information thereof is opened/closed and displayed. Thus, unnecessary detail information disappears. Consequently, the browsing characteristic improves.

Information of each hierarchical level is linked each other so that user can see desired information and dialogs for editing information. Corresponding to the information linked, the map format presentation controlling portion 62 can is display a map around the selected point.

The tree format presentation controlling portion 61 has an editing function that allows the user to easily move and copy a block of information displayed in the tree display area 230 by a dragging operation. With the editing function, the user can easily substitute current point information with new point information and partly copy navigation information. When a transit point (navi) is substituted with another one, the order of transit points is automatically re-arranged. Thus, the user can easily change the order of transit points. After editing map information in the tree display area 230, when the user issues a save command, the edited map information is registered as NVML data. It is clear that the process for interpreting NVML data in the tree display area 230 shown in FIG. 22 and the process for converting information displayed in the tree display area 230 into NVML data can be easily performed because of the characteristic of the NVML data. Thus, the description of such processes is omitted.

Figure 23:
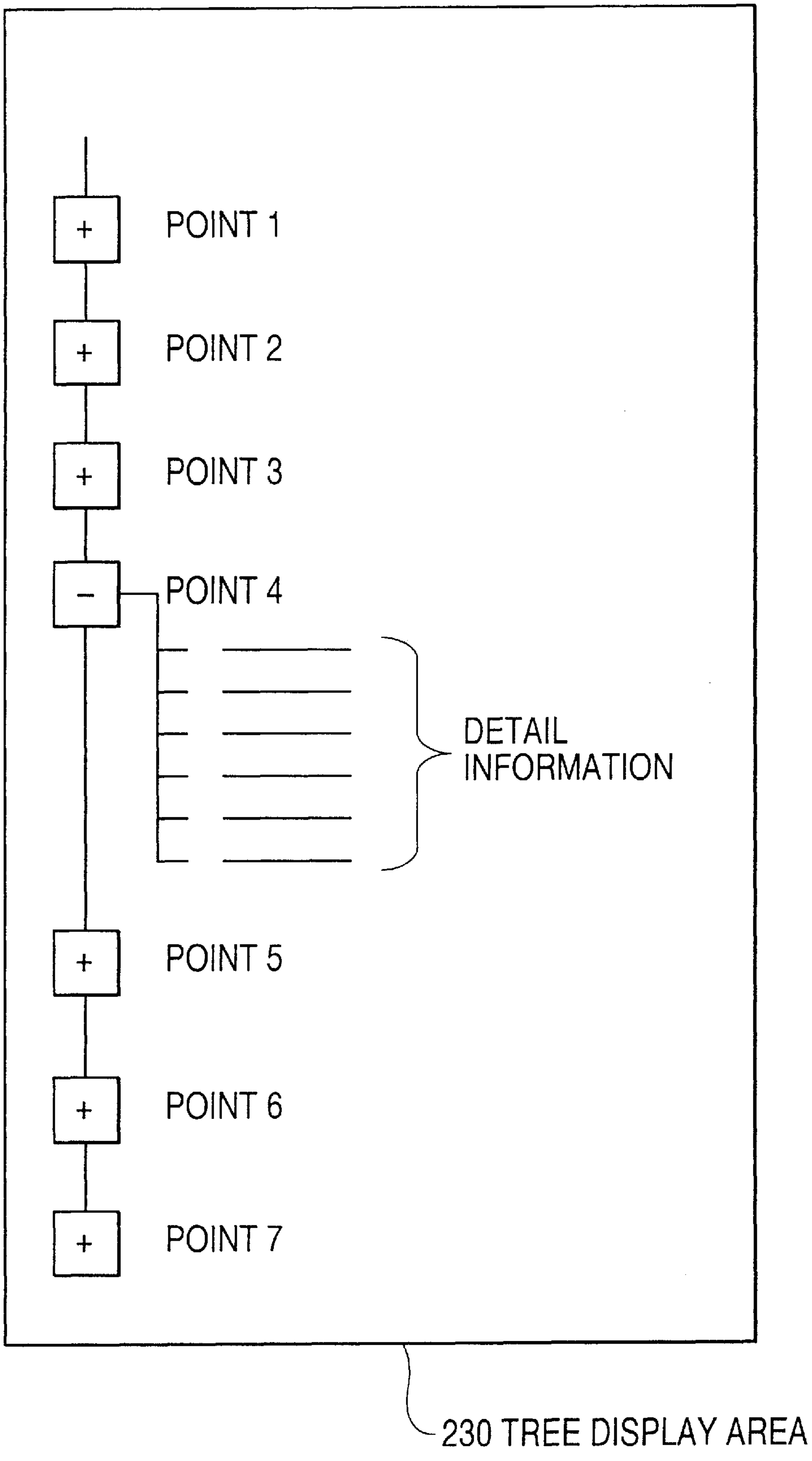
FIG. 23 is a schematic diagram showing a second example of a guide presentation in a tree format.

To allow the user to easily see detail information, while the presenting process is being performed, tree format presentation controlling portion 61 displays information in a lower hierarchical level corresponding to the location the traveling vehicle in the tree display area 230. In other words, when the vehicle approaches a particular point, tree format presentation controlling portion 61 opens information in a lower hierarchical level about the particular point in the tree display area 230. When the vehicle passed away the particular point, tree format presentation controlling portion 61 closes the information in the lower hierarchical level about the particular point in the tree display area 230. In other words, tree format presentation controlling portion 61 automatically changes information in the tree display area 230 so that the user can easily see detail information. Alternatively, tree format presentation controlling portion 61 may open detail information of a part of a guide corresponding to the duration thereof in the tree display area 230. For example, as shown in FIG. 23, while the vehicle is passing through the guide area of the "point 4", the tree format presentation controlling portion 61 displays detail information of a lower hierarchical level of the point 4. After the vehicle passed through the guide area of the "point 4", the tree format presentation controlling portion 61 closes the detail information. Likewise, the tree format presentation controlling portion 61 may open detail information of a portion that is being edited in synchronization with another editing means.

[Map Format Presentation Controlling Portion 62]

Figure 24:
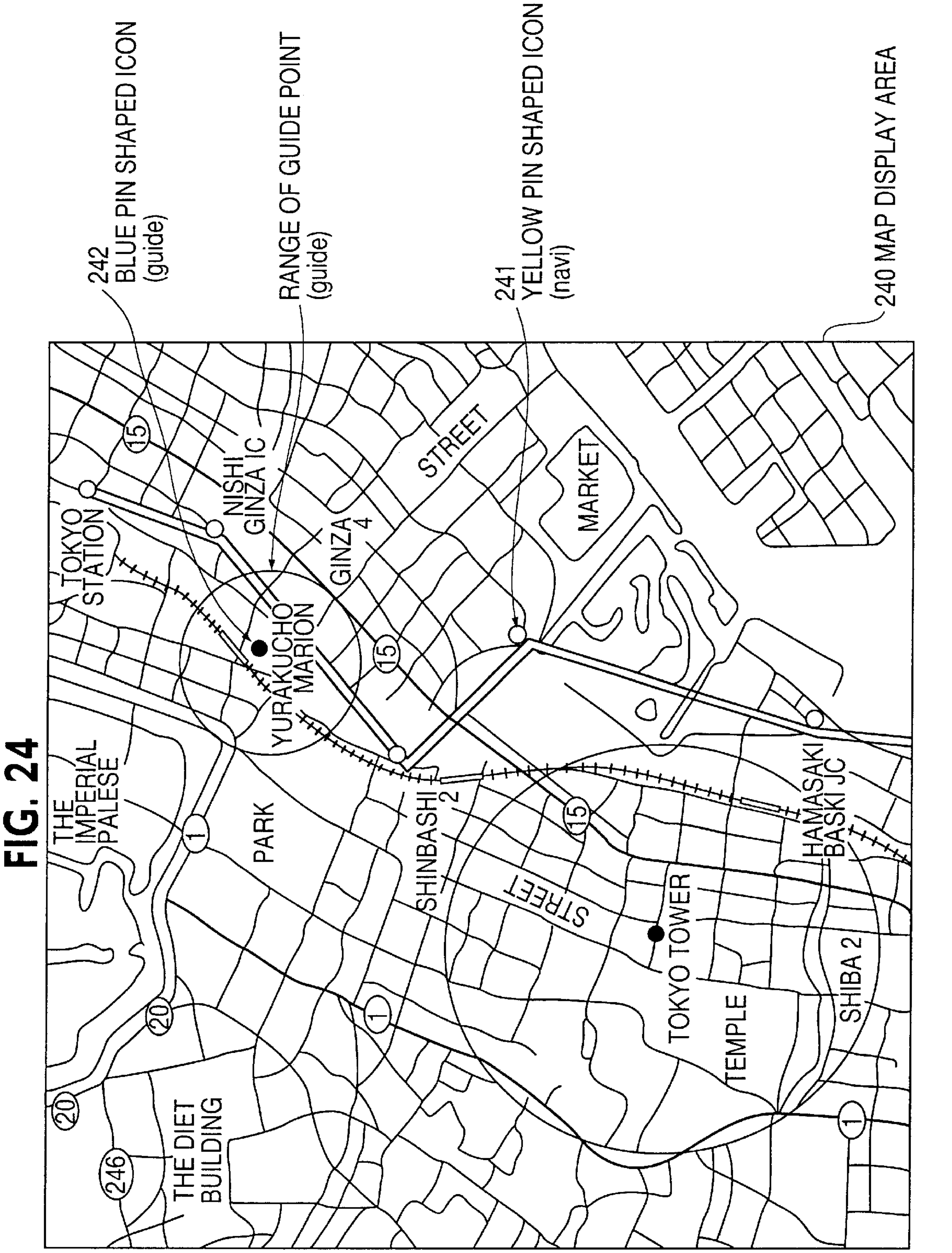
FIG. 24 is a schematic diagram showing an example of a guide presentation in a map format.
Figure 25:
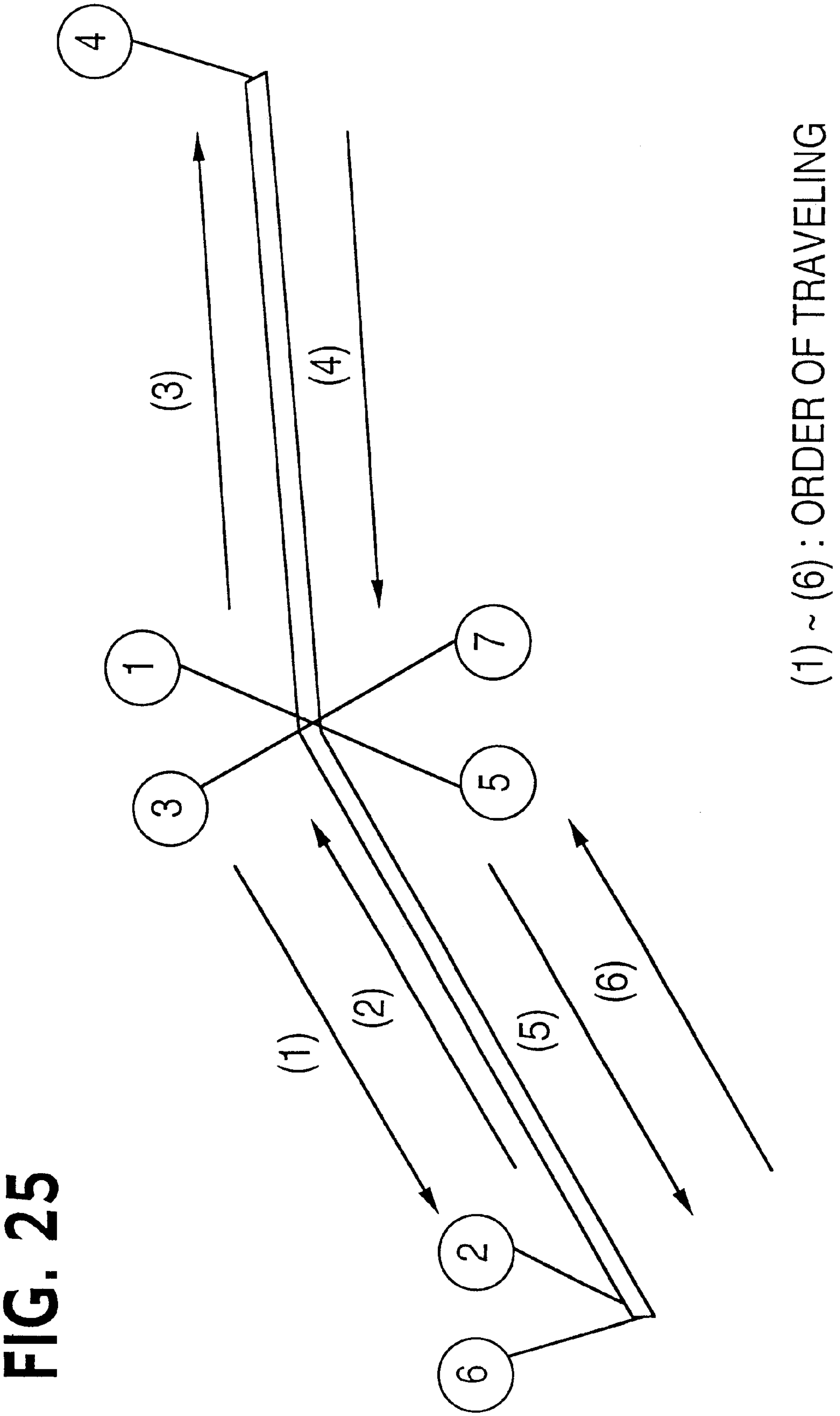
FIG. 25 is a schematic diagram showing an example of an indication of a pin shaped icon.

FIG. 24 shows an example of a map displayed by the map format presentation controlling portion 62. When the map format presentation controlling portion 62 receives NVML data, the map format presentation controlling portion 62 allocates the NVML data on the map, and displays the resultant data in a map display area 240 as shown in FIG. 24. A yellow pin shaped icon 241 is displayed at a position (latitude and longitude) corresponding to a transit point (navi). Alternatively, numbered icons that represents transit points may be displayed. Names of points may be displayed below respective icons.

When a route has been designated, it may be highlighted with a colored thick line. When a route has not been designated, as shown in FIG. 24, icons corresponding to transit points are successively connected with straight lines.

A guide point is displayed with a pin shaped icon 242 that is linked to detail information. An area that affects the detail information is displayed with a particular shape such as a circle. The circle surrounds the pin shaped icon 242. In the case that information is output when the vehicle enters an area of 400 m of the radius of a guide point "Tokyo Tower" (<point area=400 m>), as shown in FIG. 24, a circle having a radius of 400 m of "Tokyo Tower" is displayed on the map. Navigation information is linked to an icon. When the icon is clicked, the navigation information is output through various guide dialogs.

When only a traffic means (means) is described in NVML data without a route, corresponding to the "means" tag of the NVML data, if the traffic means is a car, a regular route is searched. If the traffic means is a train, a train route is searched. If the traffic means is a walk, a walk route is searched. In other words, the route searching process is performed corresponding to a traffic means. When a route has been successfully searched, the route is displayed. Otherwise, transit points are connected with straight lines.

When a plurality of points overlap at the same position, the user cannot clearly see icons that represent the points. To solve such a problem, the icons are moved so that they clearly appear. When pin shaped icons have leads that orient different directions, even if points overlap, the user can clearly see them. In addition, when colors of routes and icons are changed, even if they overlap, the user can clearly see them. Thus, the user can easily browse the relation of the routes.

While a guide is being presented, as the vehicle travels, a map that shows the current position is displayed in the map display area 240 using an icon (for example, a vehicle shaped icon) that represents the current position. Alternatively, when the vehicle shaped icon comes to an end of the map screen, the next map is displayed. In other words, corresponding to the access speed to the map information, the load of the map rewriting and drawing process can be varied. In addition, the scale of the map may be automatically varied corresponding to the speed of the vehicle. To read map data at high speed, a map pre-reading process may be performed. Alternatively, map data of a large area may be pre-read.

In addition, corresponding to the content of a guide of NVML data, a vehicle shaped icon may be changed to a tour conductor shaped icon. Thus, the user can have a guide as if he or she joined a tour.

Figure 26:
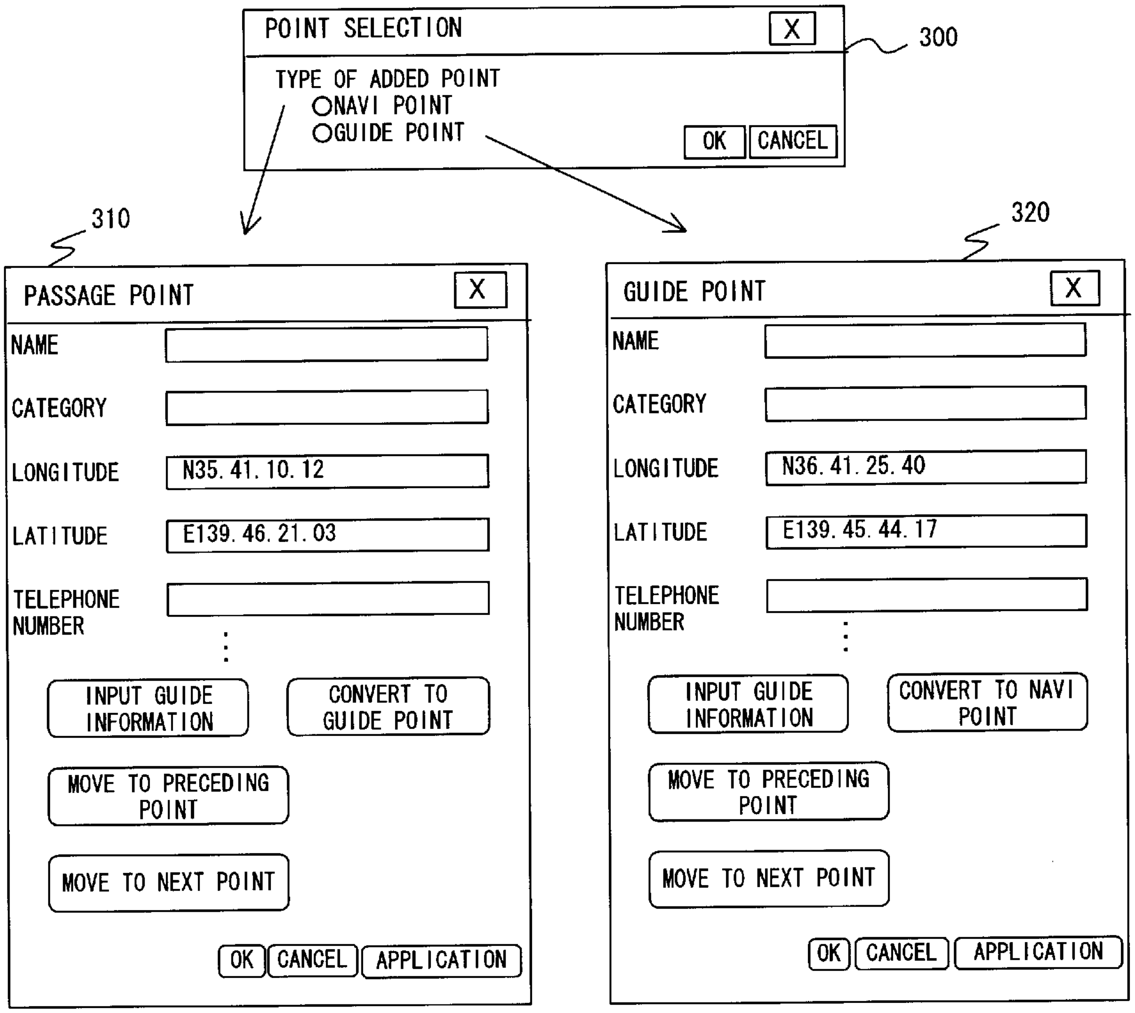
FIG. 26 is a schematic diagram showing an example of a guide dialog screen for adding a point.

As an input means, the user can input values that are difficult to enter (such as latitude and longitude) by clicking a point on the map. Thus, the user can easily and intuitionally input point information of NVML data. In that process, when the user clicks a point on the map, a dialog window 300 as shown in FIG. 26 appears. When the user clicks one of two check items for a transit point and a guide point, the latitude and the longitude of the clicked check item are automatically obtained. When the check item of the transit point is clicked, a dialog window 310 appears. On the other hand, when the check item of the guide point is clicked, a dialog window 320 appears. On the dialog window 310 or 320, the user can input undesignated information and correlative navigation information about the point. Alternatively, using the point—route database accessing portion 70, other information such as the name, category, address, zip code, and so forth of the point may be automatically obtained and displayed. When the user clicks "OK" on the dialog window 310 or 320, point information and navigation information about the point are registered. At that time, a pin shaped icon is displayed on the map. By repeating such an operation, the user can create a sequence of route navigation data.

When the user drags a transit point or a guide point on a map, the point may be changed. Thus, by inputting information of a point as if the user painted a picture, he or she can create NVML data.

Since the map format presentation controlling portion 62 obtains map data as an image and superimposes NVML data on the map data, even if a picture is used instead of the map, the same process can be performed. A guide map may be sometimes a deformed map whose scale such as size, length, and so forth are not accurate. In such a case, the portions of the latitude and the longitude of NVML data are converted into coordinate notation. By clicking each point, creating NVML data, and executing it, the similar guide can be created. Thus, in a combination of picture information as a background and icons of NVML data, an animation creating means can be accomplished.

[Text Format Controlling Portion 63]

The text format controlling portion 63 integrally controls the input/output operations for of NVML data in text format.

When the user handles NVML data, he or she can freely input data. Thus, it is necessary to determine whether or not data that is input by the user is described corresponding to the NVML syntax and specifications. Thereafter, the navigation data evaluating portion 90 evaluates the feasibility and appropriateness of the input data. When NVML data created by another module or another apparatus is written as text data, it should be indented for easy understanding. The text format controlling portion 63 has such processing functions.

Thereafter, the text format controlling portion 63 performs a process for converting NVML data into a text format and presenting a guide in the text format so that the user can easily see the guide. This process is performed when the user's terminal unit can display only text data or can transmit only text data due to the restriction of a communication capacity. When NVML data is transmitted to a cellular phone, the text format controlling portion 63 automatically converts it into text data so that it can be displayed on the display of the cellular phone. In addition, when a map is transmitted to a cellular phone, the text format controlling portion 63 converts the map into text data. When NVML data is printed out, the text format controlling portion 63 converts it into a proper format suitable for a printed document.

[Guide Dialog Controlling Portion 64]

The guide dialog controlling portion 64 controls dialog windows for outputting and editing outline information, point information, route information, and navigation information (in text and picture formats). On the dialog windows, the user can browse and edit detail values about such information.

The guide dialog controlling portion 64 is dynamically controlled by the presentation method controlling portion 30 or activated by another application so as to browse and edit information. Corresponding to point information, the guide dialog controlling portion 64 is operated in synchronization with the tree format presentation controlling portion 61 and the map format presentation controlling portion 62. In addition, voice navigation information may be dialectally generated.

[Data Communication Controlling Portion 40]

The data communication controlling portion 40 controls a communicating process for NVML data. In addition to transmitting and receiving NVML data, the data communication controlling portion 40 may obtain picture navigation information and voice navigation information from the outside through a communication line. Moreover, the data communication controlling portion 40 may transmit and receive additional information such as a map and commercial messages while guides are not being presented.

To effectively transmit data, the data communication controlling portion 40 does not pre-download all NVML data. Instead, when or just before NVML data is required, the data communication controlling portion 40 obtains a large amount of data such as a picture.

[Navigation Data Accessing Portion 50]

The navigation data accessing portion 50 provides various types of API so that the user can easily access navigation data. The navigation data accessing portion 50 provides simple commands for deleting a point and changing the order of points. Thus, the navigation data accessing portion 50 can perform processes for adding, deleting, and rearranging points. In addition, the navigation data accessing portion 50 can perform a process for separately handling guide points and transit points and a process for managing the order of guide points and transit points. Moreover, the navigation data accessing portion 50 can perform a process for adding a new point in such a manner that the total distance of a designated route becomes short.

[Point—Route Database Accessing Portion 70]

The point—route database accessing portion 70 automatically retrieves point information necessary for a guide from a point database. In addition, the point—route database accessing portion 70 retrieves additional information about a point and navigation information thereof from various databases for sightseeing, customers, stores, public facilities, history, and company data. The point—route database accessing portion 70 obtains required information from such databases corresponding to information of a point, a search range, and an search conditions obtained from the tree format presentation controlling portion 61, the map format presentation controlling portion 62, the text format controlling portion 63, the guide dialog controlling portion 64, and the navigation data accessing portion 50 and returns the obtained information to the requester. In addition, the point—route database accessing portion 70 can search a plurality of points and routes from the NVML data at a time.

As an example of a method for obtaining NVML information of point information and additional information of points, the technology disclosed in Japanese Patent Application No. 11-113191 titled "Guide Plan Creating Apparatus" can be used.

[Automatic Navigation Creation Processing Portion 80]

First of all, with reference to FIG. 27, a manual NVML data creating process will be described. When a new creation operation is selected on a map (at step S51), the automatic navigation creation processing portion 80 prompts the user for a point on the map. When the user double-clicks a desired point on the map, the automatic navigation creation processing portion 80 designates the point (at step S52). Thereafter, the automatic navigation creation processing portion 80 prompts the user for a transit point or a guide point with a dialog window as shown in FIG. 26 (at step S53). The automatic navigation creation processing portion 80 inputs point information of the point from the point—route database accessing portion 70 (at step S54) In addition, the automatic navigation creation processing portion 80 inputs navigation information (at step S55). Thereafter, the automatic navigation creation processing portion 80 determines whether or not all required points have been input (at step S56). When the determined result at step S56 is No, the automatic navigation creation processing portion 80 repeats the loop from step S52 to S55 until all the required points are input. When the determined result at step S56 is Yes (namely, all the required points have been input), the automatic navigation creation processing portion 80 automatically creates a course that connects all the input points in the shortest distance using a known route searching technology (at step S57), generates NVML data, and outputs it (at step S58).

Figure 29:
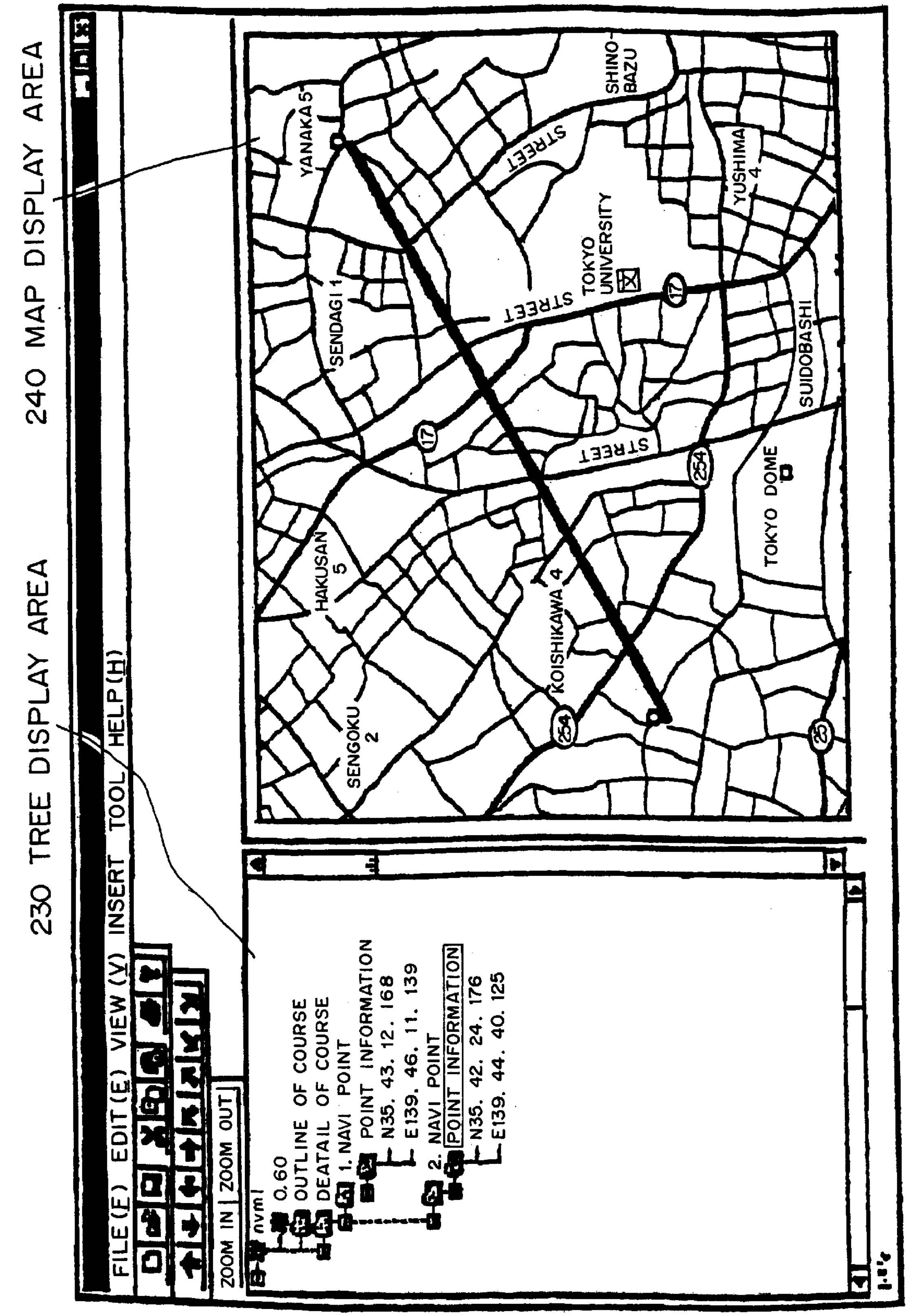
FIG. 29 is a schematic diagram for explaining the automatic guide creating process.
Figure 30:
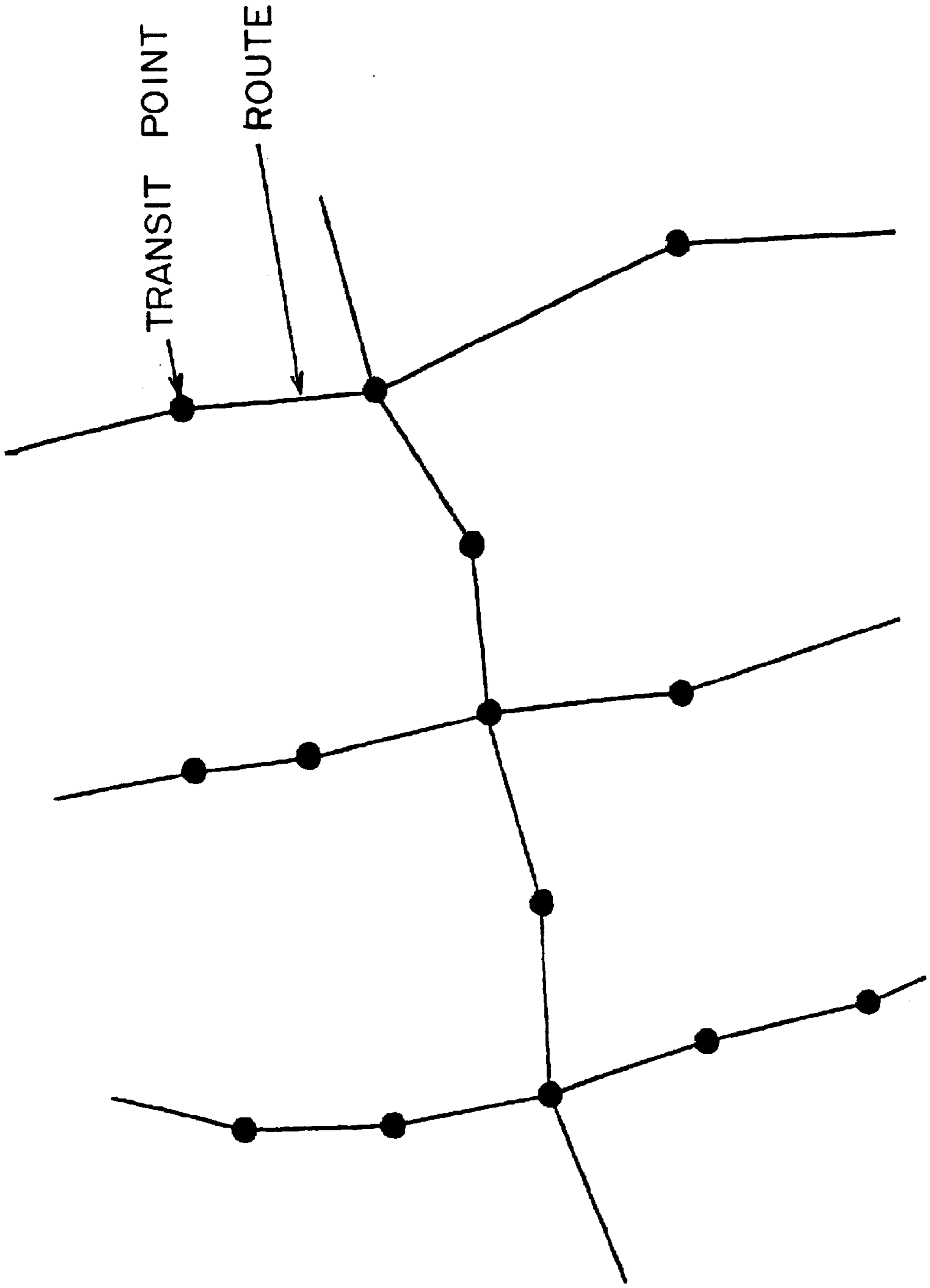
FIG. 30 is a schematic diagram showing an example of a road network.

When the automatic navigation creation processing portion 80 receives two points of a start point and a destination point, the automatic navigation creation processing portion 80 automatically creates navigation information about a course between the two points. Next, with reference to FIG. 28, the process performed by the automatic navigation creation processing portion 80 will be described. When the user designates two points of a start point and a destination point on a map in a map display area 240 shown in FIG. 29 (at step S61), the automatic navigation creation processing portion 80 calculates a course between the two points and obtains a sequence of points (at step S62). Normally, the automatic navigation creation processing portion 80 searches the course from a network map shown in FIG. 30 corresponding to the Distract method. Thus, the automatic navigation creation processing portion 80 creates a course that is bent at a plurality of reference points (points).

The automatic navigation creation processing portion 80 compares an entering direction and an exiting direction at each point (transit point) on the course (at step S63). Corresponding to the difference between the entering direction and the existing direction, the automatic navigation creation processing portion 80 obtains the turning angle (at step S64). Thereafter, the automatic navigation creation processing portion 80 determines whether or not the point is a large turn point (at step S65). When the determined result at step S65 is Yes (namely, the point is a large turn point at which the user may get lost without a guide), the automatic navigation creation processing portion 80 creates guide information "Turn left.", "Turn right.", or "Make U turn." and adds the guide information to the point.

Figure 31:
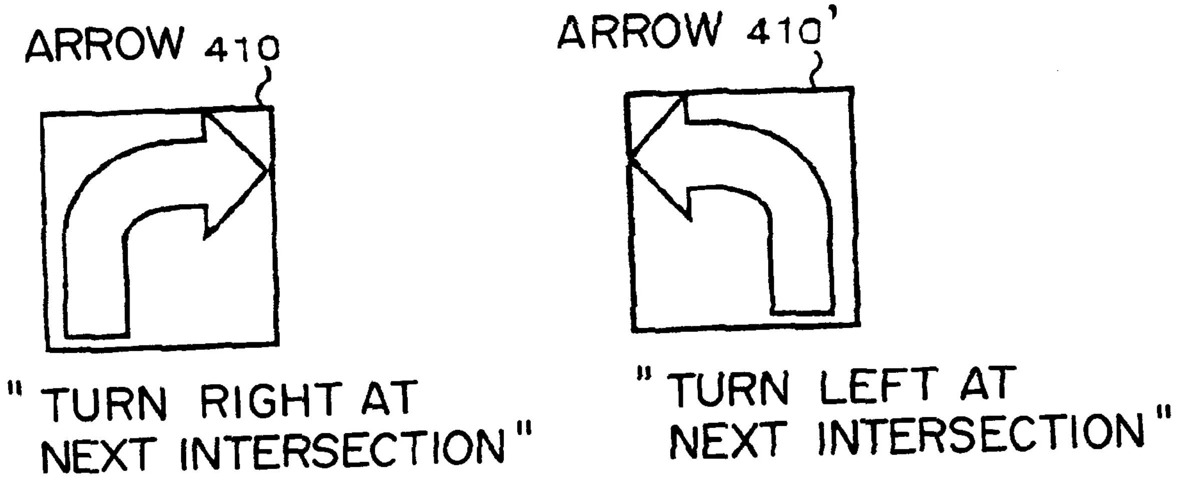
FIG. 31 is a schematic diagram for explaining a first navigation information creating process.
Figure 32:
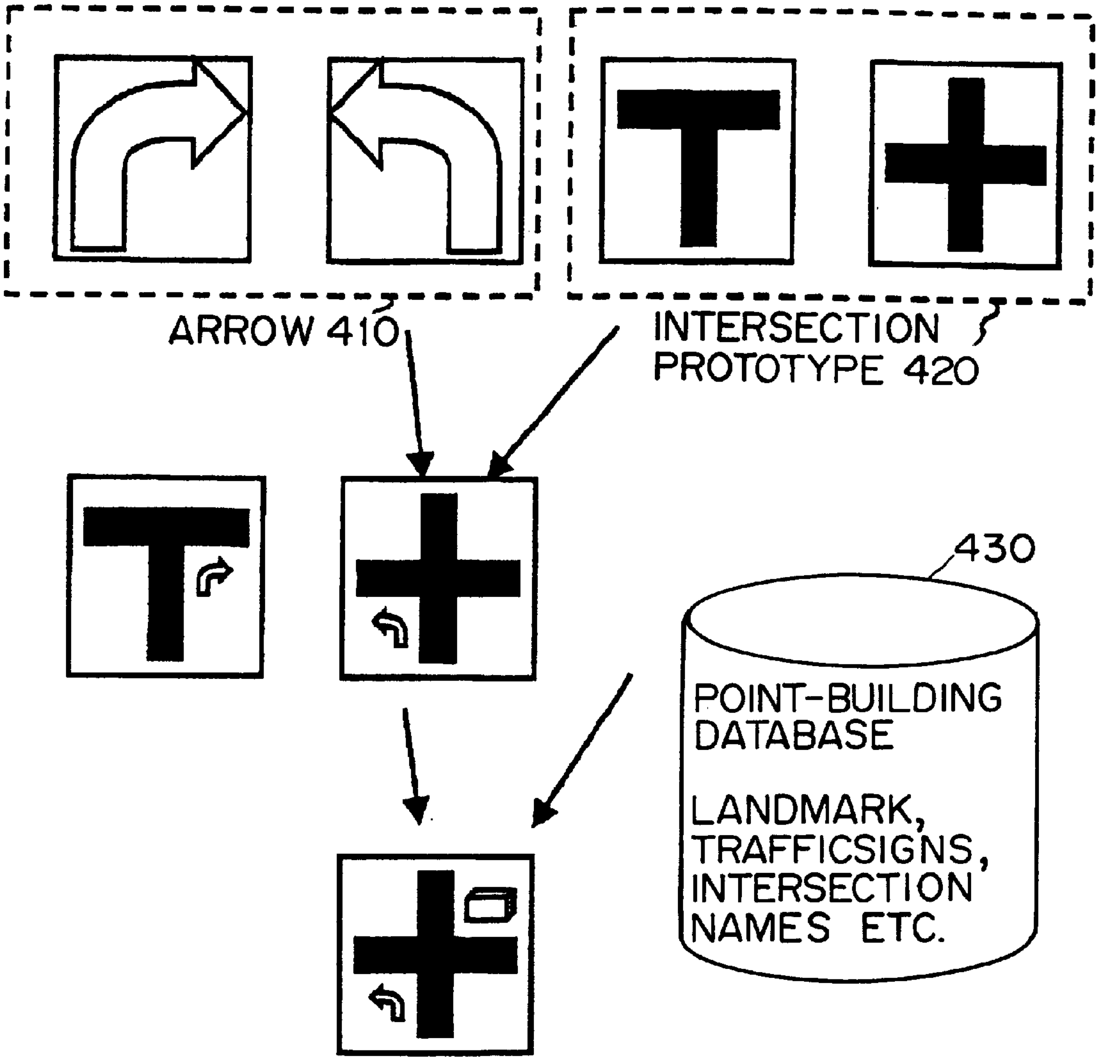
FIG. 32 is a schematic diagram for explaining a second navigation information creating process.

For example, the automatic navigation creation processing portion 80 adds an image of an arrow 410 that represents the turning direction as shown in FIG. 31 as navigation information to the point. If the delay as a timing at which the information is presented is designated to around −2 min, when the guide is executed, a voice guide and a text guide of "Turn left." and an image of an arrow representing the turning direction can be output in 2 minutes before the turning point. In addition, when an image of an intersection prototype 420 such as a crossroad, a T junction, or a Y junction and an image of the arrow 410 are combined, the automatic navigation creation processing portion 80 can create a guide image that is more understandable for the user.

If the point—route database accessing portion 70 can use a point—building database 430 about addition information such as points, buildings, and so forth, the automatic navigation creation processing portion 80 can add landmark information and additional information of traffic signs and roads (for example, intersection names and presence of signals) and obtain more understandable images. In addition, the automatic navigation creation processing portion 80 can extract a photo of a facility from the point—building database 430 and use it as navigation information. As a result, the automatic navigation creation processing portion 80 can create a guide information "Turn right at the intersection with a convenience store" (in the text and voice formats). The automatic navigation creation processing portion 80 outputs such information as NVML data (at step S67).

When the number of points that the user designates on a map is more than three, the automatic navigation creation processing portion 80 performs the same process for every two points as with the process for two points of the start point and the destination point.

Figure 33:
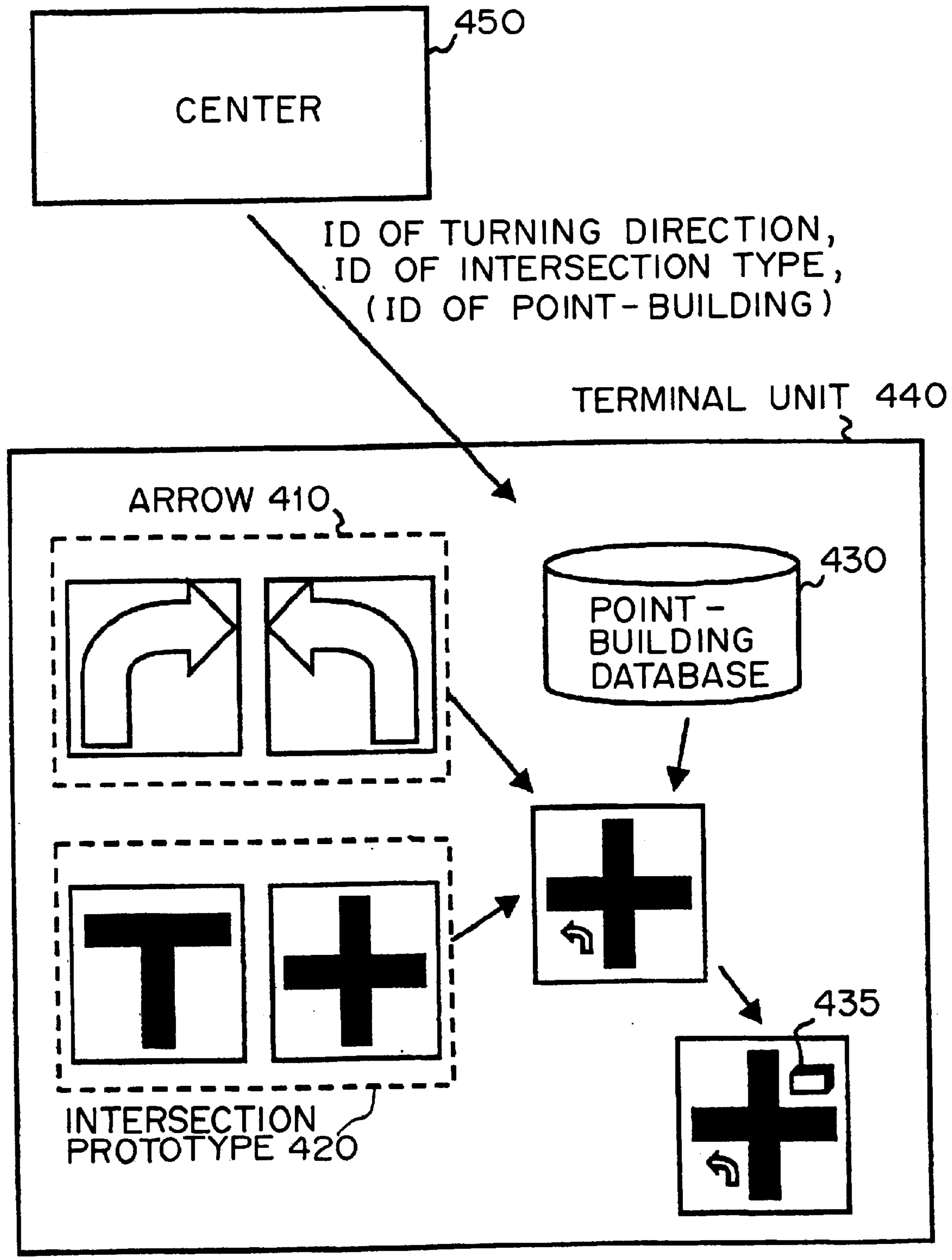
FIG. 33 is a schematic diagram for explaining a third navigation information creating process.

In the case that the method for combining basic elements and creating a guide image is applied to a navigation using a communication network, when a terminal unit 440 has information of the arrow 410 and the intersection prototype 420 as shown in FIG. 33, a center 450 can transmit only a turning direction, an intersection type, and when necessary an ID of point—building information to the terminal unit 440. Thus, the terminal unit 440 can combine the received information and create a guide image. Thus, the amount of information transmitted through the network can be reduced. The ID of the point—building information contains information about a landmark 435 as a catch mark such as a convenience store or a gas station.

Figure 34:
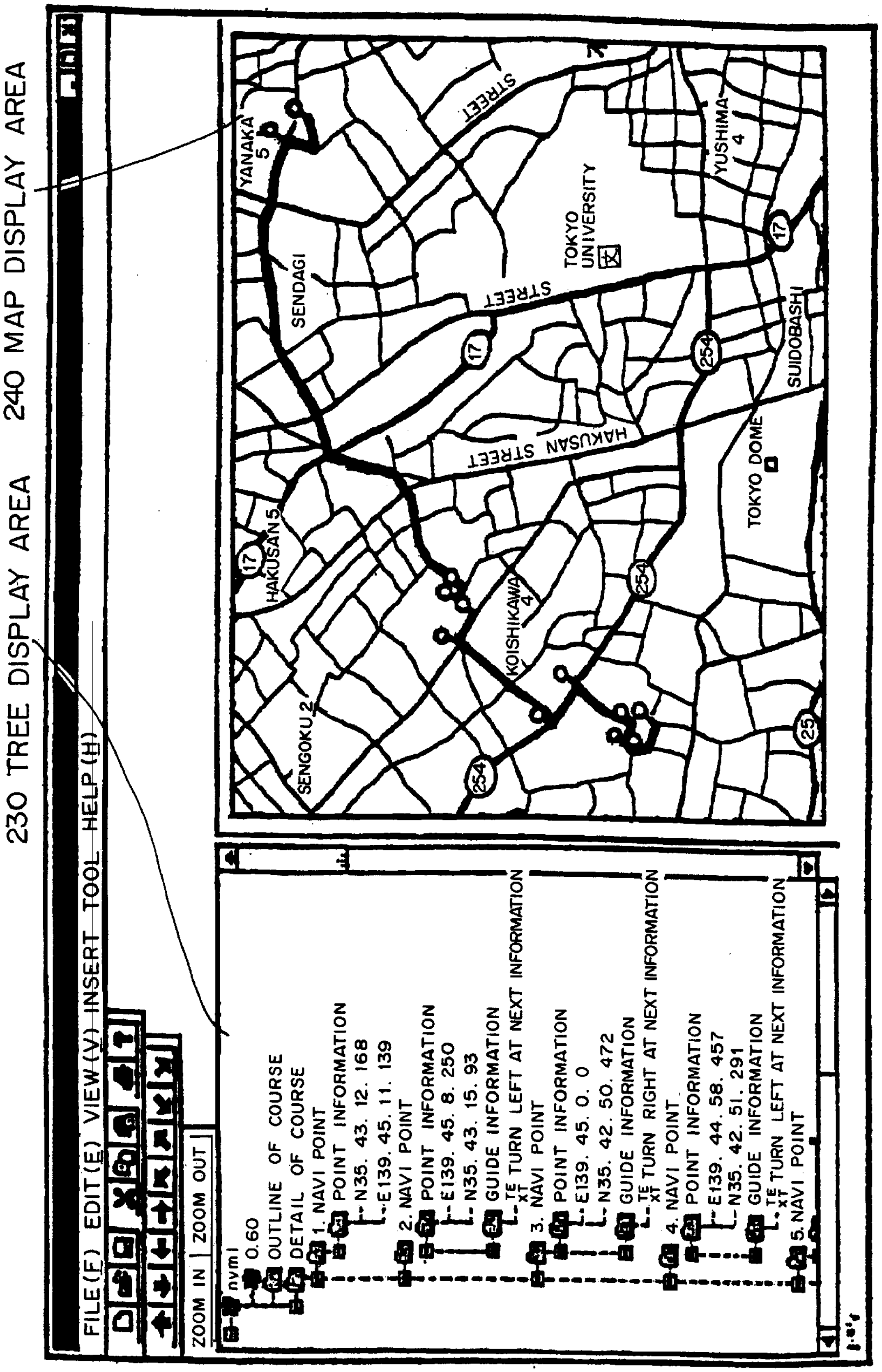
FIG. 34 is a schematic diagram showing an example of a guide that has been automatically created.

FIG. 34 shows a course displayed in the map display area 240 and point information and navigation information of a transit point displayed in the tree display area 230.

[Navigation Data Evaluating Portion 90]

The navigation data evaluating portion 90 determines whether or not navigation data is adequate. When necessary, the navigation data evaluating portion 90 corrects and complements the data. As shown in FIG. 35, when the navigation data evaluating portion 90 obtains NVML data (at step S71), it checks whether or not the NVML data complies with the NVML syntax (at step S72). For example, the navigation data evaluating portion 90 determines whether or not the latitude, longitude, telephone number, fax number, e-mail address, URL, geodetic system, vehicle notation, and information attributes have been correctly described in the NVML data (for example, a minus value of the "delay" attribute of a guide cannot be designated).

Thereafter, the navigation data evaluating portion 90 checks the feasibility (such as whether or not the user can drive a particular course in time using the relation of time and distance, whether or not there is a closed road using the road network information, and whether or not a point that does not exist has been designated using the geographic information system) (at step S73).

Thereafter, the navigation data evaluating portion 90 checks the appropriateness (at step S74) Even if the NVML data is feasible, when the course is excessively a roundabout way or there are long blank intervals among guides, it is considered that the NVML data is not appropriate data. In addition, if guides overlap at a point, since they are not displayed, the navigation information is not valid. To solve such a problem, the navigation data evaluating portion 90 determines whether or not data is appropriate using an evaluation function. When necessary, the navigation data evaluating portion 90 outputs a substitute (at S75).

The necessity for correcting navigation data varies depending on road conditions (such as traffic jam, road construction, and traffic accident) and weather conditions. Thus, occasionally, navigation data may be corrected on real time basis. In such a case, the navigation data evaluating portion 90 corrects the guide course and guide contents on real time basis and supplies the corrected data to the presentation method controlling portion 30 and the guide dialog controlling portion 64. As a substitute, the navigation data evaluating portion 90 references map information database, creates a plan for changing a car to a train or a plan for changing a general road to a highway for a route on which the user cannot arrive at the destination point in time, and proposes the created substitute plan to the user.

[Application in Combination of Each Means]

When each means that accomplishes the present invention is modularized and combined, a tool that has many functions and processes navigation data can be created. In that case, each module can be called as a subroutine or a function. In a system using an object oriented program, each module may be provided as an object.

Figure 36:
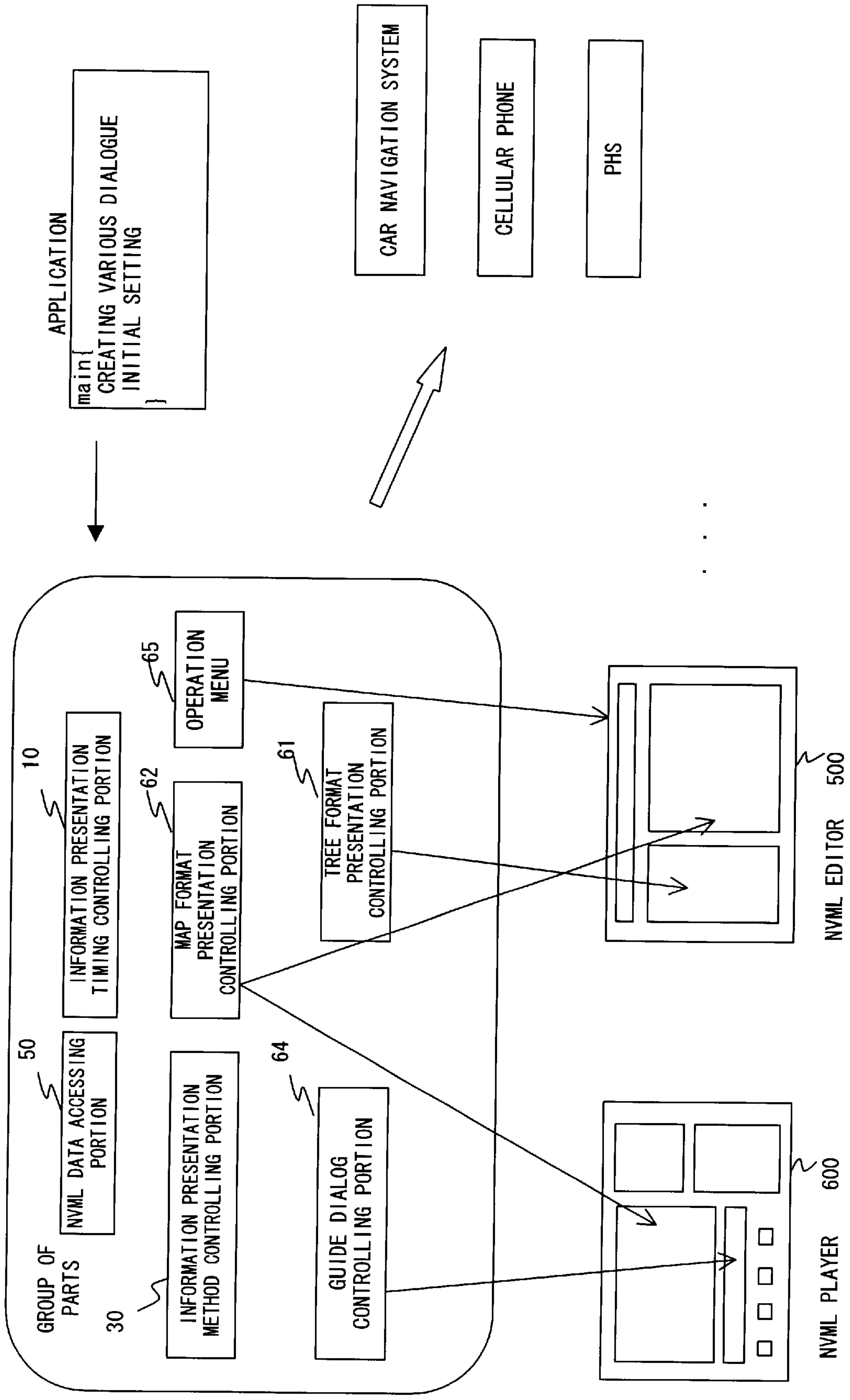
FIG. 36 is a schematic diagram showing an example of a combination of individual component means.

FIG. 36 shows an example of which an NVML editor 500 and an NVML player 600 are structured in a combination of each module shown in FIG. 2A. Referring to FIG. 36, when the tree format presentation controlling portion 61, the map format presentation controlling portion 62, and a proper operation menu 65 are combined, a simple NVML data editing tool (NVML editor 500) can be accomplished. On the other hand, when the map format presentation controlling portion 62 and the guide dialog controlling portion 64 are combined, the NVML player 600 can be accomplished.

Figure 37:
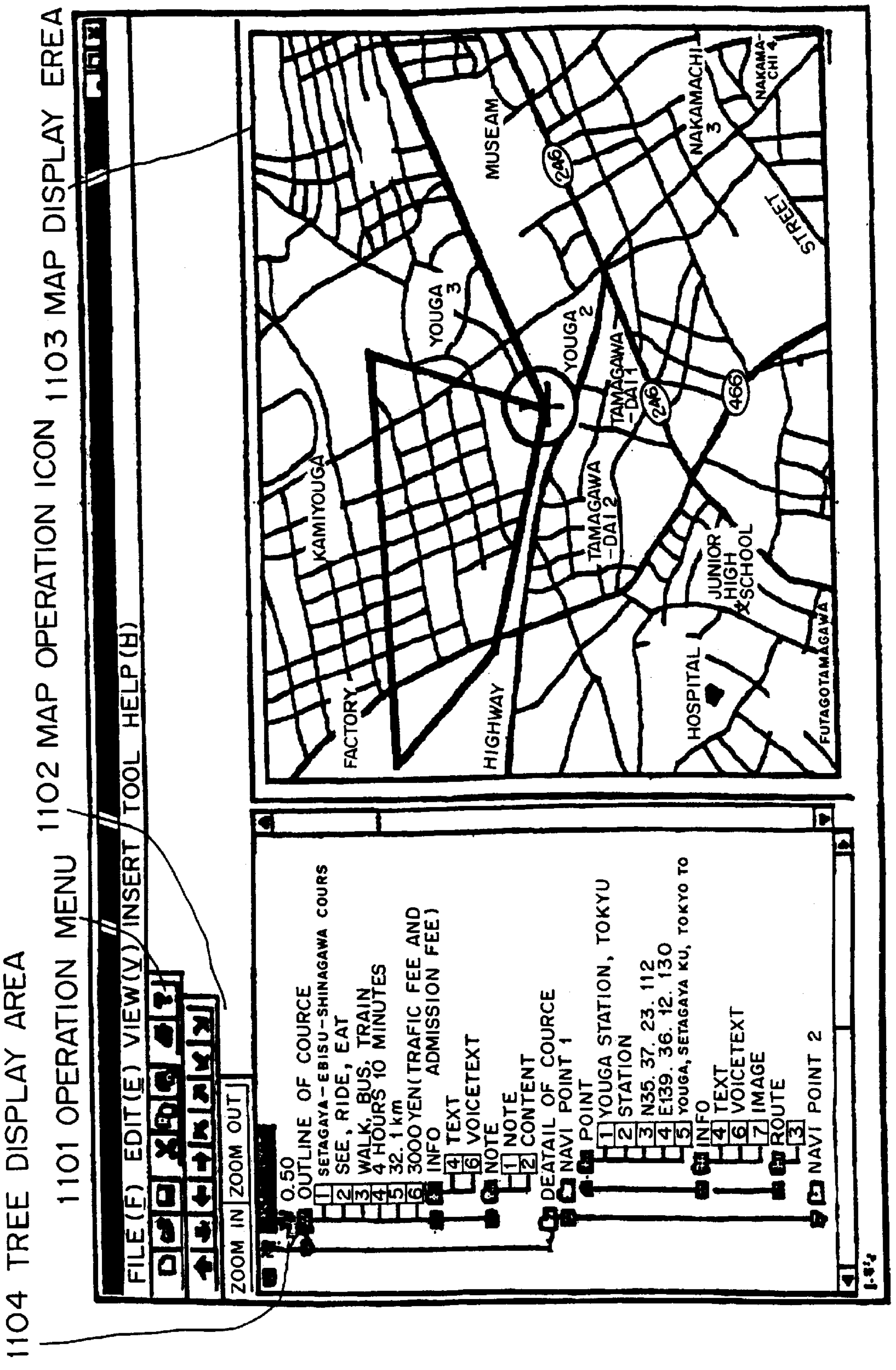
FIG. 37 is a schematic diagram showing an example of a display screen of an NVML editor.

FIG. 37 shows an example of a display screen of the NVML editor 500 as an editing tool. On the editing screen of the NVML editor 500, an operation menu 1101, a map operation icon 1102, a map display area 1103, and a tree display area 1104 appear.

Figure 38:
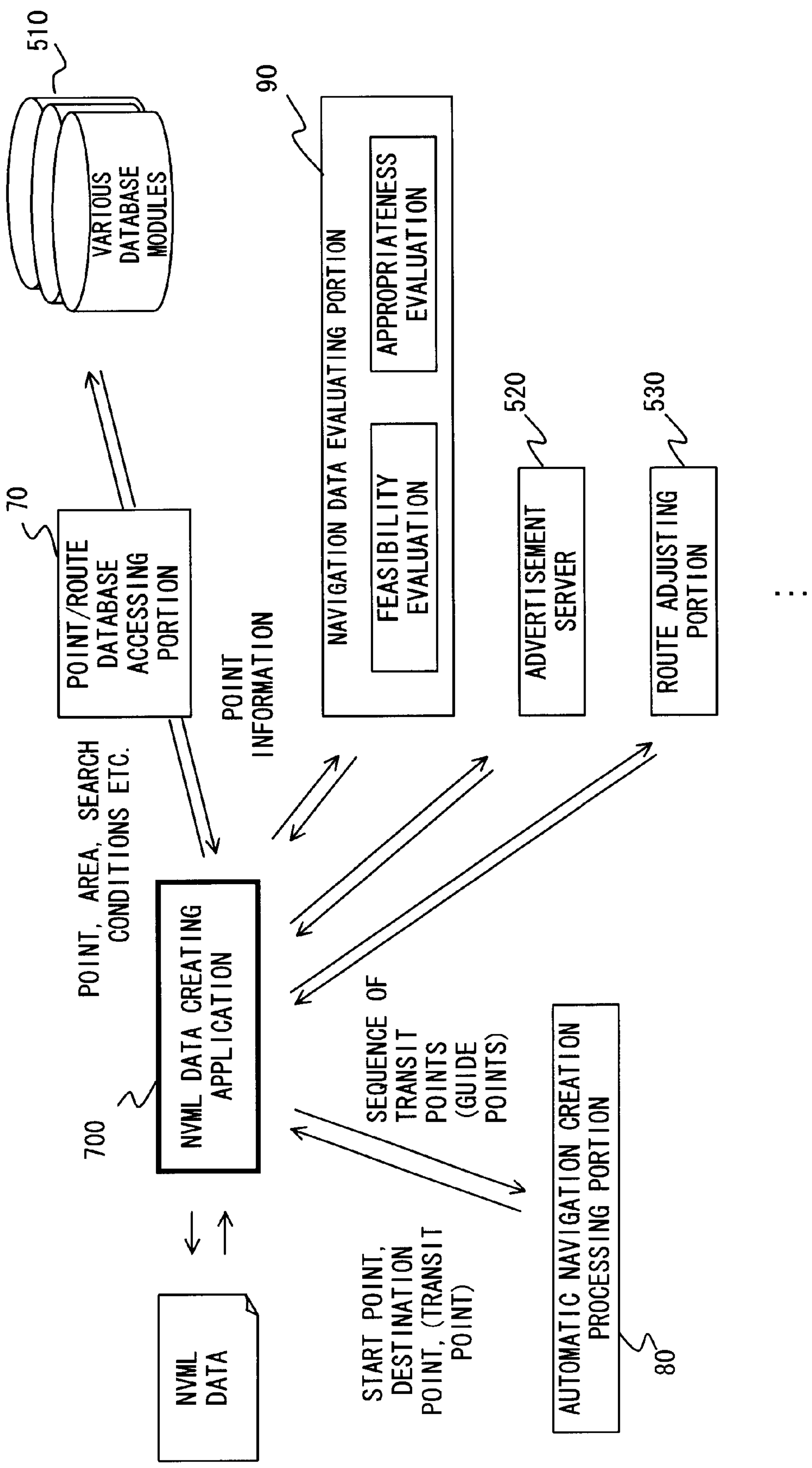
FIG. 38 is a block diagram showing an example of an NVML data creating application.

In addition, as shown in FIG. 38, various database modules 510 (such as sightseeing database, customer database, store database, public facility database, history database, and company local database) and the point—route database accessing portion 70 are disposed to a module used as the NVML editor 500. Alternatively, the navigation data evaluating portion 90, which evaluates the feasibility and appropriateness of generated and edited navigation data may be disposed to the module as the NVML editor 500. Alternatively, a module that extracts information from an advertisement server 520 may be disposed to the module as the NVML editor 500. Alternatively, a course adjusting portion 530 that adjusts a course against other users and the automatic navigation creation processing portion 80, which automatically creates navigation data, may be disposed to the module as the NVML editor 500. As a result, an NVML data creating application 700 can be created.

Figure 39:
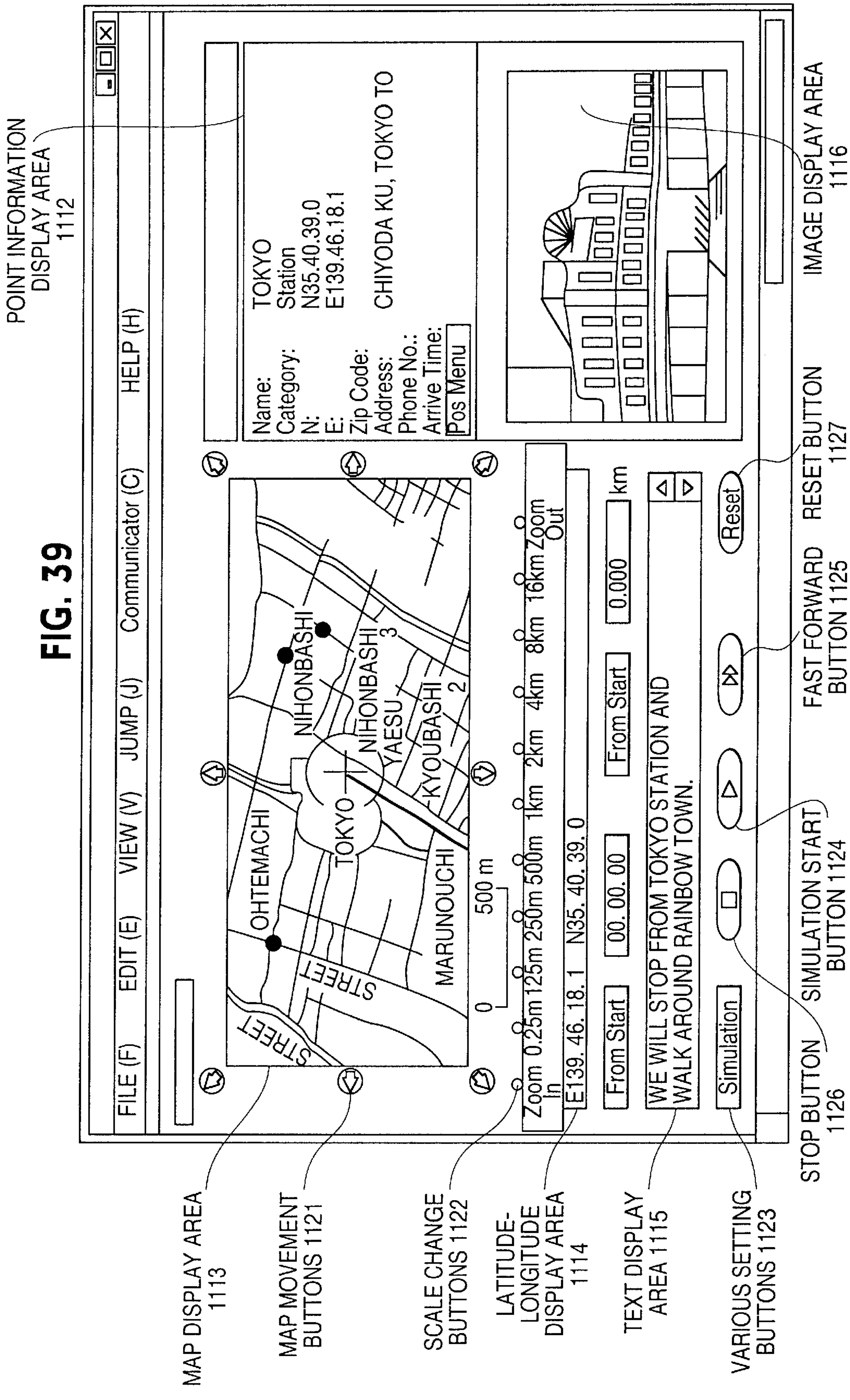
FIG. 39 is a schematic diagram showing an example of a browser screen of an NVML player.

FIG. 39 shows an example of a browser screen of the NVML player 600. The NVML player 600 operates the time—place generation processing portion 20, the information presentation timing controlling portion 10, and the presentation method controlling portion 30 as background processes. In addition, the NVML player 600 operates the map format presentation controlling portion 62, the guide dialog controlling portion 64, and so forth so as to simulate a navigation. On the browser screen, for example, an information display area 1112, a map display area 1113, a latitude—longitude display area 1114, a text display area 1115, an image display area 1116, map movement buttons 1121, scale change buttons 1122, various setting buttons 1123, a simulation start button 1124, a fast forward button 1125, a stop button 1126, and a reset button 1127.

Figure 40:
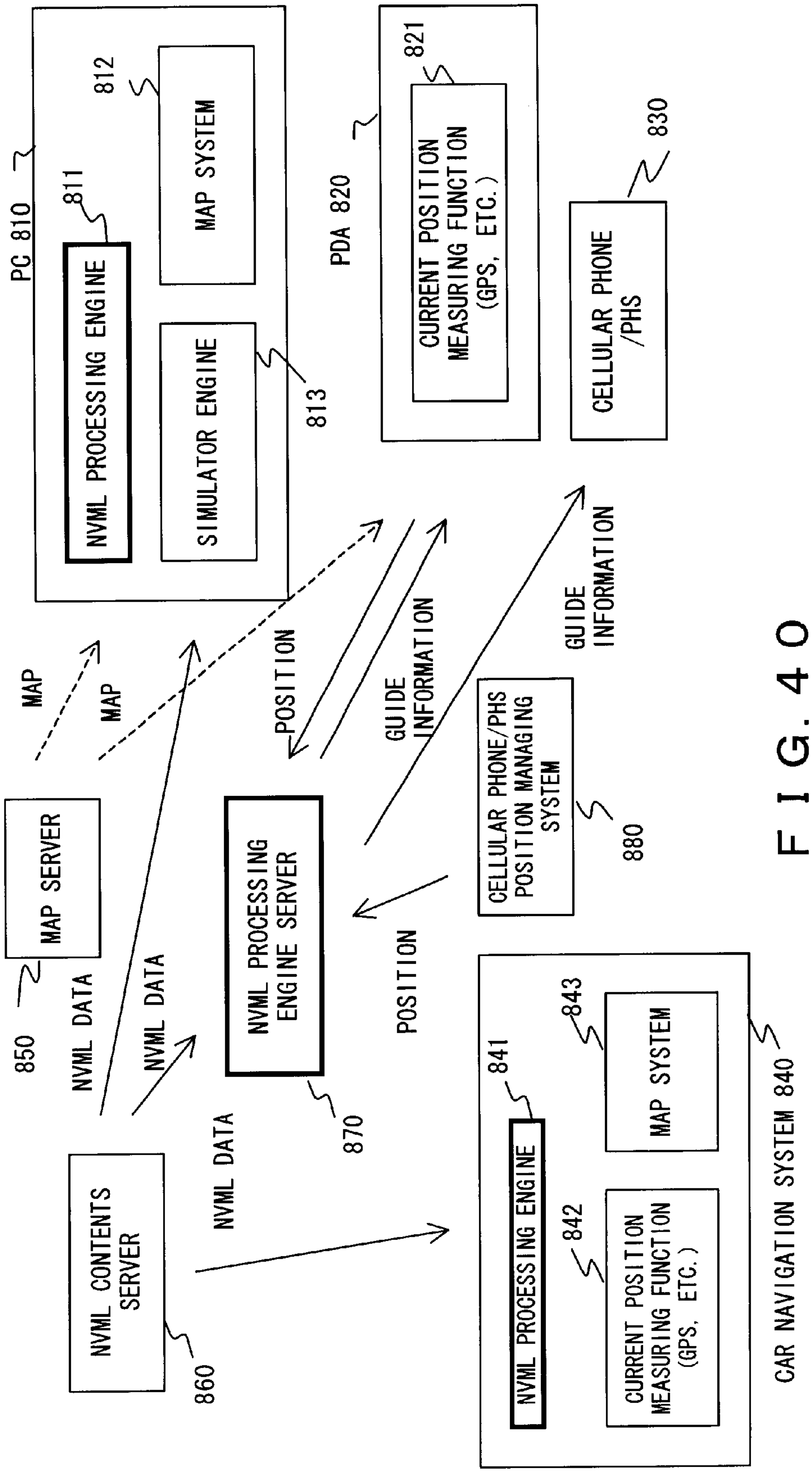
FIG. 40 is a block diagram showing an example according to the present invention.

As shown in FIG. 40, in a combination of required means corresponding to the process performance of each terminal unit such as a personal computer (PC) 810, a portable information terminal unit (PDA: Personal Digital Assistant) 820, a cellular phone—PHS 830, or a car navigation system 840, a navigation using NVML data can be presented.

The PC 810 having a NVML processing engine 811 obtains a map from an external map server 850 and NVML data from an NVML contents server 860 and presents a navigation. When the PC 810 is equipped with a map system 812, the PC 810 obtains only NVML data from the NVML contents server 860 without need to obtain a map from the map server 850. When the PC 810 is equipped with a simulator engine 813, the PC 810 can present a guide in a simulation mode.

The PDA 820 measures the current position using a current position measuring function 821 and supplies the measured current position to an NVML processing engine server 870. The NVML processing engine server 870 obtains NVML data from the NVML contents server 860 and supplies navigation information to the PDA 820. The PDA 820 presents a navigation corresponding to the received navigation information and (when necessary) a map obtained from the map server 850.

The cellular phone—PHS 830 obtains navigation information from the NVML processing engine server 870 corresponding to the position information obtained from a cellular phone—PHS position managing system 880 and presents a navigation.

A car navigation system 840 comprises an NVML processing engine 841, a map system 843, and a current position measuring function 842. Thus, the car navigation system 840 obtains NVML data directly from the NVML contents server 860 and presents a navigation.

When each means that accomplishes the present invention is modularized, individual functions can be easily substituted with others for easy development and easy installation to other systems.

Each portion of the apparatus according to the present invention can be accomplished as a modularized program. As shown in FIG. 41, each portion is connected mutually or through API (Application Programming Interface) and a message communicating means that exchanges messages. An NVML data accessing portion 1201 shown in FIG. 41 corresponds to the navigation data accessing portion 50 shown in FIG. 2A; a presentation method controller 1202 shown in FIG. 41 corresponds to the presentation method controlling portion 30 shown in FIG. 2A; an information presentation timing controller 1203 shown in FIG. 41 corresponds to the information presentation timing controlling portion 10 shown in FIG. 2A; a time—place generator 1204 shown in FIG. 41 corresponds to the time—place generation processing portion 20 shown in FIG. 2A; a map database accessing controller 1205 shown in FIG. 41 corresponds to the point—route database accessing portion 70 shown in FIG. 2A; an automatic navigation creating module 1206 shown in FIG. 41 corresponds to the automatic navigation creation processing portion 80 shown in FIG. 2A; and an NVML evaluating module 1207 shown in FIG. 41 corresponds to the navigation data evaluating portion 90 shown in FIG. 2A.

The basic functions of the NVML data accessing portion 1201 are an NVML data accessing (reading writing) function, an NVML data matching checking function, a point operating function, and a type converting function (for latitude, longitude, character string, numeric value, and so forth). Thus, NVML data can be easily handled.

As a basic function, the time—place generator 1204 generates time—place corresponding to NVML data and simulation setup data. The time—place generator 1204 has a step timer and an event timer. The step timer generates time—place step by step. The event timer generates time—place at timings of which a vehicle arrives at each point and of which each guide is presented. Thus, using NVML data, the traveling of a vehicle can be simulated.

As basic functions, the information presentation timing controller 1203 interprets attributes of an "info" tag ("delay" attribute, "duration" attribute, and "times" attribute) and an attribute of a "point" tag ("area" attribute) and presents the start time and end time of a guide. In addition, the information presentation timing controller 1203 presents a guide corresponding to the priority levels of a transit point ("navi" element), a guide point ("guide" element), a point ("point" element), and a route ("route" element). Moreover, the information presentation timing controller 1203 manages arrival time and point passage information and various tables for a guide presentation schedule. Thus, the information presentation timing controller 1203 can easily control a timing at which NVML navigation data is presented so as to manage navigation data.

As basic functions, the presentation method controller 1202 selects a view system (map, tree, dialog, or the like) and manages the layout and size thereof. In addition, the presentation method controller 1202 determines a platform (PC, car navigation system, cellular phone, television, PDA, or the like) and designates required components and display size. Thus, NVML data can be processed without need to consider the display size of the user's terminal unit.

A map format presentation controller 1233 shown in FIG. 41 corresponds to the map format presentation controlling portion 62 shown in FIG. 2A; a tree format presentation controller 1234 shown in FIG. 41 corresponds to the tree format presentation controlling portion 61 shown in FIG. 2A; a text view 1213 shown in FIG. 41 corresponds to the text format controlling portion 63 shown in FIG. 2A; a guide point dialog 1221, a transit point dialog 1222, a navi route dialog 1223, a navigation information presentation dialog 1224, an outline dialog 1225, and a remarks dialog 1226 shown in FIG. 41 correspond to the guide dialog controlling portion 64 shown in FIG. 2A; and an NVML communication controller 1214 and a print module 1215 shown in FIG. 41 correspond to the data communication controlling portion 40 shown in FIG. 2A.

As basic functions, the map format presentation controller 1233 superimposes NVML data on a map and corrects the NVML data on the map corresponding to an operation of points. Thus, NVML data can be displayed on a map. In addition, the user can easily browse the relation of points on a map. In addition, geographical data such as latitude and longitude of NVML data can be easily input.

The tree format presentation controller 1234 places NVML data on a tree and edits the NVML data on the tree corresponding to a user's operation. Thus, points can be substituted using GUI (Graphical User Interface). In other words, NVML data can be easily edited in a nest structure.

Those portions can be stored to a proper computer readable record medium such as a portable memory, a semiconductor memory, or a hard disk.

In a combination of individual modules shown in FIG. 41, various types of application programs can be accomplished. FIGS. 42A, 42B, and 42C are examples of application programs that can be accomplished.

FIG. 42A shows an example of the structure of an NVML player that simulates a navigation. The NVML player is accomplished in a combination of the NVML data accessing portion 1201, the time—place generator 1204, the information presentation timing controller 1203, the presentation method controller 1202, the map format presentation controller 1233, and various information display dialogs 1300 as shown in FIG. 42A.

FIG. 42B shows an example of the structure of a real navigation system that navigates a course. The navigation system is accomplished in a combination of the NVML data accessing portion 1201, a place—time sensor driver module 1310, the information presentation timing controller 1203, the presentation method controller 1202, the map format presentation controller 1233, and the various information display dialogs 1300 as shown in FIG. 42B.

FIG. 42C shows an example of the structure of an NVML editor that creates and edits NVML data. The NVML editor is accomplished in a combination of the NVML data accessing portion 1201, the map format presentation controller 1233, the tree format presentation controller 1234, and the various information display dialogs 1300 as shown in FIG. 42C.

Next, an example of NVML data for a course shown in FIG. 24 will be described.

<?xml version="1.0" encoding="shift_jis"?>
<!DOCTYPE nvml SYSTEM". ./dtd/nvml-00_06_00.dtd">
<nvml version="0.60">
<head>
<title> Rainbow Town Walk </title>
<category> sightseeing </category>
<category> Tokyo To </category>
<transport> car, walk </transport>
<duration> Required: 3 hours </duration>
<distance> 9.6 km </distance>
<expense> Metropolitan Highway: 700 yen </expense>
<geodetic-system> tokyo </geodetic-system>
<note name="copyright" content—"Jujitsu Laboratories Ltd."/>

```
<note name="last modified content"="1999. 11. 05"/>
<info>
<text> Rainbow Town Walk Course </text>
<voice> Welcome to Rainbow Town Walk Course
</voice>
<image src=". ./image/13-rainbow-bridge-west-01-P2170022.jpg"/>
<note name="copyright" content="Fujitsu Laboratories Ltd."/>
</info>
</head>
<navi>
<point>
<name> Tokyo Station </name>
<category> Station </category>
<category> JR, Subway </category>
<latitude> N35. 40. 37. 0 </latitude>
<longitude> E139. 46. 19. 0 </longitude>
<address> Marunouchi, Chiyoda Ku, Tokyo To
</address>
<zip-code> 100-0005 </zip-code>
<phone> 03-3231-0034 </phone>
<fax> 03-3231-0034 </fax>
<e-mail> staff@tokyo-station.com </e-mail>
<url> http://www.tokyo-station.com </url>
<note name="note" content="the most popular station"/>
</point>
<infoo>
<text> We will start from Tokyo Station and walk around Rainbow Town. </text>
<voice> We will start from Tokyo Station and walk around Rainbow Town. </voice>
<image src=". ./image/01-tokyo-station-01-Pic00001.jpg"/>
<note name="copyright" content="Fujitsu Laboratories Ltd."/>
</info>
</navi>
<navi>
<route>
<category> general road </category>
<means> car </means>
</route>
</navi>
<navi>
<point>
<name> Nishiginza IC </name>
<category> Metropolitan Highway </category>
<latitude> N35. 40. 19. 96 </latitude>
<longitude> E139. 46. 13. 122 </longitude>
<address> Cyuo Ku, Tokyo To </address>
</point>
<info>
<text> Enter Metropolitan Highway at Nishiginza IC.
</text>
<voice> We will enter Metropolitan Highway at Nishiginza IC. </voice>
<image src=". ./image/02-nishi-ginza-jc-01-P2170012.jpg"/>
</info>
</navi>
<navi>
<route>
<name> Metropolitan Highway </name>
<category> highway </category>
<number> 11 </number>
<means> car </means>
<duration> 1 min </duration>
<distance> 1.0 km </distance>
<expense> 700 yen </expense>
<note name="speed limit" content="presence"/>
</route>
</navi>
<route>
<category> highway </category>
<means> car </means>
</route>
</navi>
<navi>
<point>
<name> Dobashi </name>
<category> Metropolitan Highway </category>
<latitude> N35. 39. 54. 7 </latitude>
<longitude> E139. 45. 42. 5 </longitude>
</point>
<info delay="20 sec" duration="100 sec">
<text> Near Dobashi </text>
<voice> We are approaching Dobashi. </voice>
<image src=". ./image/05-dobasi-01-P2170014.jpg"/>
</info>
</navi>
<navi>
<route>
<category> Metropolitan Highway </category>
<means> car </means>
</route>
</navi>
<navi>
<point>
<name> Shiodome IC </name>
<category> Metropolitan Highway </category>
<latitude> N35. 39. 38. 7 </latitude>
<longitude> E139. 45. 59. 0 </longitude>
</point>
<info>
<text> Woods on the left Old Hamarikyu Garden
</text>
<voice> The woods on the left side are Old Hamarikyu Garden. </voice>
<image src=./image/08-hama-rikyu-nishi-01-P2170015.jpg/>
</info>
</navi>
  <navi>
<route>
<category> highway </category>
<means> car </means>
</route>
</navi>
<navi>
<point>
<name> Hamazaki Bashi JC </name>
<category> Metropolitan Highway </category>
<latitude> N35. 38. 58. 7 </latitude>
<longitude> E139. 45. 47. 9 </longitude>
</point>
<info>
<text> Near Hamazaki Bashi JC </text>
<voice> We are passing through Hamazaki Bashi Junction. </voice>
<image src=". ./image/09-hama-rikyu-nishi-02-P2170016.jpg"/>
</info>
</navi>
<navi>
```

<route>
<category> highway </category>
<means> car </means>
</route>
</navi>
<navi>
<point>
<name> West, Rainbow Bridge </name>
<category> Metropolitan Highway </category>
<latitude> N35. 38. 5. 7 </latitude>
<longitude> E139. 45. 42. 6 </longitude>
</point>
<info>
<text> Soon, Rainbow Bridge </text>
<voice> Soon, we will pass through Rainbow Bridge.
</voice>
<image src=“. ./iamge/13-rainbow-bridge-west-01-P2170022.jpg”/>
</info>
</navi>
<navi>
<route>
<category> highway </category>
<means> car </means>
</route>
</navi>
<navi>
<point>
<name> East, Rainbow Bridge </name>
<category> Metropolitan Highway </category>
<latitude> N35. 37. 53. 5 </latitude>
<longitude> E139. 46. 19. 1 </longitude>
</point>
<info>
<text> Left side→Harumi Pier </text>
<voice> You can see Harumi Pier on the left side.
</voice>
<image src=“. ./iamge/14-rainbow-bridge-east-01-P2170024.jpg”/>
</info>
</navi>
<navi>
<route>
<category> highway </category>
<means> car </means>
</route>
</navi>
<navi>
<point>
<name> Daiba IC </name>
<category> Metropolitan Highway </category>
<latitude> N35. 37. 50. 220 </latitude>
<longitude> E139. 46. 52. 83 </longitude>
</point>
<info>
<text> Exit Metropolitan Highway at Daiba interchange. </text>
<voice> Exit Metropolitan Highway at Daiba interchange. </voice>
<image src=“. ./image/15-daiba-01-P2170025.jpg”/>
</info>
</navi>
<navi>
<route>
<category> general road </category>
<means> car </means>
</route>
</navi>
<navi>
<point>
<name> Odaiba Seaside Part—Parking </name>
<category> parking </category>
<expense> parking fee: 1000 yen per hour </expense>
<latitude> N35. 37. 40 </latitude>
<longitude> E139. 46. 54. 156 </longitude>
</point>
<info>
<text> Welcome to Odaiba Seaside Park. </text>
<voice> Get off the car and walk around Odaia.
</voice>
</info>
</navi>
<navi>
<route>
<means> foot </means>
</route>
</navi>
<navi>
<point>
<name> Odaiba Seaside Park </name>
<category> park </category>
<latitude> N35. 37. 37. 208 </latitude>
<longitude> E139. 46. 49. 221 </longitude>
</point>
<info>
<text> Best view of Rainbow Bridge. </text>
<voice> You can see the best view of Rainbow Bridge at Odaiba Seaside Park. </voice>
<image src=“. ./image/17-kaihin-park-01-Pic00017.jpg”/>
</info>
</navi>
<navi>
<route>
<means> foot </means>
</route>
</navi>
<navi>
<point>
<name> Decks Tokyo Beach </name>
<category> park </category>
<latitude> N35. 37. 33. 72 </latitude>
<longitude> E139. 46. 44. 39 </longitude>
<address> 1-6-1, Daiba, Minato Ku, Tokyo To
</address>
<phone> 03-5500-5050 </phone>
</point>
<info>
<text> Do not miss lovely season Love 2 at Joypolice!</text>
<voice> Next, go to FJ Television from Decks Tokyo Beach. </voice>
<image src=“. ./image/18-decks-tokyo-beach-01-P2170037.jpg”/>
</info>
</navi>
<navi>
<route>
<means> foot </means>
</route>
</navi>
<navi>
<point>
<name> FJ Television </name>
<category> television station </category>

```
<latitude> N35. 37. 24. 1 </latitude>
<longitude> E139. 46. 39. 2 </longitude>
<address> 2-4-8, Daiba, Minato Ku, Tokyo To
  </address>
<phone> 03-5500-8888 </phone>
</point>
<info>
<text> Sightseeing Tour: Spherical observatory deck, studio
  promenade, etc. </text>
<voice> Visit FJ Television. </voice>
<image src=". ./image/19-fuji-television-01-
  P2170039.jpg"/>
</info>
</navi>
<navi>
<route>
<means> foot </means>
</route>
</navi>
<navi>
<point>
<name> Shiokaze Park </name>
<category> park </category>
<latitude> N35. 37. 13. 112 </latitude>
<latitude> E139. 46. 22. 158 </latitude>
</point>
<info>
<text> Seaside promenade where you can see ships and
  planes </text>
<voice> How about taking a break at Shiokaze Park ?
  </voice>
<image src=". . /image/20-shiokaze-park-
  01Pic00026.jpg"/>
</info>
</navi>
<navi>
<route>
<means> foot </means>
</route>
</navi>
<navi>
<point>
<name> Museum of Marine Science </name>
<category> Museum </category>
<latitude> N35. 37. 3. 5 </latitude>
<longitude> E139. 46. 32. 2 </longitude>
<address> 3-1, Higashi-Yatsushio, Shinagawa Ku, Tokyo To
  </address>
<phone> 03-5500-1111 </phone>
</point>
<info>
<text> Exhibitions of Antarctic observation ship "Soya" and
  ferry steamer "Youtei-maru". </text>
<voice> Antarctic observation ship "Soya" and ferry
  steamer "Youtei-maru" are exhibited at Museum of Marin
  Science. </voice>
<image src=". ./image/21-museum-of-marin-science-01-
  Pic00044.jpg"/>
</info>
</navi>
<navi>
<route>
<means> foot </means>
</route>
</navi>
<point>
<name> Museum of Marine Science Station </name>
<category> Yurikamome </category>
<latitude> N35. 37. 5. 100 </latitude>
<longitude> E139. 46. 34. 214 </longitude>
</point>
<info>
<text> Yurikamome: Museum of Marine Science Station
  </text>
<voice> Did you enjoy it? Use "Yurikamome" for your
  return. </voice>
<image src=". ./image/21-museum-of-marine-science-01-
  Pic00044.jpg"/>
</info>
</navi>
<guide>
<point area="0.5km">
<name> Yuurakucho Marion </name>
<category> department store </category>
<latitude> N35. 40. 13. 52 </latitude>
<longitude> E139. 45. 57. 123 </longitude>
<address> 2-5-1, Yurakucho, Chiyoda Ku, Tokyo To
  </address>
<phone> 03-3214-6315 </phone>
</point>
<info>
<text> Enjoy shopping at Yurakucho Marion </text>
<voice> Enjoy shopping at Yurakucho Marion!
  </voice>
<image src=". . /image/03-sukiyabasi-01-P2170008.jpg"/>
</info>
</guide>
<guide>
<point area=1.15 km>
<name> Tokyo Tower </name>
<category> tower </category>
<latitude> N35. 39. 20. 22 </latitude>
<longitude> E139. 45. 17. 28 </longitude>
<address> 4-2-8, Shiba-koen, Minato Ku, Tokyo To
  </address>
<phone> 12-3456-7890 </phone>
</point>
<info>
<text> right side—Tokyo Tower </text>
<voice> You can see Tokyo Tower on the right side.
  </voice>
<image src=". ./image/11-shibaura-jc-01-Pic00006.jpg"/>
</info>
</guide>
</body>
</nvml>
```

Tags having the relation of parent and children used in the above-described NVML data are defined in the following DTD (Document Type Definition).

```
<!ELEMENT nvml (head?, body?)>
<!ATTLIST nvml version CDATA #IMPLIED>
<!ELEMENT head (title!, category*, transport?, duration?,
  distance?, expense?, geodetic-system?, note*, info?)>
<!ELEMENT body (navi guide)*>
<!ELEMENT navi ((point route), info?>
<!ELEMENT guide (point, info?)>
<!ELEMENT point (name?, category*, (latitude, longitude)
  ?, address?, zip-code?, phone?, fax?, e-mail?, url?,
  expense?, note*)>
<!ATTLIST point area CDATA #IMPLIED>
<!ELEMENT route (name?, category*, number?, means?,
  duration?, distance?, expense?, note*)>
<!ELEMENT info (text?, voice?, image?, note*)>
  <!ATTLIST info delay CDATA #IMPLIED duration
  CDATA #IMPLIED times CDATA #IMPLIED>
```

```
<!ELEMENT title (#PCDATA)>
<!ELEMENT category (#PCDATA)>
<!ELEMENT transport (#PCDATA)>
<!ELEMENT duration (#PCDATA)>
<!ELEMENT distance (#PCDATA)>
<!ELEMENT expense (#PCDATA)>
<!ELEMENT geodetic-system (#PCDATA)>
<!ELEMENT note EMPTY>
<!ATTLIST note name CDATA #IMPLIED>content
  CDATA #IMPLIED
<!ELEMENT name (#PCDATA)>
<!ELEMENT latitude (#PCDATA)>
<!ELEMENT longitude (#PCDATA)>
<!ELEMENT address (#PCDATA)>
<!ELEMENT zip-code (#PCDATA)>
<!ELEMENT phone (#PCDATA)>
<!ELEMENT fax (#PCDATA)>
<!ELEMENT e-mail (#PCDATA)>
<!ELEMENT url (#PCDATA)>
<!ELEMENT number (#PCDATA)>
<!ELEMENT means (#PCDATA)>
<!ELEMENT text (#PCDATA)>
<!ELEMENT voice (#PCDATA)>
<!ATTLIST voice src CDATA #IMPLIED>
<!ELEMENT image EMPTY>
<!ATTLIST image src CDATA #IMPLIED>
```

When the NVML data is executed, a image stored in the file ". ./image/13-rainbow-bridge-west-01-P2170022.jpg" is displayed. A message "Welcome to Rainbow Town Walk Tour!" is output in the text and voice formats. At Tokyo Station as the start point of the tour, an image of Tokyo Station stored in the file ". ./image/01-tokyo-station-01-Pic00001.jp" is displayed. In addition, a message "We will start from Tokyo Station and walk around Rainbow Town." is output in the text and voice formats.

In the map display area, a navigation of which the vehicle starts from Tokyo Station, enters Metropolitan Highway at Nishi-Ginza IC, and go to Rainbow Bridge through Shiodome IC, Hamazaki JC, and so forth.

When the vehicle starts from Tokyo Station and arrives at Nishi-Ginza IC, an image of the interchange and a message "We will enter Metropolitan Highway at Nisi-Ginza IC." in the text and voice formats are output. When the vehicle enters an area of 500 m of the radius of Yurakucho Marion, an image stored in the file ". ./image/03-sukiyabashi-01-P2170008.jp/>is displayed. In addition to a text guide "Enjoy shopping at Yurakucho Marion.", a voice guide "Enjoy shopping at Yurakucho Marion." is output. Likewise, as the vehicle further travels, relevant navigation information is output.

As was described above, according to the structure shown in FIG. 2A, navigation data can be effectively processed corresponding to a user's request. In addition, a guide can be presented to the user in an appropriate method and an appropriate timing corresponding to a situation. Moreover, such navigation data can be easily created.

According to the present invention, the following guides can be created and presented.

Creation of album of course of travel,

Explanation of invasion, battle, and war,

Recommended guide of amusement park, museum, and aquarium,

Treasure hunt and orienteering

Roads on which VIP people passed through and scenes of movies

Experiences of courses introduced on TV programs and magazines

Simulations of delivery

Programs and data according to the above-described embodiments can be transmitted from a server to an information processing apparatus through a network. At that time, the server generates a transmission signal for transmitting programs and data and transmits the signal to the information processing apparatus through any transmission medium on the network. The information processing apparatus performs a required process using the received programs and data.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A navigation information presenting apparatus for presenting navigation information corresponding to a situation to a user, comprising:

an inputting device inputting a navigation script including a sequence of instructions describing one of time information and point information, navigation information, and restriction information according to a predetermined specification, the navigation information being output corresponding to one of presentation time and presentation point, the restriction information relating to one of the time information and the point information;

a situation device getting a situation by one of obtaining one of a current time and a current point, and generating one of a virtual current time and a virtual current point;

an adjusting device adjusting one of time described in the time information and point described in the point information using the situation, one of the time information and the point information, and the restriction information;

an executing device executing an instruction described in an adjusted navigation script corresponding to the situation; and a presenting device outputting navigation information corresponding to execution of the instruction and presenting the navigation information to the user.

2. The navigation information presenting apparatus as set forth in claim 1, wherein the navigation script is described in a markup language that identifies the time information, the point information, the restriction information, the navigation information, and structural elements of other instructions with one of a tag and an attribute of a tag.

3. The navigation information presenting apparatus as set forth in claim 1, wherein the navigation script allows a plurality of instructions to be executed in sequence and in parallel as a sequence execution command and a parallel execution command, respectively, and wherein said executing device sequentially executes the plurality of instructions one by one corresponding to the sequential execution command and executes a plurality of instructions in parallel corresponding to the parallel execution command.

4. The navigation information presenting apparatus as set forth in claim 1, wherein said inputting device inputs a navigation script designated by the user from one of a network connected to an external device that provides a navigation script and a computer readable electronic medium.

5. The navigation information presenting apparatus as set forth in claim 1, further comprising:

a converting device analyzing the input navigation script and converting the navigation script into navigation structured data, wherein said executing device executes an instruction described in a format of the navigation structured data.

6. The navigation information presenting apparatus as set forth in claim 1, wherein said presenting device presents a current point, a start point, a transit point, a destination point, and a route of at least part of a navigation script in a format corresponding to one of a map, voice, a still picture, and a moving picture to the user, in a manner corresponding to one of outputting successively, outputting instruction by instruction, outputting for designated time, outputting for a designated distance, outputting for a designated point, outputting according to an input operation, outputting according to an external event.

7. A navigation information presenting apparatus for presenting navigation information corresponding to a situation to a user, comprising:

an inputting device inputting a navigation script including a sequence of instructions describing one of time information and point information, navigation information and restriction information according to a predetermined specification, the navigation information being output corresponding to one of presentation time and presentation point, the restriction information corresponding to one of the time information and the point information;

a designating device designating one of a navigation mode and a simulation mode depending on one of an input operation of the user and a system setup;

an obtaining device obtaining a situation corresponding to one of a current time and a current point in the navigation mode;

a generating device generating a situation corresponding to one of a virtual current time and a virtual present time in the simulation mode;

an adjusting device adjusting one of time described in the time information and a point described in the point information by using one of the situation obtained by said obtaining device and the situation generated by said generating device, one of the time information and the point information, and the restriction information;

an executing device executing an instruction described in an adjusted navigation script corresponding to the situation obtained by said obtaining device in the navigation mode and executing an instruction described in the adjusted navigation script corresponding to the situation generated by said generating device in the simulation mode; and a presenting device outputting navigation information corresponding to execution of the instruction and presenting the navigation information to the user.

8. A navigation information presenting method for presenting navigation information corresponding to a situation to a user, comprising:

inputting a navigation script including a sequence of instructions describing one of time information and point information, navigation information and restriction information according to a predetermined specification, the navigation information being output corresponding to one of presentation time and presentation point, the restriction information relating to one of the time information and the point information, the navigation script being input by one of communicating through a network and reading from an electronic medium;

getting a situation by one of obtaining one of a current time and a current point, and generating one of a virtual current time and a virtual current point;

adjusting one of time described in the time information and point described in the point information using the situation, one of the time information and the point information, and the restriction information;

executing an instruction described in an adjusted navigation script corresponding to the situation; and outputting navigation information corresponding to execution of the instruction and presenting the navigation information to the user.

9. A navigation information presenting method for presenting navigation information corresponding to a situation to a user, comprising:

inputting a navigation script including a sequence of instructions describing one of time information and point information, navigation information and restriction information according to a predetermined specification, the navigation information being output corresponding to one of presentation time and presentation point, the restriction information relating to one of the time information and the point information, the navigation script being input by one of communicating through a network and reading from an electronic medium;

designating one of a navigation mode and a simulation mode depending on one of an input operation of the user and a system setup;

obtaining one of a current time and a current point in the navigation mode;

generating one of a virtual current time and a virtual present time in the simulation mode;

adjusting one of time described in the time information and a point described in the point information corresponding to one of the obtained situation and the generated situation, one of the time information and the point information, and the restriction information;

executing an instruction described in an adjusted navigation script corresponding to the obtained situation in the navigation mode;

executing an instruction described in the adjusted navigation script corresponding to the generated situation in the simulation mode; and outputting navigation information corresponding to execution of the instruction and presenting the navigation information to the user.

10. A computer-readable recording medium on which a program is recorded for a computer for presenting navigation information corresponding to a situation to a user, the program causing the computer to perform:

inputting a navigation script including a sequence of instructions describing one of time information and point information, navigation information and restriction information according to a predetermined specification, the navigation information being output corresponding to one of presentation time and presentation point, the restriction information relating to one of the time information and the point information, the navigation script being input by one of communicating through a network and reading from an electronic medium;

getting a situation by one of obtaining one of a current time and a current point, and generating one of a virtual current time and a virtual current point;

adjusting one of time described in the time information and point described in the point information using the situation, one of the time information and the point information, and the restriction information;

executing an instruction described in an adjusted navigation script corresponding to the situation; and outputting navigation information corresponding to execution of the instruction and presenting the navigation information to the user.

11. A computer-readable recording medium on which a program is recorded for a computer for presenting navigation information corresponding to a situation to a user, the program causing the computer to perform:

inputting a navigation script including a sequence of instructions describing one of time information and point information, navigation information and restriction information according to a predetermined specification, the navigation information being output corresponding to one of presentation time and presentation point, the restriction information relating to one of the time information and the point information, the navigation script being input by one of communicating through a network and reading from an electronic medium;

designating one of a navigation mode and a simulation mode depending on one of an input operation of the user and a system setup;

obtaining a situation corresponding to one of a current time and a current point in the navigation mode;

generating a situation corresponding to one of a virtual current time and a virtual present time in the simulation mode;

adjusting one of time described in the time information and a point described in the point information corresponding to one of the obtained situation and the generated situation, one of the time information and the point information, and the restriction information;

executing an instruction described in an adjusted navigation script corresponding to the obtained situation in the navigation mode;

executing an instruction described in the adjusted navigation script corresponding to the generated situation in the simulation mode; and outputting navigation information corresponding to execution of the instruction and presenting the navigation information to the user.

12. A computer-readable recording medium for a computer for presenting navigation information corresponding to a situation to a user, wherein a navigation script composed of an electronic code sequence and containing a sequence of instructions is recorded on the recording medium in a manner that the computer presents navigation information corresponding to the instructions to the user, the instructions describing one of time information and point information, navigation information and restriction information according to a predetermined specification, the navigation information being output corresponding to one of presentation time and presentation point, the restriction information relating to one of the time information and the point information.

13. A navigation information presenting apparatus for presenting navigation information corresponding to a situation to a user, comprising:

inputting means for inputting a navigation script including a sequence of instructions describing one of time information and point information, navigation information and restriction information according to a predetermined specification, the navigation information being output corresponding to one of presentation time and presentation point, the restriction information relating to one of the time information and the point information;

situation means for getting a situation by one of obtaining one of a current time and a current point, and generating one of a virtual current time and a virtual current point;

adjusting means for adjusting one of time described in the time information and point described in the point information using the situation, one of the time information and the point information, and the restriction information;

executing means for executing an instruction described in an adjusted navigation script corresponding to the situation; and presenting means for outputting navigation information corresponding to execution of the instruction and presenting the navigation information to the user.

14. A propagation signal for propagating a program to a computer for presenting navigation information corresponding to a situation to a user, the program causing the computer to perform:

inputting a navigation script including a sequence of instructions describing one of time information and point information, navigation information and restriction information according to a predetermined specification, the navigation information being output corresponding to one of presentation time and presentation point, the restriction information relating to one of the time information and the point information, the navigation script being input by one of communicating through a network and reading from an electronic medium;

getting a situation by one of obtaining one of a current time and a current point, and generating one of a virtual current time and a virtual current point;

adjusting one of time described in the time information and point described in the point information using the situation, one of the time information and the point information, and the restriction information;

executing an instruction described in an adjusted navigation script corresponding to the situation; and outputting navigation information corresponding to execution of the instruction and presenting the navigation information to the user.

15. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

generating timing information corresponding to one of presentation time and a presentation point, according to user's operation for a navigation method including at least one of play, fast forward, skip, and reverse play and according to one of a traveling speed and a time step; and presenting navigation information that matches one of the time information and the point information described in the navigation script according to the generated timing information.

16. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

instructing guide presentation to be started when navigation information that matches one of the time information and the point information described in the navigation script is presented according to one of timing information of generated time, timing information of generated place, measured real time, and measured real place;

managing a presentation time period of navigation information according to attribute information described in the navigation script; and instructing the guide presentation to be stopped.

17. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

determining one of priority corresponding to a type of navigation information and priority corresponding to an output medium in the case that output timings of a plurality of pieces of navigation information overlap when navigation information that matches one of the time information and the point information described in the navigation script according to one of timing information of generated time, timing information of generated place, measured real time, and measured real place is presented to the user; and adjusting an output timing of each navigation information according to a determination result.

18. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

confirming that the user arrives at one of each transit point and each guide point obtained from the navigation script;

predicting an arrival time at which the user arrives at the point;

generating schedule information about a presentation timing of navigation information described in the navigation script according to the predicted arrival time;

presenting the navigation information according to the schedule information to the user; and correcting the schedule information according to an arrival situation in which the user- arrives at the point.

19. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

when the number of times for outputting navigation information in a predetermined area has been designated by navigation information described in the navigation script, outputting the navigation information and decrementing the number of times by one whenever the user enters the predetermined area; and when the number of times becomes zero, preventing the navigation information from being output even if the user enters the designated area.

20. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

presenting navigation information that matches one of the time information and the point information described in the navigation script to the user according to one of timing information of generated time, timing information of generated place, measured real time, and measured real place; and presenting one of a predetermined advertisement and other general information, in a time period in which no navigation information is being output.

21. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

when navigation information that matches one of the time information and the point information described in the navigation script is presented to the user according to one of timing information of generated time, timing information of generated place, measured real time, and measured real place, in the case that navigation information that is presented is one of three-dimensional contents and a moving picture, synchronizing one of a display format of the three-dimensional contents and a traveling speed of the moving picture with one of a virtual traveling distance and a real traveling distance; and controlling a view point for an object that is displayed according to a synchronization control.

22. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

inputting a reverse play command issued by the user;

automatically inverting relation of left and right and relation of front and rear of navigation information in one of a text format and a voice format described in the navigation script, according to the input command; and presenting the inverted navigation information to the user.

23. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

presenting a navigation course corresponding to the navigation script in a map format to the user;

presenting the navigation course in a tree format to the user, at least one of transit points and guide points being a node of the tree format; and moving presentation in the map format and the tree format, according to one of a user's input that designates a node in the tree format and execution of the navigation script, to one of a point corresponding to the designated node and a point at which the user arrived according to execution of the navigation script.

24. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

presenting a navigation course corresponding to the navigation script in a tree format to the user, at least one of transit points and guide points being a node of the tree format and hierarchical levels of the tree format corresponding to detail levels; and displaying a lower hierarchical level of the tree format for a portion including a current point in presentation of the tree format when the current point moves, and displaying only a higher hierarchical level of the tree format for a portion apart form the current point.

25. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

presenting a navigation course corresponding to the navigation script in a map format;

displaying at least one of transit points and guide points on the navigation course corresponding to the navigation script with a pin shaped icon in presentation of the map format; and displaying a plurality of pin shaped icons so that they do not overlap by changing a direction of at least one of the pin shaped icons.

26. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

checking whether or not the navigation script is described according to the predetermined specification;

performing at least one of a feasibility check and a appropriateness check for the navigation script; and outputting a substitute according to a check result.

27. A navigation data processing method for creating a navigation script that describes one of time and a point, and navigation information that is output corresponding to one of time information and point information, the navigation script being described according to a predetermined specification and used in a system for interpreting and executing the navigation script to present the navigation information to a user, the method comprising:

presenting a navigation course of a navigation script being created in one of a map format and a tree format;

when at least one of a new transit point and a new guide point is designated for presenting the navigation course, inserting the designated point at a position where the total distance of the navigation course becomes short; and performing one of creation and editing of the navigation script being created according to information of the inserted point.

28. A navigation data processing method for creating a navigation script that describes one of time and a point, and navigation information that is output corresponding to one of time information and point information, the navigation script being described according to a predetermined specification and used in a system for interpreting and executing the navigation script to present the navigation information to a user, the method comprising:

presenting a navigation course of navigation script being created in one of a map format and a tree format;

inputting designation for at least one of a transit point and a guide point in presenting the navigation course;

determining a navigation course according to information of a point corresponding to the input designation;

automatically creating navigation information of a turning direction according to a route calculation; and performing one of creation and editing of the navigation script being created according to the determined navigation course and the automatically created navigation information.

29. A navigation data processing method for creating a navigation script that describes one of time and a point, and navigation information that is output corresponding to one of time information and point information, the navigation script being described according to a predetermined specification and used in a system for interpreting and executing the navigation script to present the navigation information to a user, the method comprising:

presenting a navigation course of navigation script being created in one of a map format and a tree format;

inputting a designation for at least one of a transit point and a guide point in presenting the navigation course;

determining a navigation course according to information of a point corresponding to the input designation;

combining pre-provided image templates of an intersection and an arrow for an intersection on the navigation course and automatically creating navigation information of an image that is output at the intersection; and performing one of creation and editing of the navigation script being created according to the determined navigation course and the automatically created navigation information.

30. A navigation data processing method for interpreting and executing a navigation script that describes one of time and a point, and navigation information that is output corresponding to one of time information and point information, and for presenting the navigation information to a user, the navigation script being described according to a predetermined specification, the method comprising:

causing a server device to interpret and execute the navigation script according to a position of a terminal unit that presents navigation information;

transmitting navigation information corresponding to an execution result of the navigation script from the server device to the terminal unit; and when the transmitted navigation information contains identification information of a predetermined template, causing the terminal unit to generate navigation information using the template corresponding to the identification information and to present the generated navigation information to the user.

31. A navigation data processing method for constructing a system for interpreting and executing a navigation script that describes one of time and a point, and navigation information that is output corresponding to one of time information and point information, and for presenting the navigation information to a user, the navigation script being described according to a predetermined specification, the method comprising:

preparing parts of:

a module for generating one of a virtual time and a virtual place, a module for controlling a timing for presenting navigation information according to one of a virtual time, a real time, a virtual place, and a real place, a module for controlling a presenting method for the navigation information according to one of a terminal unit of the user and an output medium based on the timing controlled by the controlling module, a module for controlling a data communication, a module for controlling presentation of navigation data in a tree format, a module for controlling presentation of navigation data in a map format, a module for controlling presentation of navigation data in a text format, and a module for controlling a dialog for designating various guides and setups; and combining a plurality of parts among the prepared parts so as to create one of a navigation script creating application, a navigation script executing application, and a navigation script simulating application.

32. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

generating timing information corresponding to one of presentation time and presentation point, according to user's operation for a navigation method including at least one of play, fast forward, skip, and reverse play and according to one of a traveling speed and a time step; and presenting navigation information that matches one of the time information and the point information described in the navigation script according to the generated timing information.

33. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

instructing guide presentation to be started when navigation information that matches one of the time information and the point information described in the navigation script is presented according to one of timing information of generated time, timing information of generated place, measured real time, and measured real place;

managing a presentation time period of navigation information according to attribute information of a guide described in the navigation script; and instructing the guide presentation to be stopped.

34. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

determining one of priority corresponding to a type of navigation information and priority corresponding to an output medium in the case that output timings of a plurality of pieces of navigation information overlap when navigation information that matches one of the time information and the point information described in the navigation script according to one of timing information of generated time, timing information of generated place, measured real time, and measured real place is presented to the user; and adjusting an output timing of each navigation information according to a determination result.

35. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

confirming that the user arrives at one of each transit point and each guide point obtained from the navigation script;

predicting an arrival time at which the user arrives at the point;

generating schedule information about a presentation timing of navigation information described in the navigation script according to the predicted arrival time;

presenting the navigation information according to the schedule information to the user; and correcting the schedule information according to an arrival situation in which the user arrives at the point.

36. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

when the number of times for outputting navigation information in a predetermined area has been designated by navigation information described in the navigation script, outputting the navigation information and decrementing the number of times by one whenever the user enters the predetermined area; and when the number of times becomes zero, preventing the navigation information from being output even if the user enters the designated area.

37. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

presenting navigation information that matches one of the time information and the point information described in the navigation script to the user according to one of timing information of generated time, timing information of generated place, measured real time, and measured real place; and presenting one of a predetermined advertisement and other general information, in a time period in which no navigation information is being output.

38. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

when navigation information that matches one of the time information and the point information described in the navigation script is presented to the user according to one of timing information of generated time, timing information of generated place, measured real time, and measured real place, in the case that navigation information that is presented is one of three-dimensional contents and a moving picture, synchronizing one of a display format of the three-dimensional contents and a traveling speed of the moving picture with one of a virtual traveling distance and a real traveling distance; and controlling a view point for an object that is displayed according to a synchronization control.

39. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

inputting a reverse reproduction command issued by the user;

automatically inverting relation of left and right and relation of front and rear of navigation information in one of a text format and a voice format described in the navigation script, according to the input command; and presenting the inverted navigation information to the user.

40. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

presenting a navigation course corresponding to the navigation script in a map format to the user;

presenting the navigation course in a tree format to the user, at least one of transit points and guide points being a node of the tree format; and moving presentation in the map format and the tree format, according to one of a user's input that designates a node in the tree format and execution of the navigation script, to one of a point corresponding to the designated node and a point at which the user arrived according to execution of the navigation script.

41. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

presenting a navigation course corresponding to the navigation script in a tree format to the user, at least one of transit points and guide points being a node of the tree format and hierarchical levels of the tree format corresponding to detail levels; and displaying a lower hierarchical level of the tree format for a portion including a current point in presentation of the tree format when the current point moves, and displaying only a higher hierarchical level of the tree format for a portion apart form the current point.

42. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

presenting a navigation course corresponding to the navigation script in a map format;

displaying at least one of transit points and guide points on the navigation course corresponding to the navigation script with a pin shaped icon in presentation of the map format; and displaying a plurality of pin shaped icons so that they do not overlap by changing a direction of at least one of the pin shaped icons.

43. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

checking whether or not the navigation script is described according to the predetermined specification;

performing at least one of a feasibility check and a appropriateness check for the navigation script; and outputting a substitute according to a check result.

44. A computer-readable recording medium on which a program is recorded for a computer for creating a navigation script that describes one of time and a point, and navigation information that is output corresponding to one of time information and point information, the navigation script being described according to a predetermined specification and used in a system for interpreting and executing the navigation script to present the navigation information to a user, the program causing the computer to perform:

presenting a navigation course of a navigation script being created in one of a map format and a tree format;

when at least one of a new transit point and a new guide point is designated for presenting the navigation course, inserting the designated point at a position where the total distance of the navigation course becomes short; and performing one of creation and editing of the navigation script being created according to information of the inserted point.

45. A computer-readable recording medium on which a program is recorded for a computer for creating a navigation script that describes one of time and a point, and navigation information that is output corresponding to one of time information and point information, the navigation script being described according to a predetermined specification and used in a system for interpreting and executing the navigation script to present the navigation information to a user, the program causing the computer to perform:

presenting a navigation course of navigation script being created in one of a map format and a tree format;

inputting designation for at least one of a transit point and a guide point in presenting the navigation course;

determining a navigation course according to information of a point corresponding to the input designation;

automatically creating navigation information of a turning direction according to a route calculation; and performing one of creation and editing of the navigation script being created according to the determined navigation course and the automatically created navigation information.

46. A computer-readable recording medium on which a program is recorded for a computer for creating a navigation script that describes one of time and a point, and navigation information that is output corresponding to one of time information and point information, the navigation script being described according to a predetermined specification and used in a system for interpreting and executing the navigation script to present the navigation information to a user, the program causing the computer to perform:

presenting a navigation course of navigation script being created in one of a map format and a tree format;

inputting a designation for at least one of a transit point and a guide point in presenting the navigation course;

determining a navigation course according to information of a point corresponding to the input designation;

combining pre-provided image templates of an intersection and an arrow for an intersection on the navigation course and automatically creating navigation information of an image that is output at the intersection; and performing one of creation and editing of the navigation script being created according to the determined navigation course and the automatically created navigation information.

47. A computer-readable recording medium on which a program is recorded for a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

causing a server device to interpret and execute the navigation script according to a position of a terminal unit that presents navigation information;

transmitting navigation information corresponding to an execution result of the navigation script from the server device to the terminal unit; and when the transmitted navigation information contains identification information of a predetermined template, causing the terminal unit to generate navigation information using the template corresponding to the identification information and to present the generated navigation information to the user.

48. A navigation data processing apparatus for interpreting and executing a navigation script that describes one of time and a point, and navigation information that is output corresponding to one of time information and point information, and for presenting the navigation information to a user, the navigation script being described according to a predetermined specification, the apparatus comprising:

a generating device generating timing information corresponding to one of presentation time and presentation point, according to user's operation for a navigation method including at least one of play, fast forward, skip, and reverse play and according to one of a traveling speed and a time step; and a presenting device presenting navigation information that matches one of the time information and the point information described in the navigation script according to the generated timing information.

49. A navigation data processing apparatus for interpreting and executing a navigation script that describes one of time and a point, and navigation information that is output corresponding to one of time information and point information, and for presenting the navigation information to a user, the navigation script being described according to a predetermined specification, the apparatus comprising:

generating means for generating timing information corresponding to one of presentation time and presentation point, according to user's operation for a navigation method including at least one of play, fast forward, skip, and reverse play and according to one of a traveling speed and a time step; and presenting means for presenting navigation information that matches one of the time information and the point information described in the navigation script according to the generated timing information.

50. A propagation signal for propagating a program to a computer for interpreting and executing a navigation script that describes one of time and a point, and navigation information that is output corresponding to one of time information and point information, and for presenting the navigation information to a user, the navigation script being described according to a predetermined specification, the program causing the computer to perform:

generating timing information corresponding to one of presentation time and presentation point, according to user's operation for a navigation method including at least one of play, fast forward, skip, and reverse play and according to one of a traveling speed and a time step; and presenting navigation information that matches one of the time information and the point information described in the navigation script according to the generated timing information.

* * * * *

UNITED STATES PATENT AND TRADEMARK OFFICE

CERTIFICATE OF CORRECTION

PATENT NO. : 6,381,534 B2
DATED : April 30, 2002
INVENTOR(S) : Kuniharu Takayama et al.

It is certified that error appears in the above-identified patent and that said Letters Patent is hereby corrected as shown below:

Column 77,
Line 65, delete "-"

Signed and Sealed this

First Day of October, 2002

*Attest:*

JAMES E. ROGAN

*Attesting Officer*

*Director of the United States Patent and Trademark Office*